(12) United States Patent
Gauthier et al.

(10) Patent No.: US 12,528,876 B2
(45) Date of Patent: Jan. 20, 2026

(54) CD73 BLOCKING ANTIBODIES

(71) Applicant: INNATE PHARMA, Marseilles (FR)

(72) Inventors: Laurent Gauthier, Marseilles (FR); Carine Paturel, Marcy l'Etoile (FR); Ivan Perrot, Cassis (FR)

(73) Assignee: INNATE PHARMA, Marseilles (FR)

( * ) Notice: Subject to any disclaimer, the term of this patent is extended or adjusted under 35 U.S.C. 154(b) by 1097 days.

(21) Appl. No.: 17/451,835

(22) Filed: Oct. 22, 2021

(65) Prior Publication Data

US 2022/0041744 A1 Feb. 10, 2022

Related U.S. Application Data

(63) Continuation of application No. PCT/EP2020/060955, filed on Apr. 20, 2020.

(60) Provisional application No. 62/837,214, filed on Apr. 23, 2019.

(51) Int. Cl.
*A61K 35/17* (2025.01)
*C07K 14/705* (2006.01)
*C07K 16/28* (2006.01)
*A61K 39/00* (2006.01)

(52) U.S. Cl.
CPC ...... *C07K 16/2896* (2013.01); *C07K 16/2818* (2013.01); *C07K 16/2827* (2013.01); *A61K 2039/545* (2013.01); *C07K 2317/24* (2013.01); *C07K 2317/55* (2013.01); *C07K 2317/567* (2013.01); *C07K 2317/74* (2013.01); *C07K 2317/76* (2013.01); *C07K 2317/92* (2013.01)

(58) Field of Classification Search
CPC ............ C07K 16/2896; C07K 2317/74; C07K 2317/565; A61P 35/00; A61K 2039/505
See application file for complete search history.

(56) References Cited

U.S. PATENT DOCUMENTS

| | | | |
|---|---|---|---|
| 10,736,963 | B2 | 8/2020 | Anceriz et al. |
| 10,766,966 | B2 | 9/2020 | Perrot et al. |
| 10,822,426 | B2 | 11/2020 | Griffin et al. |
| 11,130,817 | B2 | 9/2021 | Caux et al. |
| 11,312,785 | B2 | 4/2022 | Hofmann et al. |
| 11,958,907 | B2 | 4/2024 | Perrot et al. |
| 2018/0030144 | A1 | 2/2018 | Chanteux et al. |
| 2019/0071514 | A1 | 3/2019 | Gauthier et al. |
| 2019/0153113 | A1 | 5/2019 | Bastid et al. |
| 2019/0218304 | A1 | 7/2019 | Chanteux et al. |
| 2019/0218308 | A1 | 7/2019 | Chanteux et al. |
| 2019/0389961 | A1 | 12/2019 | Chanteux et al. |
| 2020/0023071 | A1 | 1/2020 | Blery et al. |
| 2020/0024357 | A1 | 1/2020 | Chanteux et al. |
| 2020/0392243 | A1 | 12/2020 | Perrot et al. |
| 2022/0056145 | A1 | 2/2022 | Gauthier et al. |
| 2024/0270865 | A1 | 8/2024 | Gauthier et al. |

FOREIGN PATENT DOCUMENTS

| WO | WO 2016/055609 | 4/2016 | |
|---|---|---|---|
| WO | WO-2017112803 A1 * | 6/2017 | ............ A61K 45/06 |
| WO | WO 2019/243252 | 12/2019 | |

OTHER PUBLICATIONS

Brown et al J. Immunol. May 1996; 156(9):3285-3291 (Year: 1996).*
Vajdos et al (J. Mol. Biol. 2002, Jul 5;320(2); 415-428) (Year: 2002).*
Strome et al., The Oncologist, 2007; 12:1084-95 (Year: 2007).*
Brand et al., Anticancer Res. 2006; 26:463-70 (Year: 2006).*
Nelson et al., Ann. Intern Med. 2009; 151:727-737 (Year: 2009).*
Kataja et al., Ann Oncol 2009; 20(sup 4): iv10-14 (Year: 2009).*
Balmana et al. Ann Oncol 2009; 20(supp 4):iv19-20 (Year: 2009).*
Deutscher, Guide to Protein Purification p. 738 (1990) (Year: 1990).*
Rudikoff, S. et al. "Single amino acid substitution altering antigen-binding specificity" *Proc. Natl. Acad. Sci.,* Mar. 1982, pp. 1979-1983, vol. 79.
Antonioli, L. et al. "CD39 and CD73 in immunity and inflammation" *Trends Mol Med.* Jun. 2013, pp. 1-26, vol. 19, No. 6.
Perrot, I. et al. "Blocking Antibodies Targeting the CD39/CD73 Immunosuppressive Pathway Unleash Immune Responses in Combination Cancer Therapies", *Cell Reports,* May 21, 2019, pp. 1-25, vol. 27.
Perrot, I. et al. "Preclinical development of humanized CD39 (IPH52) and CD73 (IPH53) blocking antibodies targeting the ATP/Adenosine immune checkpoint pathway for cancer immunotherapy" *AACR Annual Meeting 2018,* Apr. 14-18, 2018, Poster # 2718, p. 1.
Perrot, I. et al. "Abstract 2718: Preclinical development of humanized CD39 and CD73 blocking antibodies targeting the ATP/adenosine immune checkpoint pathway for cancer immunotherapy" *Cancer Research,* Jul. 2018, pp. 1-3, vol. 78, Issue 13, Supplement, Abstract 2718.
Written Opinion in International Application No. PCT/EP2020/060955, Jul. 20, 2020, pp. 1-6.

* cited by examiner

*Primary Examiner* — Maria G Leavitt
(74) *Attorney, Agent, or Firm* — SALIWANCHIK, LLOYD & EISENSCHENK

(57) ABSTRACT

The present invention relates to antibodies, and fragments thereof, that bind and inhibit CD73. The invention also relates to cells producing such compounds; methods of making such compounds, and antibodies, fragments, variants, and derivatives thereof; pharmaceutical compositions comprising the same; methods of using the compounds to diagnose, treat or prevent diseases, e.g., cancer.

39 Claims, 15 Drawing Sheets
Specification includes a Sequence Listing.

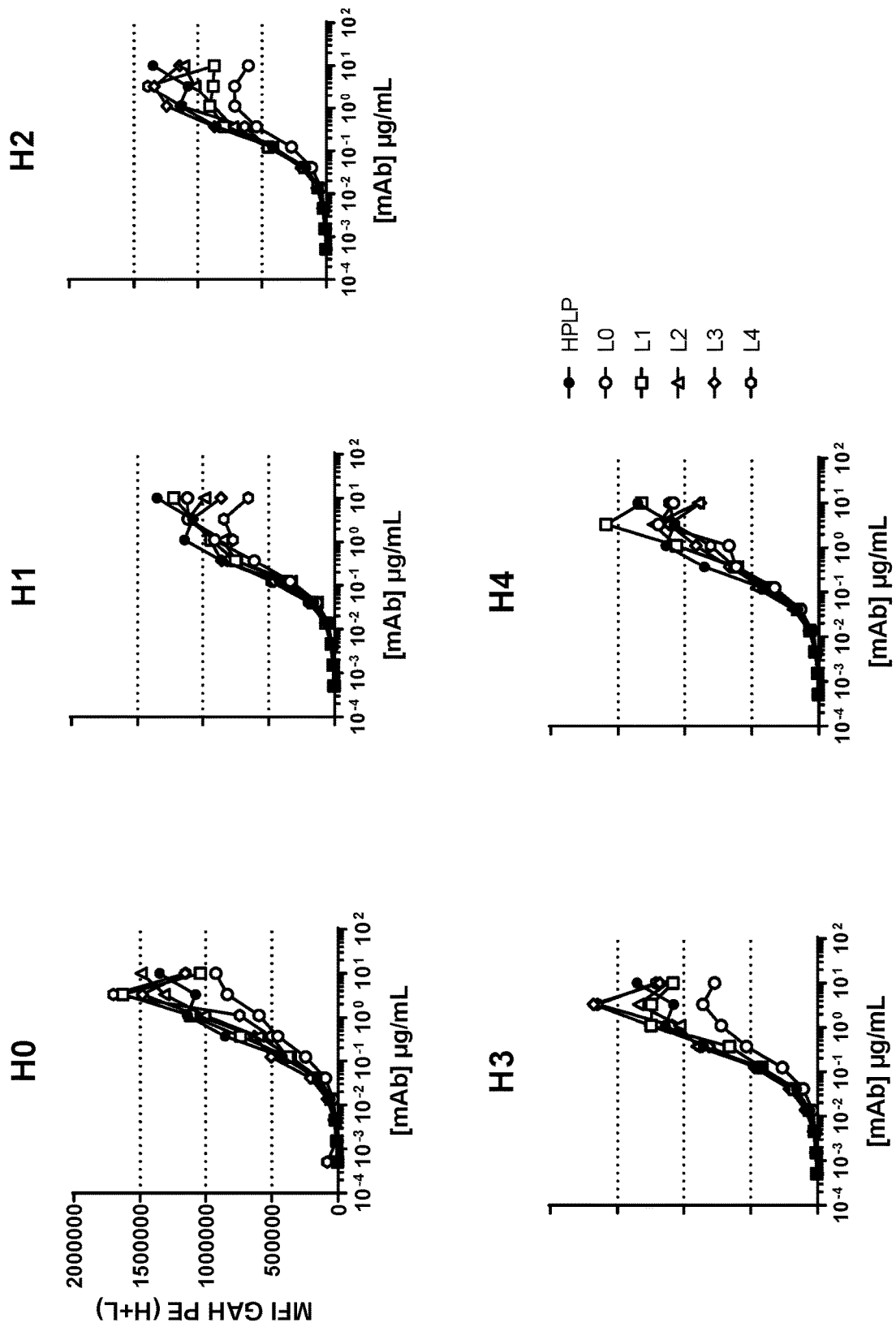

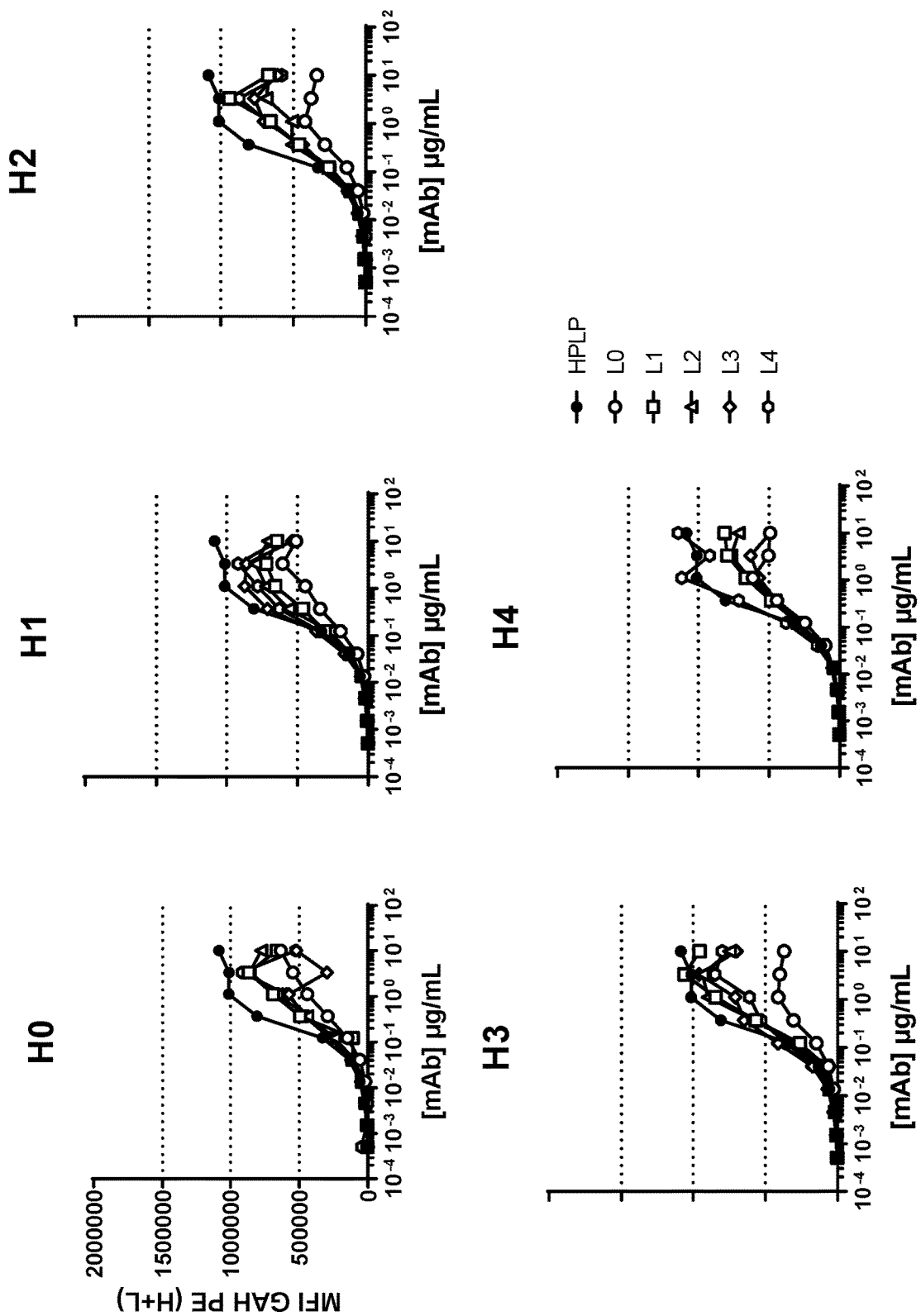

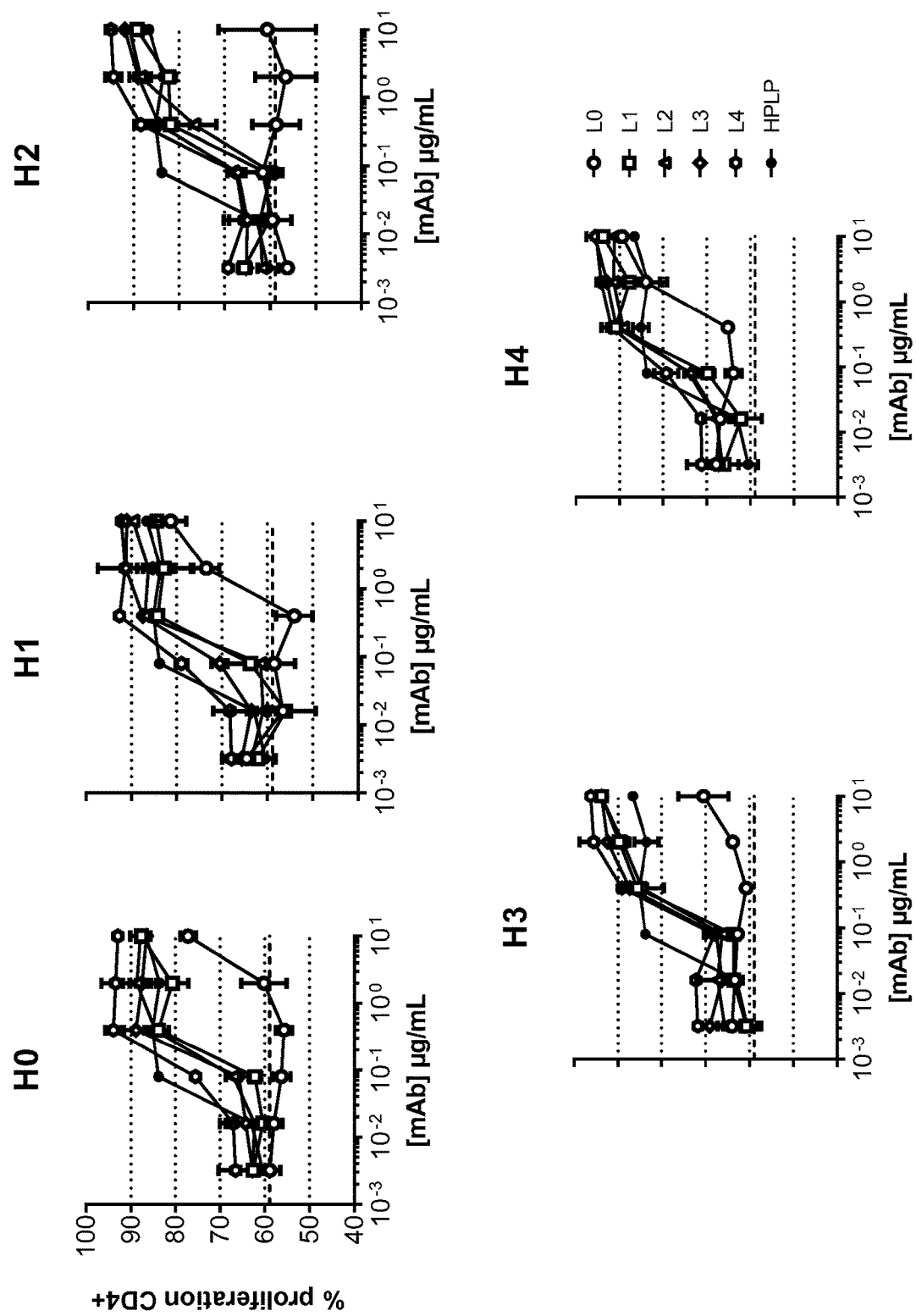

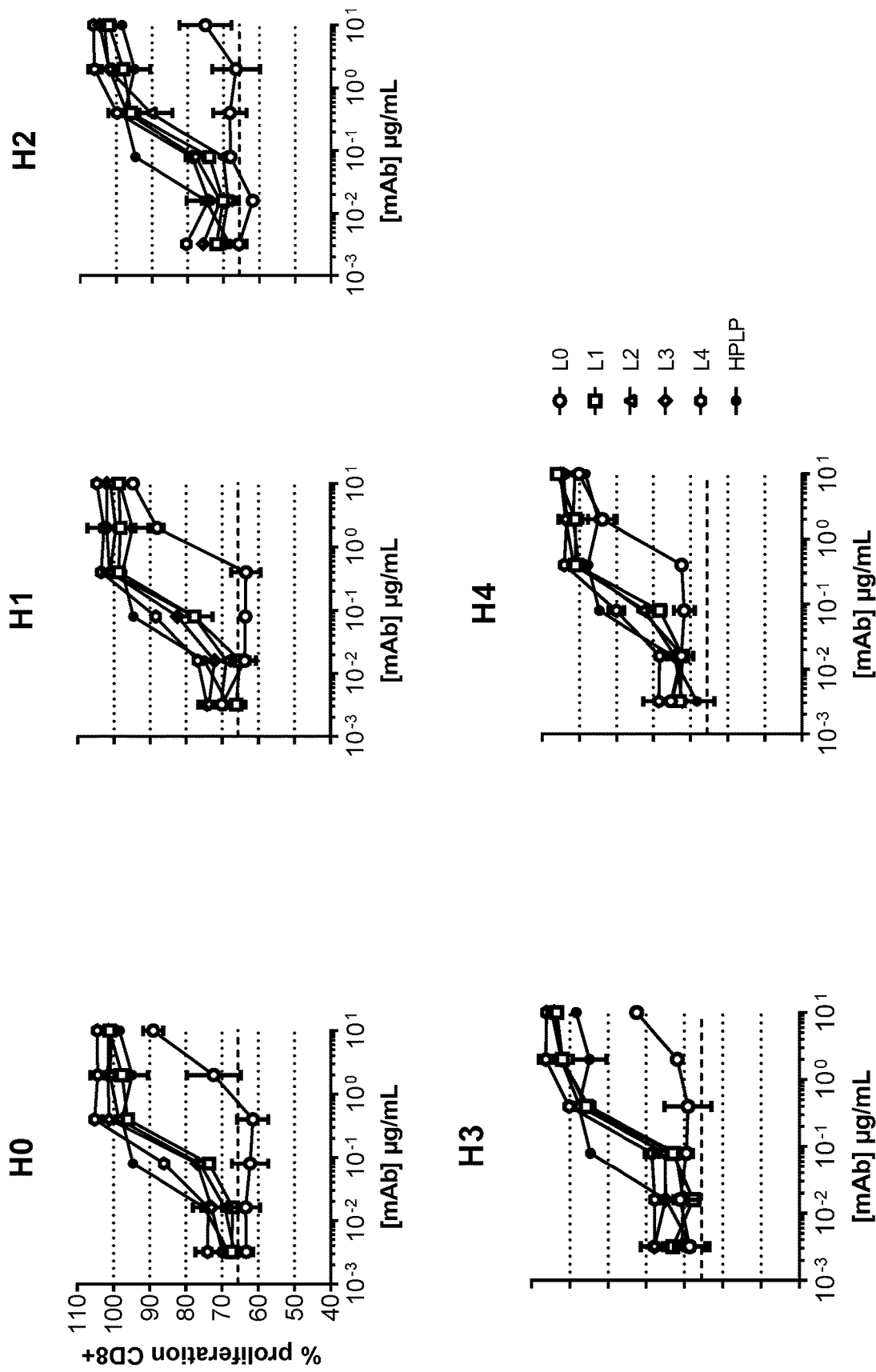

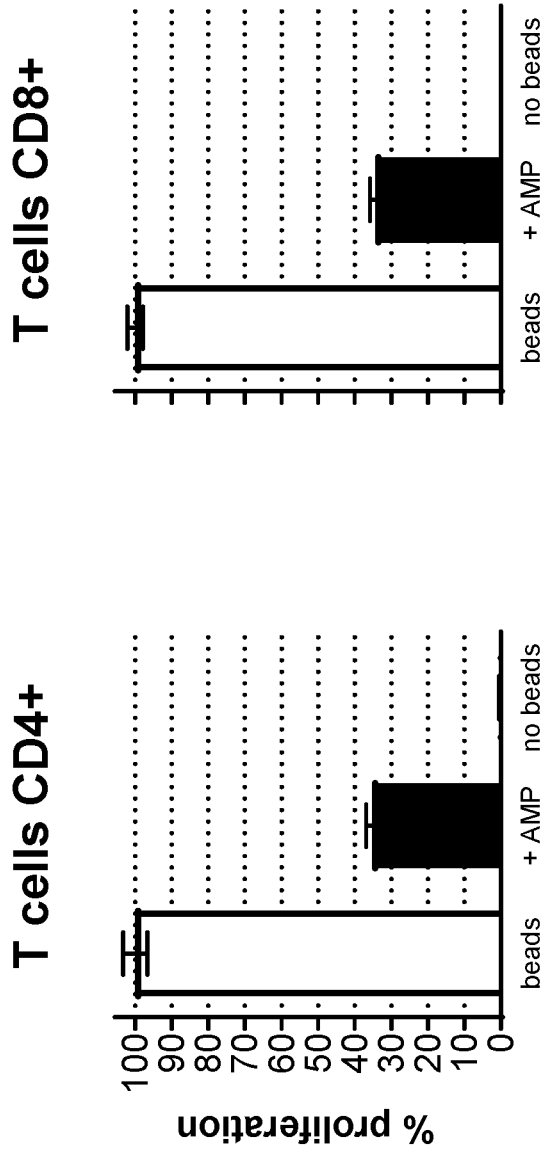

Figure 6A
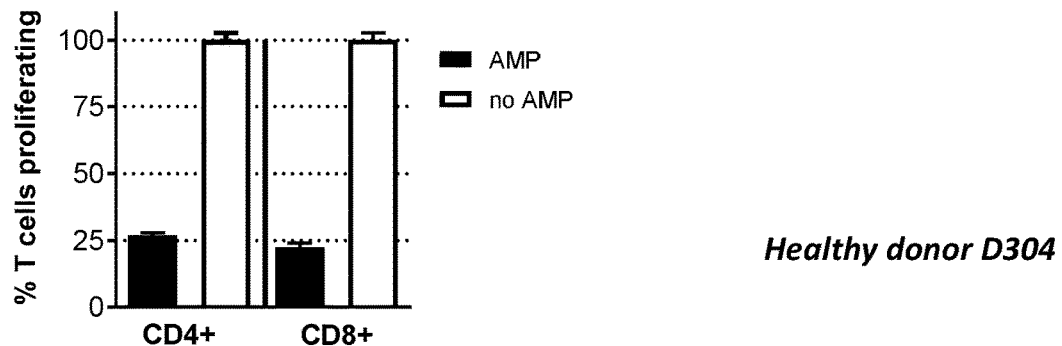
*Healthy donor D304*
2H4+
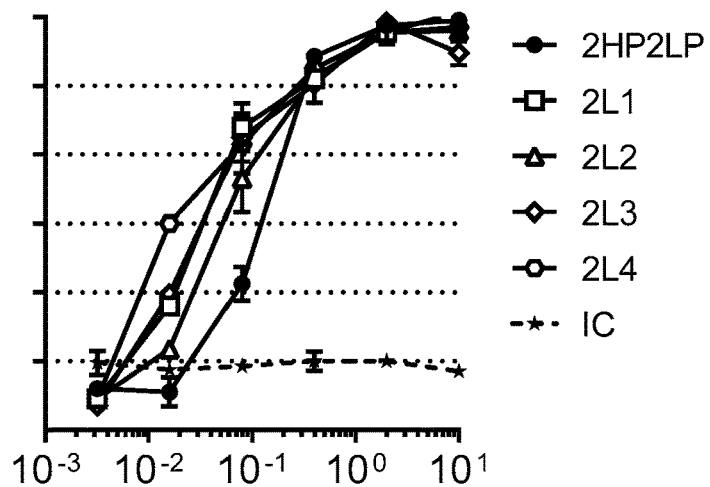
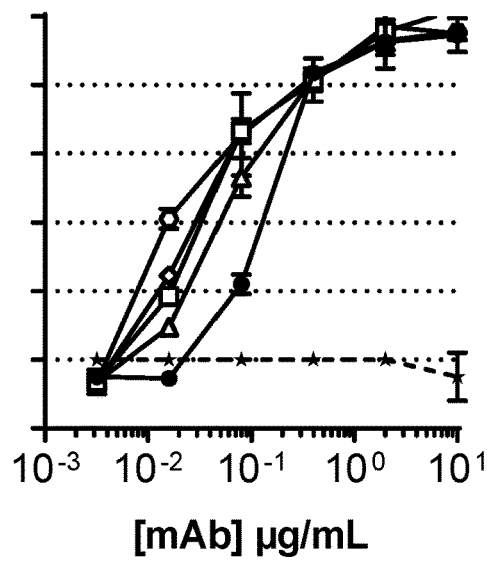
[mAb] µg/mL Figure 6B
AMP inhibits T cell proliferation
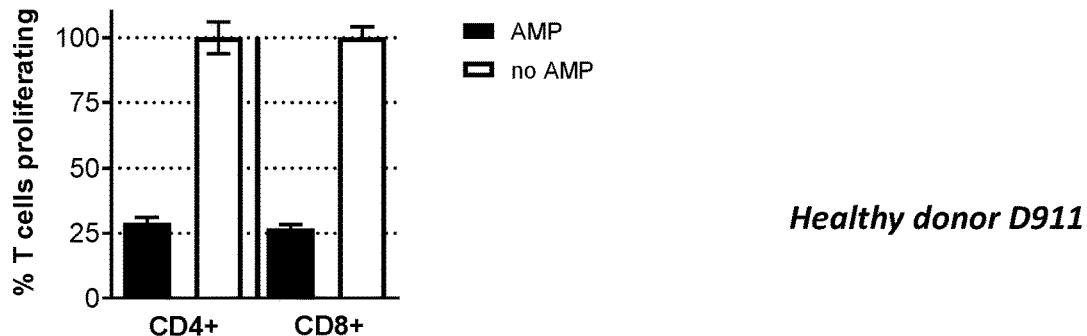
*Healthy donor D911*
2H4+
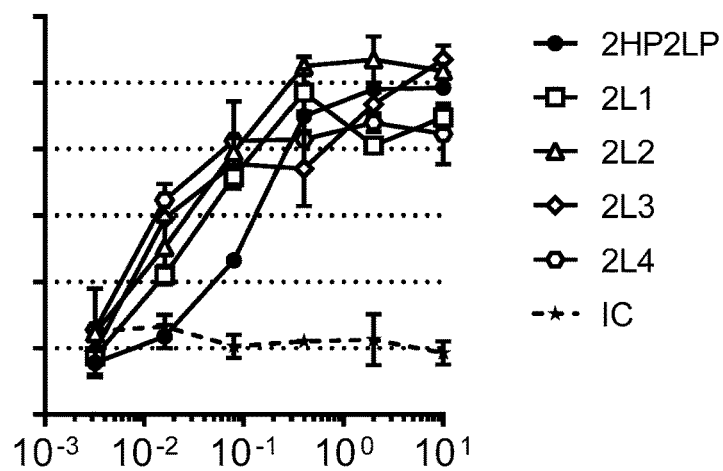
- 2HP2LP
- 2L1
- 2L2
- 2L3
- 2L4
- IC
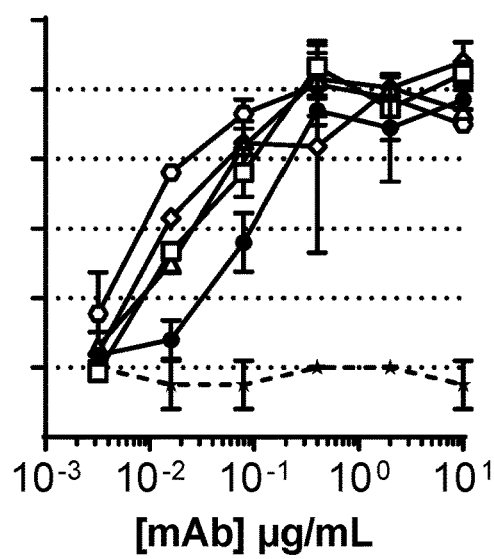
[mAb] µg/mL Figure 7
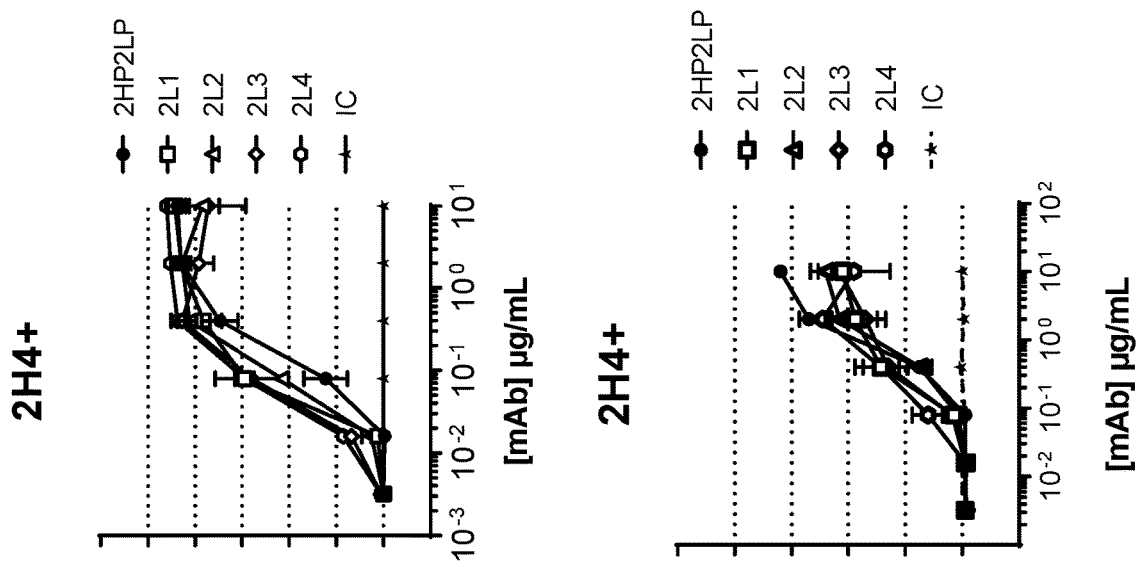
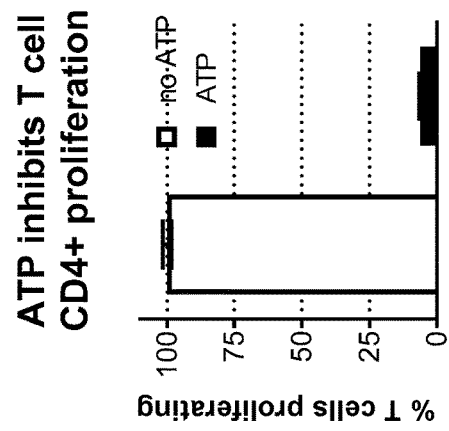

SEQUENCE LISTING

```
<160> NUMBER OF SEQ ID NOS: 48

<210> SEQ ID NO 1
<211> LENGTH: 574
<212> TYPE: PRT
<213> ORGANISM: homo sapiens

<400> SEQUENCE: 1

Met Cys Pro Arg Ala Ala Arg Ala Pro Ala Thr Leu Leu Leu Ala Leu
1               5                   10                  15

Gly Ala Val Leu Trp Pro Ala Ala Gly Ala Trp Glu Leu Thr Ile Leu
            20                  25                  30

His Thr Asn Asp Val His Ser Arg Leu Glu Gln Thr Ser Glu Asp Ser
        35                  40                  45

Ser Lys Cys Val Asn Ala Ser Arg Cys Met Gly Gly Val Ala Arg Leu
    50                  55                  60

Phe Thr Lys Val Gln Gln Ile Arg Arg Ala Glu Pro Asn Val Leu Leu
65                  70                  75                  80

Leu Asp Ala Gly Asp Gln Tyr Gln Gly Thr Ile Trp Phe Thr Val Tyr
                85                  90                  95

Lys Gly Ala Glu Val Ala His Phe Met Asn Ala Leu Arg Tyr Asp Ala
            100                 105                 110

Met Ala Leu Gly Asn His Glu Phe Asp Asn Gly Val Glu Gly Leu Ile
        115                 120                 125

Glu Pro Leu Leu Lys Glu Ala Lys Phe Pro Ile Leu Ser Ala Asn Ile
    130                 135                 140

Lys Ala Lys Gly Pro Leu Ala Ser Gln Ile Ser Gly Leu Tyr Leu Pro
145                 150                 155                 160

Tyr Lys Val Leu Pro Val Gly Asp Glu Val Val Gly Ile Val Gly Tyr
                165                 170                 175
```

```
Thr Ser Lys Glu Thr Pro Phe Leu Ser Asn Pro Gly Thr Asn Leu Val
            180                 185                 190

Phe Glu Asp Glu Ile Thr Ala Leu Gln Pro Glu Val Asp Lys Leu Lys
            195                 200                 205

Thr Leu Asn Val Asn Lys Ile Ile Ala Leu Gly His Ser Gly Phe Glu
            210                 215                 220

Met Asp Lys Leu Ile Ala Gln Lys Val Arg Gly Val Asp Val Val
225                 230                 235                 240

Gly Gly His Ser Asn Thr Phe Leu Tyr Thr Gly Asn Pro Pro Ser Lys
                245                 250                 255

Glu Val Pro Ala Gly Lys Tyr Pro Phe Ile Val Thr Ser Asp Asp Gly
            260                 265                 270

Arg Lys Val Pro Val Val Gln Ala Tyr Ala Phe Gly Lys Tyr Leu Gly
            275                 280                 285

Tyr Leu Lys Ile Glu Phe Asp Glu Arg Gly Asn Val Ile Ser Ser His
            290                 295                 300

Gly Asn Pro Ile Leu Leu Asn Ser Ser Ile Pro Glu Asp Pro Ser Ile
305                 310                 315                 320

Lys Ala Asp Ile Asn Lys Trp Arg Ile Lys Leu Asp Asn Tyr Ser Thr
                325                 330                 335

Gln Glu Leu Gly Lys Thr Ile Val Tyr Leu Asp Gly Ser Ser Gln Ser
            340                 345                 350

Cys Arg Phe Arg Glu Cys Asn Met Gly Asn Leu Ile Cys Asp Ala Met
            355                 360                 365

Ile Asn Asn Asn Leu Arg His Thr Asp Glu Met Phe Trp Asn His Val
370                 375                 380

Ser Met Cys Ile Leu Asn Gly Gly Ile Arg Ser Pro Ile Asp Glu
385                 390                 395                 400

Arg Asn Asn Gly Thr Ile Thr Trp Glu Asn Leu Ala Ala Val Leu Pro
                405                 410                 415

Phe Gly Gly Thr Phe Asp Leu Val Gln Leu Lys Gly Ser Thr Leu Lys
            420                 425                 430

Lys Ala Phe Glu His Ser Val His Arg Tyr Gly Gln Ser Thr Gly Glu
            435                 440                 445

Phe Leu Gln Val Gly Gly Ile His Val Val Tyr Asp Leu Ser Arg Lys
            450                 455                 460

Pro Gly Asp Arg Val Val Lys Leu Asp Val Leu Cys Thr Lys Cys Arg
465                 470                 475                 480

Val Pro Ser Tyr Asp Pro Leu Lys Met Asp Glu Val Tyr Lys Val Ile
                485                 490                 495

Leu Pro Asn Phe Leu Ala Asn Gly Gly Asp Gly Phe Gln Met Ile Lys
            500                 505                 510

Asp Glu Leu Leu Arg His Asp Ser Gly Asp Gln Asp Ile Asn Val Val
            515                 520                 525

Ser Thr Tyr Ile Ser Lys Met Lys Val Ile Tyr Pro Ala Val Glu Gly
            530                 535                 540

Arg Ile Lys Phe Ser Thr Gly Ser His Cys His Gly Ser Phe Ser Leu
545                 550                 555                 560

Ile Phe Leu Ser Leu Trp Ala Val Ile Phe Val Leu Tyr Gln
                565                 570

<210> SEQ ID NO 2
<211> LENGTH: 5
```

```
<212> TYPE: PRT
<213> ORGANISM: mus musculus

<400> SEQUENCE: 2

Ser Tyr Asn Met Tyr
1               5

<210> SEQ ID NO 3
<211> LENGTH: 17
<212> TYPE: PRT
<213> ORGANISM: mus musculus
<220> FEATURE:
<221> NAME/KEY: X
<222> LOCATION: (13)..(13)
<223> OTHER INFORMATION: X may be Gln or Leu
<220> FEATURE:
<221> NAME/KEY: X
<222> LOCATION: (14)..(14)
<223> OTHER INFORMATION: X may be Lys or Thr

<400> SEQUENCE: 3

Tyr Ile Asp Pro Tyr Asn Gly Gly Ser Ser Tyr Asn Xaa Xaa Phe Lys
1               5                   10                  15

Gly

<210> SEQ ID NO 4
<211> LENGTH: 11
<212> TYPE: PRT
<213> ORGANISM: Mus musculus
<220> FEATURE:
<221> NAME/KEY: X
<222> LOCATION: (3)..(3)
<223> OTHER INFORMATION: X may be Asp or Gly

<400> SEQUENCE: 4

Gly Tyr Xaa Asn Tyr Lys Ala Trp Phe Ala Tyr
1               5                   10

<210> SEQ ID NO 5
<211> LENGTH: 11
<212> TYPE: PRT
<213> ORGANISM: mus musculus
<220> FEATURE:
<221> NAME/KEY: X
<222> LOCATION: (7)..(7)
<223> OTHER INFORMATION: X may be Thr or Ser

<400> SEQUENCE: 5

Lys Ala Ser Gln Ser Val Xaa Asn Asp Val Ala
1               5                   10

<210> SEQ ID NO 6
<211> LENGTH: 7
<212> TYPE: PRT
<213> ORGANISM: mus musculus
<220> FEATURE:
<221> NAME/KEY: X
<222> LOCATION: (4)..(4)
<223> OTHER INFORMATION: X may be Thr or Asn

<400> SEQUENCE: 6

Tyr Ala Ser Xaa Arg Tyr Thr
1               5

<210> SEQ ID NO 7
<211> LENGTH: 8
<212> TYPE: PRT
<213> ORGANISM: mus musculus
```

```
<400> SEQUENCE: 7

Gln Gln Asp Tyr Ser Ser Leu Thr
1               5

<210> SEQ ID NO 8
<211> LENGTH: 17
<212> TYPE: PRT
<213> ORGANISM: mus musculus

<400> SEQUENCE: 8

Tyr Ile Asp Pro Tyr Asn Gly Gly Ser Ser Tyr Asn Leu Thr Phe Lys
1               5                   10                  15

Gly

<210> SEQ ID NO 9
<211> LENGTH: 11
<212> TYPE: PRT
<213> ORGANISM: mus musculus

<400> SEQUENCE: 9

Gly Tyr Gly Asn Tyr Lys Ala Trp Phe Ala Tyr
1               5                   10

<210> SEQ ID NO 10
<211> LENGTH: 11
<212> TYPE: PRT
<213> ORGANISM: mus musculus

<400> SEQUENCE: 10

Lys Ala Ser Gln Ser Val Ser Asn Asp Val Ala
1               5                   10

<210> SEQ ID NO 11
<211> LENGTH: 7
<212> TYPE: PRT
<213> ORGANISM: mus musculus

<400> SEQUENCE: 11

Tyr Ala Ser Thr Arg Tyr Thr
1               5

<210> SEQ ID NO 12
<211> LENGTH: 17
<212> TYPE: PRT
<213> ORGANISM: mus musculus

<400> SEQUENCE: 12

Tyr Ile Asp Pro Tyr Asn Gly Gly Ser Ser Tyr Asn Gln Lys Phe Lys
1               5                   10                  15

Gly

<210> SEQ ID NO 13
<211> LENGTH: 11
<212> TYPE: PRT
<213> ORGANISM: mus musculus

<400> SEQUENCE: 13

Gly Tyr Asn Asn Tyr Lys Ala Trp Phe Ala Tyr
1               5                   10

<210> SEQ ID NO 14
<211> LENGTH: 11
```

<212> TYPE: PRT
<213> ORGANISM: mus musculus

<400> SEQUENCE: 14

Lys Ala Ser Gln Ser Val Thr Asn Asp Val Ala
1               5                   10

<210> SEQ ID NO 15
<211> LENGTH: 7
<212> TYPE: PRT
<213> ORGANISM: mus musculus

<400> SEQUENCE: 15

Tyr Ala Ser Asn Arg Tyr Thr
1               5

<210> SEQ ID NO 16
<211> LENGTH: 330
<212> TYPE: PRT
<213> ORGANISM: Artificial Sequence
<220> FEATURE:
<223> OTHER INFORMATION: Synthetic

<400> SEQUENCE: 16

Ala Ser Thr Lys Gly Pro Ser Val Phe Pro Leu Ala Pro Ser Ser Lys
1               5                   10                  15

Ser Thr Ser Gly Gly Thr Ala Ala Leu Gly Cys Leu Val Lys Asp Tyr
                20                  25                  30

Phe Pro Glu Pro Val Thr Val Ser Trp Asn Ser Gly Ala Leu Thr Ser
            35                  40                  45

Gly Val His Thr Phe Pro Ala Val Leu Gln Ser Ser Gly Leu Tyr Ser
        50                  55                  60

Leu Ser Ser Val Val Thr Val Pro Ser Ser Leu Gly Thr Gln Thr
65                  70                  75                  80

Tyr Ile Cys Asn Val Asn His Lys Pro Ser Asn Thr Lys Val Asp Lys
                85                  90                  95

Arg Val Glu Pro Lys Ser Cys Asp Lys Thr His Thr Cys Pro Pro Cys
            100                 105                 110

Pro Ala Pro Glu Ala Glu Gly Gly Pro Ser Val Phe Leu Phe Pro Pro
        115                 120                 125

Lys Pro Lys Asp Thr Leu Met Ile Ser Arg Thr Pro Glu Val Thr Cys
130                 135                 140

Val Val Val Asp Val Ser His Glu Asp Pro Glu Val Lys Phe Asn Trp
145                 150                 155                 160

Tyr Val Asp Gly Val Glu Val His Asn Ala Lys Thr Lys Pro Arg Glu
                165                 170                 175

Glu Gln Tyr Asn Ser Thr Tyr Arg Val Val Ser Val Leu Thr Val Leu
            180                 185                 190

His Gln Asp Trp Leu Asn Gly Lys Glu Tyr Lys Cys Lys Val Ser Asn
        195                 200                 205

Lys Ala Leu Pro Ala Ser Ile Glu Lys Thr Ile Ser Lys Ala Lys Gly
210                 215                 220

Gln Pro Arg Glu Pro Gln Val Tyr Thr Leu Pro Pro Ser Arg Glu Glu
225                 230                 235                 240

Met Thr Lys Asn Gln Val Ser Leu Thr Cys Leu Val Lys Gly Phe Tyr
                245                 250                 255

Pro Ser Asp Ile Ala Val Glu Trp Glu Ser Asn Gly Gln Pro Glu Asn
            260                 265                 270

```
Asn Tyr Lys Thr Thr Pro Pro Val Leu Asp Ser Asp Gly Ser Phe Phe
            275                 280                 285

Leu Tyr Ser Lys Leu Thr Val Asp Lys Ser Arg Trp Gln Gln Gly Asn
            290                 295                 300

Val Phe Ser Cys Ser Val Met His Glu Ala Leu His Asn His Tyr Thr
305                 310                 315                 320

Gln Lys Ser Leu Ser Leu Ser Pro Gly Lys
            325                 330

<210> SEQ ID NO 17
<211> LENGTH: 330
<212> TYPE: PRT
<213> ORGANISM: Artificial Sequence
<220> FEATURE:
<223> OTHER INFORMATION: Synthetic

<400> SEQUENCE: 17

Ala Ser Thr Lys Gly Pro Ser Val Phe Pro Leu Ala Pro Ser Ser Lys
1               5                   10                  15

Ser Thr Ser Gly Gly Thr Ala Ala Leu Gly Cys Leu Val Lys Asp Tyr
            20                  25                  30

Phe Pro Glu Pro Val Thr Val Ser Trp Asn Ser Gly Ala Leu Thr Ser
            35                  40                  45

Gly Val His Thr Phe Pro Ala Val Leu Gln Ser Ser Gly Leu Tyr Ser
50                  55                  60

Leu Ser Ser Val Val Thr Val Pro Ser Ser Ser Leu Gly Thr Gln Thr
65                  70                  75                  80

Tyr Ile Cys Asn Val Asn His Lys Pro Ser Asn Thr Lys Val Asp Lys
            85                  90                  95

Arg Val Glu Pro Lys Ser Cys Asp Lys Thr His Thr Cys Pro Pro Cys
            100                 105                 110

Pro Ala Pro Glu Phe Glu Gly Gly Pro Ser Val Phe Leu Phe Pro Pro
            115                 120                 125

Lys Pro Lys Asp Thr Leu Met Ile Ser Arg Thr Pro Glu Val Thr Cys
130                 135                 140

Val Val Val Asp Val Ser His Glu Asp Pro Glu Val Lys Phe Asn Trp
145                 150                 155                 160

Tyr Val Asp Gly Val Glu Val His Asn Ala Lys Thr Lys Pro Arg Glu
            165                 170                 175

Glu Gln Tyr Asn Ser Thr Tyr Arg Val Val Ser Val Leu Thr Val Leu
            180                 185                 190

His Gln Asp Trp Leu Asn Gly Lys Glu Tyr Lys Cys Lys Val Ser Asn
            195                 200                 205

Lys Ala Leu Pro Ala Ser Ile Glu Lys Thr Ile Ser Lys Ala Lys Gly
            210                 215                 220

Gln Pro Arg Glu Pro Gln Val Tyr Thr Leu Pro Pro Ser Arg Glu Glu
225                 230                 235                 240

Met Thr Lys Asn Gln Val Ser Leu Thr Cys Leu Val Lys Gly Phe Tyr
            245                 250                 255

Pro Ser Asp Ile Ala Val Glu Trp Glu Ser Asn Gly Gln Pro Glu Asn
            260                 265                 270

Asn Tyr Lys Thr Thr Pro Pro Val Leu Asp Ser Asp Gly Ser Phe Phe
            275                 280                 285

Leu Tyr Ser Lys Leu Thr Val Asp Lys Ser Arg Trp Gln Gln Gly Asn
            290                 295                 300
```

Val Phe Ser Cys Ser Val Met His Glu Ala Leu His Asn His Tyr Thr
305                 310                 315                 320

Gln Lys Ser Leu Ser Leu Ser Pro Gly Lys
                325                 330

<210> SEQ ID NO 18
<211> LENGTH: 330
<212> TYPE: PRT
<213> ORGANISM: Artificial Sequence
<220> FEATURE:
<223> OTHER INFORMATION: Synthetic

<400> SEQUENCE: 18

Ala Ser Thr Lys Gly Pro Ser Val Phe Pro Leu Ala Pro Ser Ser Lys
1               5                   10                  15

Ser Thr Ser Gly Gly Thr Ala Ala Leu Gly Cys Leu Val Lys Asp Tyr
                20                  25                  30

Phe Pro Glu Pro Val Thr Val Ser Trp Asn Ser Gly Ala Leu Thr Ser
            35                  40                  45

Gly Val His Thr Phe Pro Ala Val Leu Gln Ser Ser Gly Leu Tyr Ser
        50                  55                  60

Leu Ser Ser Val Val Thr Val Pro Ser Ser Ser Leu Gly Thr Gln Thr
65                  70                  75                  80

Tyr Ile Cys Asn Val Asn His Lys Pro Ser Asn Thr Lys Val Asp Lys
                85                  90                  95

Arg Val Glu Pro Lys Ser Cys Asp Lys Thr His Thr Cys Pro Pro Cys
            100                 105                 110

Pro Ala Pro Glu Ala Glu Gly Ala Pro Ser Val Phe Leu Phe Pro Pro
        115                 120                 125

Lys Pro Lys Asp Thr Leu Met Ile Ser Arg Thr Pro Glu Val Thr Cys
130                 135                 140

Val Val Val Asp Val Ser His Glu Asp Pro Glu Val Lys Phe Asn Trp
145                 150                 155                 160

Tyr Val Asp Gly Val Glu Val His Asn Ala Lys Thr Lys Pro Arg Glu
                165                 170                 175

Glu Gln Tyr Asn Ser Thr Tyr Arg Val Val Ser Val Leu Thr Val Leu
            180                 185                 190

His Gln Asp Trp Leu Asn Gly Lys Glu Tyr Lys Cys Lys Val Ser Asn
        195                 200                 205

Lys Ala Leu Pro Ser Ser Ile Glu Lys Thr Ile Ser Lys Ala Lys Gly
210                 215                 220

Gln Pro Arg Glu Pro Gln Val Tyr Thr Leu Pro Pro Ser Arg Glu Glu
225                 230                 235                 240

Met Thr Lys Asn Gln Val Ser Leu Thr Cys Leu Val Lys Gly Phe Tyr
                245                 250                 255

Pro Ser Asp Ile Ala Val Glu Trp Glu Ser Asn Gly Gln Pro Glu Asn
            260                 265                 270

Asn Tyr Lys Thr Thr Pro Pro Val Leu Asp Ser Asp Gly Ser Phe Phe
        275                 280                 285

Leu Tyr Ser Lys Leu Thr Val Asp Lys Ser Arg Trp Gln Gln Gly Asn
290                 295                 300

Val Phe Ser Cys Ser Val Met His Glu Ala Leu His Asn His Tyr Thr
305                 310                 315                 320

Gln Lys Ser Leu Ser Leu Ser Pro Gly Lys
                325                 330

<210> SEQ ID NO 19
<211> LENGTH: 330
<212> TYPE: PRT
<213> ORGANISM: Artificial Sequence
<220> FEATURE:
<223> OTHER INFORMATION: Synthetic

<400> SEQUENCE: 19

```
Ala Ser Thr Lys Gly Pro Ser Val Phe Pro Leu Ala Pro Ser Ser Lys
1               5                   10                  15

Ser Thr Ser Gly Gly Thr Ala Ala Leu Gly Cys Leu Val Lys Asp Tyr
            20                  25                  30

Phe Pro Glu Pro Val Thr Val Ser Trp Asn Ser Gly Ala Leu Thr Ser
        35                  40                  45

Gly Val His Thr Phe Pro Ala Val Leu Gln Ser Ser Gly Leu Tyr Ser
    50                  55                  60

Leu Ser Ser Val Val Thr Val Pro Ser Ser Ser Leu Gly Thr Gln Thr
65                  70                  75                  80

Tyr Ile Cys Asn Val Asn His Lys Pro Ser Asn Thr Lys Val Asp Lys
                85                  90                  95

Arg Val Glu Pro Lys Ser Cys Asp Lys Thr His Thr Cys Pro Pro Cys
            100                 105                 110

Pro Ala Pro Glu Ala Glu Gly Ala Pro Ser Val Phe Leu Phe Pro Pro
        115                 120                 125

Lys Pro Lys Asp Thr Leu Met Ile Ser Arg Thr Pro Glu Val Thr Cys
130                 135                 140

Val Val Val Asp Val Ser His Glu Asp Pro Glu Val Lys Phe Asn Trp
145                 150                 155                 160

Tyr Val Asp Gly Val Glu Val His Asn Ala Lys Thr Lys Pro Arg Glu
                165                 170                 175

Glu Gln Tyr Asn Ser Thr Tyr Arg Val Val Ser Val Leu Thr Val Leu
            180                 185                 190

His Gln Asp Trp Leu Asn Gly Lys Glu Tyr Lys Cys Lys Val Ser Asn
        195                 200                 205

Lys Ala Leu Pro Ala Ser Ile Glu Lys Thr Ile Ser Lys Ala Lys Gly
    210                 215                 220

Gln Pro Arg Glu Pro Gln Val Tyr Thr Leu Pro Pro Ser Arg Glu Glu
225                 230                 235                 240

Met Thr Lys Asn Gln Val Ser Leu Thr Cys Leu Val Lys Gly Phe Tyr
                245                 250                 255

Pro Ser Asp Ile Ala Val Glu Trp Glu Ser Asn Gly Gln Pro Glu Asn
            260                 265                 270

Asn Tyr Lys Thr Thr Pro Pro Val Leu Asp Ser Asp Gly Ser Phe Phe
        275                 280                 285

Leu Tyr Ser Lys Leu Thr Val Asp Lys Ser Arg Trp Gln Gln Gly Asn
    290                 295                 300

Val Phe Ser Cys Ser Val Met His Glu Ala Leu His Asn His Tyr Thr
305                 310                 315                 320

Gln Lys Ser Leu Ser Leu Ser Pro Gly Lys
                325                 330
```

<210> SEQ ID NO 20
<211> LENGTH: 45
<212> TYPE: DNA
<213> ORGANISM: homo sapiens -continued

<400> SEQUENCE: 20
tacgactcac aagcttgccg ccaccatgtg tccccgagcc gcgcg  45

<210> SEQ ID NO 21
<211> LENGTH: 57
<212> TYPE: DNA
<213> ORGANISM: homo sapiens

<400> SEQUENCE: 21
ccgccccgac tctagatcag tgatggtgat gatggtgctt gatccgacct tcaactg  57

<210> SEQ ID NO 22
<211> LENGTH: 553
<212> TYPE: PRT
<213> ORGANISM: Artificial Sequence
<220> FEATURE:
<223> OTHER INFORMATION: synthetic

<400> SEQUENCE: 22

```
Met Cys Pro Arg Ala Ala Arg Ala Pro Ala Thr Leu Leu Ala Leu
1               5                   10                  15

Gly Ala Val Leu Trp Pro Ala Ala Gly Ala Trp Glu Leu Thr Ile Leu
            20                  25                  30

His Thr Asn Asp Val His Ser Arg Leu Glu Gln Thr Ser Glu Asp Ser
        35                  40                  45

Ser Lys Cys Val Asn Ala Ser Arg Cys Met Gly Gly Val Ala Arg Leu
    50                  55                  60

Phe Thr Lys Val Gln Gln Ile Arg Arg Ala Glu Pro Asn Val Leu Leu
65                  70                  75                  80

Leu Asp Ala Gly Asp Gln Tyr Gln Gly Thr Ile Trp Phe Thr Val Tyr
                85                  90                  95

Lys Gly Ala Glu Val Ala His Phe Met Asn Ala Leu Arg Tyr Asp Ala
            100                 105                 110

Met Ala Leu Gly Asn His Glu Phe Asp Asn Gly Val Glu Gly Leu Ile
        115                 120                 125

Glu Pro Leu Leu Lys Glu Ala Lys Phe Pro Ile Leu Ser Ala Asn Ile
    130                 135                 140

Lys Ala Lys Gly Pro Leu Ala Ser Gln Ile Ser Gly Leu Tyr Leu Pro
145                 150                 155                 160

Tyr Lys Val Leu Pro Val Gly Asp Glu Val Val Gly Ile Val Gly Tyr
                165                 170                 175

Thr Ser Lys Glu Thr Pro Phe Leu Ser Asn Pro Gly Thr Asn Leu Val
            180                 185                 190

Phe Glu Asp Glu Ile Thr Ala Leu Gln Pro Glu Val Asp Lys Leu Lys
        195                 200                 205

Thr Leu Asn Val Asn Lys Ile Ile Ala Leu Gly His Ser Gly Phe Glu
    210                 215                 220

Met Asp Lys Leu Ile Ala Gln Lys Val Arg Gly Val Asp Val Val Val
225                 230                 235                 240

Gly Gly His Ser Asn Thr Phe Leu Tyr Thr Gly Asn Pro Pro Ser Lys
                245                 250                 255

Glu Val Pro Ala Gly Lys Tyr Pro Phe Ile Val Thr Ser Asp Asp Gly
            260                 265                 270

Arg Lys Val Pro Val Val Gln Ala Tyr Ala Phe Gly Lys Tyr Leu Gly
        275                 280                 285
```

```
Tyr Leu Lys Ile Glu Phe Asp Glu Arg Gly Asn Val Ile Ser Ser His
    290             295                 300

Gly Asn Pro Ile Leu Leu Asn Ser Ser Ile Pro Glu Asp Pro Ser Ile
305             310                 315                 320

Lys Ala Asp Ile Asn Lys Trp Arg Ile Lys Leu Asp Asn Tyr Ser Thr
                325                 330                 335

Gln Glu Leu Gly Lys Thr Ile Val Tyr Leu Asp Gly Ser Ser Gln Ser
                340                 345                 350

Cys Arg Phe Arg Glu Cys Asn Met Gly Asn Leu Ile Cys Asp Ala Met
            355                 360                 365

Ile Asn Asn Asn Leu Arg His Thr Asp Glu Met Phe Trp Asn His Val
370                 375                 380

Ser Met Cys Ile Leu Asn Gly Gly Ile Arg Ser Pro Ile Asp Glu
385                 390                 395                 400

Arg Asn Asn Gly Thr Ile Thr Trp Glu Asn Leu Ala Ala Val Leu Pro
                405                 410                 415

Phe Gly Gly Thr Phe Asp Leu Val Gln Leu Lys Gly Ser Thr Leu Lys
                420                 425                 430

Lys Ala Phe Glu His Ser Val His Arg Tyr Gly Gln Ser Thr Gly Glu
            435                 440                 445

Phe Leu Gln Val Gly Gly Ile His Val Val Tyr Asp Leu Ser Arg Lys
450                 455                 460

Pro Gly Asp Arg Val Val Lys Leu Asp Val Leu Cys Thr Lys Cys Arg
465                 470                 475                 480

Val Pro Ser Tyr Asp Pro Leu Lys Met Asp Glu Val Tyr Lys Val Ile
                485                 490                 495

Leu Pro Asn Phe Leu Ala Asn Gly Gly Asp Gly Phe Gln Met Ile Lys
                500                 505                 510

Asp Glu Leu Leu Arg His Asp Ser Gly Asp Gln Asp Ile Asn Val Val
            515                 520                 525

Ser Thr Tyr Ile Ser Lys Met Lys Val Ile Tyr Pro Ala Val Glu Gly
530                 535                 540

Arg Ile Lys His His His His His His
545                 550

<210> SEQ ID NO 23
<211> LENGTH: 216
<212> TYPE: PRT
<213> ORGANISM: Artificial Sequence
<220> FEATURE:
<223> OTHER INFORMATION: synthetic

<400> SEQUENCE: 23

Gln Ile Gln Leu Gln Gln Ser Gly Pro Glu Leu Val Lys Pro Gly Ala
1               5                   10                  15

Ser Val Lys Val Ser Cys Lys Ala Ser Gly Tyr Ala Phe Ala Ser Tyr
                20                  25                  30

Asn Met Asn Trp Val Lys Gln Ser His Gly Lys Ser Leu Asp Trp Ile
            35                  40                  45

Gly Tyr Ile Asp Pro Tyr Asn Gly Gly Ser Ser Tyr Asn Leu Thr Phe
        50                  55                  60

Lys Gly Lys Ala Thr Leu Thr Val Asp Lys Ser Ser Thr Thr Ala Tyr
65                  70                  75                  80

Met His Leu Asn Ser Leu Thr Ser Glu Asp Ser Ala Val Tyr Tyr Cys
                85                  90                  95
```

Ala Arg Gly Tyr Gly Asn Tyr Lys Ala Trp Phe Ala Tyr Trp Gly Gln
            100                 105                 110

Gly Thr Leu Val Thr Val Ser Ala Ala Ser Thr Lys Gly Pro Ser Val
        115                 120                 125

Phe Pro Leu Ala Pro Ser Ser Lys Ser Thr Ser Gly Gly Thr Ala Ala
    130                 135                 140

Leu Gly Cys Leu Val Lys Asp Tyr Phe Pro Glu Pro Val Thr Val Ser
145                 150                 155                 160

Trp Asn Ser Gly Ala Leu Thr Ser Gly Val His Thr Phe Pro Ala Val
                165                 170                 175

Leu Gln Ser Ser Gly Leu Tyr Ser Leu Ser Ser Val Val Thr Val Pro
            180                 185                 190

Ser Ser Ser Leu Gly Thr Gln Thr Tyr Ile Cys Asn Val Asn His Lys
        195                 200                 205

Pro Ser Asn Thr Lys Val Asp Lys
    210                 215

<210> SEQ ID NO 24
<211> LENGTH: 213
<212> TYPE: PRT
<213> ORGANISM: Artificial Sequence
<220> FEATURE:
<223> OTHER INFORMATION: synthetic

<400> SEQUENCE: 24

Asp Val Val Met Thr Gln Thr Pro Lys Phe Leu Leu Val Ser Ala Gly
1               5                   10                  15

Asp Arg Val Thr Ile Thr Cys Lys Ala Ser Gln Ser Val Ser Asn Asp
            20                  25                  30

Val Ala Trp Tyr Gln Gln Lys Pro Gly Gln Ser Pro Lys Leu Leu Ile
        35                  40                  45

Tyr Tyr Ala Ser Thr Arg Tyr Thr Gly Val Pro Asp Arg Phe Thr Gly
    50                  55                  60

Ser Gly Tyr Gly Thr Asp Phe Thr Phe Thr Ile Ser Thr Val Gln Ala
65                  70                  75                  80

Glu Asp Leu Ala Val Tyr Phe Cys Gln Gln Asp Tyr Ser Ser Leu Thr
                85                  90                  95

Phe Gly Ala Gly Thr Lys Leu Glu Leu Lys Arg Thr Val Ala Ala Pro
            100                 105                 110

Ser Val Phe Ile Phe Pro Pro Ser Asp Glu Gln Leu Lys Ser Gly Thr
        115                 120                 125

Ala Ser Val Val Cys Leu Leu Asn Asn Phe Tyr Pro Arg Glu Ala Lys
    130                 135                 140

Val Gln Trp Lys Val Asp Asn Ala Leu Gln Ser Gly Asn Ser Gln Glu
145                 150                 155                 160

Ser Val Thr Glu Gln Asp Ser Lys Asp Ser Thr Tyr Ser Leu Ser Ser
                165                 170                 175

Thr Leu Thr Leu Ser Lys Ala Asp Tyr Glu Lys His Lys Val Tyr Ala
            180                 185                 190

Cys Glu Val Thr His Gln Gly Leu Ser Ser Pro Val Thr Lys Ser Phe
        195                 200                 205

Asn Arg Gly Glu Cys
    210

<210> SEQ ID NO 25
<211> LENGTH: 216

```
<212> TYPE: PRT
<213> ORGANISM: Artificial Sequence
<220> FEATURE:
<223> OTHER INFORMATION: synthetic

<400> SEQUENCE: 25

Gln Val Gln Leu Val Gln Ser Gly Ala Glu Val Lys Lys Pro Gly Ala
1               5                   10                  15

Ser Val Lys Val Ser Cys Lys Ala Ser Gly Tyr Thr Phe Thr Ser Tyr
            20                  25                  30

Asn Met Tyr Trp Val Arg Gln Ala Pro Gly Gln Arg Leu Glu Trp Met
        35                  40                  45

Gly Tyr Ile Asp Pro Tyr Asn Gly Gly Ser Ser Tyr Asn Leu Thr Phe
    50                  55                  60

Lys Gly Arg Val Thr Ile Thr Arg Asp Thr Ser Ala Ser Thr Ala Tyr
65                  70                  75                  80

Met Glu Leu Ser Ser Leu Arg Ser Glu Asp Thr Ala Val Tyr Tyr Cys
                85                  90                  95

Ala Arg Gly Tyr Gly Asn Tyr Lys Ala Trp Phe Ala Tyr Trp Gly Gln
            100                 105                 110

Gly Thr Leu Val Thr Val Ser Ser Ala Ser Thr Lys Gly Pro Ser Val
        115                 120                 125

Phe Pro Leu Ala Pro Ser Ser Lys Ser Thr Ser Gly Gly Thr Ala Ala
    130                 135                 140

Leu Gly Cys Leu Val Lys Asp Tyr Phe Pro Glu Pro Val Thr Val Ser
145                 150                 155                 160

Trp Asn Ser Gly Ala Leu Thr Ser Gly Val His Thr Phe Pro Ala Val
                165                 170                 175

Leu Gln Ser Ser Gly Leu Tyr Ser Leu Ser Ser Val Val Thr Val Pro
            180                 185                 190

Ser Ser Ser Leu Gly Thr Gln Thr Tyr Ile Cys Asn Val Asn His Lys
        195                 200                 205

Pro Ser Asn Thr Lys Val Asp Lys
    210                 215

<210> SEQ ID NO 26
<211> LENGTH: 213
<212> TYPE: PRT
<213> ORGANISM: Artificial Sequence
<220> FEATURE:
<223> OTHER INFORMATION: synthetic

<400> SEQUENCE: 26

Asp Ile Gln Met Thr Gln Ser Pro Ser Ser Leu Ser Ala Ser Val Gly
1               5                   10                  15

Asp Arg Val Thr Ile Thr Cys Lys Ala Ser Gln Ser Val Ser Asn Asp
            20                  25                  30

Val Ala Trp Tyr Gln Gln Lys Pro Gly Lys Ala Pro Lys Leu Leu Ile
        35                  40                  45

Tyr Tyr Ala Ser Thr Arg Tyr Thr Gly Val Pro Ser Arg Phe Ser Gly
    50                  55                  60

Ser Gly Ser Gly Thr Asp Phe Thr Phe Thr Ile Ser Ser Leu Gln Pro
65                  70                  75                  80

Glu Asp Ile Ala Thr Tyr Tyr Cys Gln Gln Asp Tyr Ser Ser Leu Thr
                85                  90                  95

Phe Gly Gln Gly Thr Lys Leu Glu Ile Lys Arg Thr Val Ala Ala Pro
            100                 105                 110
```

Ser Val Phe Ile Phe Pro Pro Ser Asp Glu Gln Leu Lys Ser Gly Thr
            115                 120                 125

Ala Ser Val Val Cys Leu Leu Asn Asn Phe Tyr Pro Arg Glu Ala Lys
    130                 135                 140

Val Gln Trp Lys Val Asp Asn Ala Leu Gln Ser Gly Asn Ser Gln Glu
145                 150                 155                 160

Ser Val Thr Glu Gln Asp Ser Lys Asp Ser Thr Tyr Ser Leu Ser Ser
                165                 170                 175

Thr Leu Thr Leu Ser Lys Ala Asp Tyr Glu Lys His Lys Val Tyr Ala
            180                 185                 190

Cys Glu Val Thr His Gln Gly Leu Ser Ser Pro Val Thr Lys Ser Phe
            195                 200                 205

Asn Arg Gly Glu Cys
            210

<210> SEQ ID NO 27
<211> LENGTH: 120
<212> TYPE: PRT
<213> ORGANISM: Artificial Sequence
<220> FEATURE:
<223> OTHER INFORMATION: synthetic

<400> SEQUENCE: 27

Gln Ile Gln Leu Gln Gln Ser Gly Pro Glu Leu Val Lys Pro Gly Ala
1               5                   10                  15

Ser Val Lys Val Ser Cys Lys Ala Ser Gly Tyr Ala Phe Ala Ser Tyr
            20                  25                  30

Asn Met Asn Trp Val Lys Gln Ser His Gly Lys Ser Leu Asp Trp Ile
        35                  40                  45

Gly Tyr Ile Asp Pro Tyr Asn Gly Gly Ser Ser Tyr Asn Leu Thr Phe
    50                  55                  60

Lys Gly Lys Ala Thr Leu Thr Val Asp Lys Ser Ser Thr Thr Ala Tyr
65                  70                  75                  80

Met His Leu Asn Ser Leu Thr Ser Glu Asp Ser Ala Val Tyr Tyr Cys
                85                  90                  95

Ala Arg Gly Tyr Gly Asn Tyr Lys Ala Trp Phe Ala Tyr Trp Gly Gln
            100                 105                 110

Gly Thr Leu Val Thr Val Ser Ala
        115                 120

<210> SEQ ID NO 28
<211> LENGTH: 106
<212> TYPE: PRT
<213> ORGANISM: Artificial Sequence
<220> FEATURE:
<223> OTHER INFORMATION: synthetic

<400> SEQUENCE: 28

Asp Val Val Met Thr Gln Thr Pro Lys Phe Leu Leu Val Ser Ala Gly
1               5                   10                  15

Asp Arg Val Thr Ile Thr Cys Lys Ala Ser Gln Ser Val Ser Asn Asp
            20                  25                  30

Val Ala Trp Tyr Gln Gln Lys Pro Gly Gln Ser Pro Lys Leu Leu Ile
        35                  40                  45

Tyr Tyr Ala Ser Thr Arg Tyr Thr Gly Val Pro Asp Arg Phe Thr Gly
    50                  55                  60

Ser Gly Tyr Gly Thr Asp Phe Thr Phe Thr Ile Ser Thr Val Gln Ala

```
                65                  70                  75                  80
Glu Asp Leu Ala Val Tyr Phe Cys Gln Gln Asp Tyr Ser Ser Leu Thr
                    85                  90                  95

Phe Gly Ala Gly Thr Lys Leu Glu Leu Lys
                100                 105
```

<210> SEQ ID NO 29
<211> LENGTH: 120
<212> TYPE: PRT
<213> ORGANISM: Artificial Sequence
<220> FEATURE:
<223> OTHER INFORMATION: synthetic

<400> SEQUENCE: 29

```
Gln Ile Gln Leu Val Gln Ser Gly Ala Glu Val Lys Lys Pro Gly Ala
1               5                   10                  15

Ser Val Lys Val Ser Cys Lys Ala Ser Gly Tyr Thr Phe Thr Ser Tyr
                20                  25                  30

Asn Met Tyr Trp Val Arg Gln Ala Pro Gly Gln Arg Leu Glu Trp Met
            35                  40                  45

Gly Tyr Ile Asp Pro Tyr Asn Gly Gly Ser Ser Tyr Asn Leu Thr Phe
        50                  55                  60

Lys Gly Arg Val Thr Ile Thr Arg Asp Lys Ser Ala Ser Thr Ala Tyr
65                  70                  75                  80

Met Glu Leu Ser Ser Leu Arg Ser Glu Asp Thr Ala Val Tyr Tyr Cys
                85                  90                  95

Ala Arg Gly Tyr Gly Asn Tyr Lys Ala Trp Phe Ala Tyr Trp Gly Gln
                100                 105                 110

Gly Thr Leu Val Thr Val Ser Ser
            115                 120
```

<210> SEQ ID NO 30
<211> LENGTH: 120
<212> TYPE: PRT
<213> ORGANISM: Artificial Sequence
<220> FEATURE:
<223> OTHER INFORMATION: synthetic

<400> SEQUENCE: 30

```
Gln Ile Gln Leu Val Gln Ser Gly Ala Glu Val Lys Lys Pro Gly Ala
1               5                   10                  15

Ser Val Lys Val Ser Cys Lys Ala Ser Gly Tyr Ala Phe Thr Ser Tyr
                20                  25                  30

Asn Met Tyr Trp Val Arg Gln Ala Pro Gly Gln Ser Leu Glu Trp Met
            35                  40                  45

Gly Tyr Ile Asp Pro Tyr Asn Gly Gly Ser Ser Tyr Asn Leu Thr Phe
        50                  55                  60

Lys Gly Arg Val Thr Ile Thr Val Asp Lys Ser Ala Ser Thr Ala Tyr
65                  70                  75                  80

Met Glu Leu Ser Ser Leu Arg Ser Glu Asp Thr Ala Val Tyr Tyr Cys
                85                  90                  95

Ala Arg Gly Tyr Gly Asn Tyr Lys Ala Trp Phe Ala Tyr Trp Gly Gln
                100                 105                 110

Gly Thr Leu Val Thr Val Ser Ser
            115                 120
```

<210> SEQ ID NO 31
<211> LENGTH: 120

```
<212> TYPE: PRT
<213> ORGANISM: Artificial Sequence
<220> FEATURE:
<223> OTHER INFORMATION: synthetic

<400> SEQUENCE: 31

Gln Ile Gln Leu Val Gln Ser Gly Ala Glu Val Lys Lys Pro Gly Ala
1               5                   10                  15

Ser Val Lys Val Ser Cys Lys Ala Ser Gly Tyr Ala Phe Thr Ser Tyr
            20                  25                  30

Asn Met Tyr Trp Val Arg Gln Ala Pro Gly Gln Ser Leu Glu Trp Ile
        35                  40                  45

Gly Tyr Ile Asp Pro Tyr Asn Gly Gly Ser Ser Tyr Asn Leu Thr Phe
    50                  55                  60

Lys Gly Lys Ala Thr Ile Thr Val Asp Lys Ser Ala Ser Thr Ala Tyr
65                  70                  75                  80

Met Glu Leu Ser Ser Leu Arg Ser Glu Asp Thr Ala Val Tyr Tyr Cys
                85                  90                  95

Ala Arg Gly Tyr Gly Asn Tyr Lys Ala Trp Phe Ala Tyr Trp Gly Gln
            100                 105                 110

Gly Thr Leu Val Thr Val Ser Ser
        115                 120

<210> SEQ ID NO 32
<211> LENGTH: 120
<212> TYPE: PRT
<213> ORGANISM: Artificial Sequence
<220> FEATURE:
<223> OTHER INFORMATION: synthetic

<400> SEQUENCE: 32

Gln Ile Gln Leu Val Gln Ser Gly Ala Glu Val Lys Lys Pro Gly Ala
1               5                   10                  15

Ser Val Lys Val Ser Cys Lys Ala Ser Gly Tyr Ala Phe Ala Ser Tyr
            20                  25                  30

Asn Met Tyr Trp Val Arg Gln Ala Pro Gly Gln Ser Leu Glu Trp Ile
        35                  40                  45

Gly Tyr Ile Asp Pro Tyr Asn Gly Gly Ser Ser Tyr Asn Leu Thr Phe
    50                  55                  60

Lys Gly Lys Ala Thr Leu Thr Val Asp Lys Ser Ala Ser Thr Ala Tyr
65                  70                  75                  80

Met Glu Leu Ser Ser Leu Arg Ser Glu Asp Thr Ala Val Tyr Tyr Cys
                85                  90                  95

Ala Arg Gly Tyr Gly Asn Tyr Lys Ala Trp Phe Ala Tyr Trp Gly Gln
            100                 105                 110

Gly Thr Leu Val Thr Val Ser Ser
        115                 120

<210> SEQ ID NO 33
<211> LENGTH: 106
<212> TYPE: PRT
<213> ORGANISM: Artificial Sequence
<220> FEATURE:
<223> OTHER INFORMATION: synthetic

<400> SEQUENCE: 33

Asp Ile Gln Met Thr Gln Ser Pro Ser Ser Leu Ser Ala Ser Val Gly
1               5                   10                  15

Asp Arg Val Thr Ile Thr Cys Lys Ala Ser Gln Ser Val Ser Asn Asp
```

```
                    20                  25                  30

Val Ala Trp Tyr Gln Gln Lys Pro Gly Lys Ala Pro Lys Leu Leu Ile
            35                  40                  45

Tyr Tyr Ala Ser Thr Arg Tyr Thr Gly Val Pro Ser Arg Phe Ser Gly
        50                  55                  60

Ser Gly Tyr Gly Thr Asp Phe Thr Phe Thr Ile Ser Ser Leu Gln Pro
65                  70                  75                  80

Glu Asp Ile Ala Thr Tyr Tyr Cys Gln Gln Asp Tyr Ser Ser Leu Thr
                85                  90                  95

Phe Gly Gln Gly Thr Lys Leu Glu Ile Lys
            100                 105

<210> SEQ ID NO 34
<211> LENGTH: 106
<212> TYPE: PRT
<213> ORGANISM: Artificial Sequence
<220> FEATURE:
<223> OTHER INFORMATION: synthetic

<400> SEQUENCE: 34

Asp Ile Gln Met Thr Gln Ser Pro Ser Ser Leu Ser Ala Ser Val Gly
1               5                   10                  15

Asp Arg Val Thr Ile Thr Cys Lys Ala Ser Gln Ser Val Ser Asn Asp
            20                  25                  30

Val Ala Trp Tyr Gln Gln Lys Pro Gly Lys Ala Pro Lys Leu Leu Ile
            35                  40                  45

Tyr Tyr Ala Ser Thr Arg Tyr Thr Gly Val Pro Asp Arg Phe Ser Gly
        50                  55                  60

Ser Gly Tyr Gly Thr Asp Phe Thr Phe Thr Ile Ser Ser Leu Gln Pro
65                  70                  75                  80

Glu Asp Ile Ala Thr Tyr Tyr Cys Gln Gln Asp Tyr Ser Ser Leu Thr
                85                  90                  95

Phe Gly Gln Gly Thr Lys Leu Glu Ile Lys
            100                 105

<210> SEQ ID NO 35
<211> LENGTH: 106
<212> TYPE: PRT
<213> ORGANISM: Artificial Sequence
<220> FEATURE:
<223> OTHER INFORMATION: Synthetic

<400> SEQUENCE: 35

Asp Val Gln Met Thr Gln Ser Pro Ser Ser Leu Ser Ala Ser Val Gly
1               5                   10                  15

Asp Arg Val Thr Ile Thr Cys Lys Ala Ser Gln Ser Val Ser Asn Asp
            20                  25                  30

Val Ala Trp Tyr Gln Gln Lys Pro Gly Lys Ala Pro Lys Leu Leu Ile
            35                  40                  45

Tyr Tyr Ala Ser Thr Arg Tyr Thr Gly Val Pro Asp Arg Phe Ser Gly
        50                  55                  60

Ser Gly Tyr Gly Thr Asp Phe Thr Phe Thr Ile Ser Ser Leu Gln Pro
65                  70                  75                  80

Glu Asp Ile Ala Thr Tyr Tyr Cys Gln Gln Asp Tyr Ser Ser Leu Thr
                85                  90                  95

Phe Gly Gln Gly Thr Lys Leu Glu Ile Lys
            100                 105
```

```
<210> SEQ ID NO 36
<211> LENGTH: 106
<212> TYPE: PRT
<213> ORGANISM: Artificial Sequence
<220> FEATURE:
<223> OTHER INFORMATION: Synthetic

<400> SEQUENCE: 36

Asp Val Gln Met Thr Gln Ser Pro Ser Leu Ser Ala Ser Val Gly
1               5                   10                  15

Asp Arg Val Thr Ile Thr Cys Lys Ala Ser Gln Ser Val Ser Asn Asp
                20                  25                  30

Val Ala Trp Tyr Gln Gln Lys Pro Gly Lys Ala Pro Lys Leu Leu Ile
            35                  40                  45

Tyr Tyr Ala Ser Thr Arg Tyr Thr Gly Val Pro Asp Arg Phe Ser Gly
    50                  55                  60

Ser Gly Tyr Gly Thr Asp Phe Thr Phe Thr Ile Ser Ser Leu Gln Pro
65                  70                  75                  80

Glu Asp Ile Ala Thr Tyr Phe Cys Gln Gln Asp Tyr Ser Ser Leu Thr
                85                  90                  95

Phe Gly Gln Gly Thr Lys Leu Glu Ile Lys
            100                 105

<210> SEQ ID NO 37
<211> LENGTH: 120
<212> TYPE: PRT
<213> ORGANISM: Artificial Sequence
<220> FEATURE:
<223> OTHER INFORMATION: Synthetic

<400> SEQUENCE: 37

Gln Ile Gln Leu Val Gln Ser Gly Ala Glu Val Lys Lys Pro Gly Ala
1               5                   10                  15

Ser Val Lys Val Ser Cys Lys Ala Ser Gly Tyr Thr Phe Ala Ser Tyr
                20                  25                  30

Asn Met Tyr Trp Val Arg Gln Ala Pro Gly Gln Arg Leu Glu Trp Ile
            35                  40                  45

Gly Tyr Ile Asp Pro Tyr Asn Gly Gly Ser Ser Tyr Asn Leu Thr Phe
    50                  55                  60

Lys Gly Arg Val Thr Leu Thr Arg Asp Lys Ser Ala Ser Thr Ala Tyr
65                  70                  75                  80

Met Glu Leu Ser Ser Leu Arg Ser Glu Asp Thr Ala Val Tyr Tyr Cys
                85                  90                  95

Ala Arg Gly Tyr Gly Asn Tyr Lys Ala Trp Phe Ala Tyr Trp Gly Gln
            100                 105                 110

Gly Thr Leu Val Thr Val Ser Ser
        115                 120

<210> SEQ ID NO 38
<211> LENGTH: 450
<212> TYPE: PRT
<213> ORGANISM: Artificial Sequence
<220> FEATURE:
<223> OTHER INFORMATION: synthetic

<400> SEQUENCE: 38

Gln Ile Gln Leu Val Gln Ser Gly Ala Glu Val Lys Lys Pro Gly Ala
1               5                   10                  15

Ser Val Lys Val Ser Cys Lys Ala Ser Gly Tyr Thr Phe Ala Ser Tyr
```

```
                20                  25                  30
Asn Met Tyr Trp Val Arg Gln Ala Pro Gly Gln Arg Leu Glu Trp Ile
            35                  40                  45
Gly Tyr Ile Asp Pro Tyr Asn Gly Ser Ser Tyr Asn Leu Thr Phe
        50                  55                  60
Lys Gly Arg Val Thr Leu Thr Arg Asp Lys Ser Ala Ser Thr Ala Tyr
65                  70                  75                  80
Met Glu Leu Ser Ser Leu Arg Ser Glu Asp Thr Ala Val Tyr Tyr Cys
                85                  90                  95
Ala Arg Gly Tyr Gly Asn Tyr Lys Ala Trp Phe Ala Tyr Trp Gly Gln
            100                 105                 110
Gly Thr Leu Val Thr Val Ser Ser Ala Ser Thr Lys Gly Pro Ser Val
        115                 120                 125
Phe Pro Leu Ala Pro Ser Ser Lys Ser Thr Ser Gly Gly Thr Ala Ala
        130                 135                 140
Leu Gly Cys Leu Val Lys Asp Tyr Phe Pro Glu Pro Val Thr Val Ser
145                 150                 155                 160
Trp Asn Ser Gly Ala Leu Thr Ser Gly Val His Thr Phe Pro Ala Val
            165                 170                 175
Leu Gln Ser Ser Gly Leu Tyr Ser Leu Ser Ser Val Val Thr Val Pro
            180                 185                 190
Ser Ser Ser Leu Gly Thr Gln Thr Tyr Ile Cys Asn Val Asn His Lys
            195                 200                 205
Pro Ser Asn Thr Lys Val Asp Lys Arg Val Glu Pro Lys Ser Cys Asp
        210                 215                 220
Lys Thr His Thr Cys Pro Pro Cys Pro Ala Pro Glu Ala Glu Gly Ala
225                 230                 235                 240
Pro Ser Val Phe Leu Phe Pro Pro Lys Pro Lys Asp Thr Leu Met Ile
            245                 250                 255
Ser Arg Thr Pro Glu Val Thr Cys Val Val Val Asp Val Ser His Glu
            260                 265                 270
Asp Pro Glu Val Lys Phe Asn Trp Tyr Val Asp Gly Val Glu Val His
        275                 280                 285
Asn Ala Lys Thr Lys Pro Arg Glu Glu Gln Tyr Asn Ser Thr Tyr Arg
        290                 295                 300
Val Val Ser Val Leu Thr Val Leu His Gln Asp Trp Leu Asn Gly Lys
305                 310                 315                 320
Glu Tyr Lys Cys Lys Val Ser Asn Lys Ala Leu Pro Ser Ser Ile Glu
            325                 330                 335
Lys Thr Ile Ser Lys Ala Lys Gly Gln Pro Arg Glu Pro Gln Val Tyr
            340                 345                 350
Thr Leu Pro Pro Ser Arg Glu Glu Met Thr Lys Asn Gln Val Ser Leu
        355                 360                 365
Thr Cys Leu Val Lys Gly Phe Tyr Pro Ser Asp Ile Ala Val Glu Trp
        370                 375                 380
Glu Ser Asn Gly Gln Pro Glu Asn Asn Tyr Lys Thr Thr Pro Pro Val
385                 390                 395                 400
Leu Asp Ser Asp Gly Ser Phe Phe Leu Tyr Ser Lys Leu Thr Val Asp
            405                 410                 415
Lys Ser Arg Trp Gln Gln Gly Asn Val Phe Ser Cys Ser Val Met His
            420                 425                 430
Glu Ala Leu His Asn His Tyr Thr Gln Lys Ser Leu Ser Leu Ser Pro
        435                 440                 445
```

Gly Lys
    450

<210> SEQ ID NO 39
<211> LENGTH: 213
<212> TYPE: PRT
<213> ORGANISM: Artificial Sequence
<220> FEATURE:
<223> OTHER INFORMATION: synthetic

<400> SEQUENCE: 39

Asp Ile Gln Met Thr Gln Ser Pro Ser Ser Leu Ser Ala Ser Val Gly
1               5                   10                  15

Asp Arg Val Thr Ile Thr Cys Lys Ala Ser Gln Ser Val Ser Asn Asp
            20                  25                  30

Val Ala Trp Tyr Gln Gln Lys Pro Gly Lys Ala Pro Lys Leu Leu Ile
        35                  40                  45

Tyr Tyr Ala Ser Thr Arg Tyr Thr Gly Val Pro Ser Arg Phe Ser Gly
50                  55                  60

Ser Gly Tyr Gly Thr Asp Phe Thr Phe Thr Ile Ser Ser Leu Gln Pro
65                  70                  75                  80

Glu Asp Ile Ala Thr Tyr Tyr Cys Gln Gln Asp Tyr Ser Ser Leu Thr
                85                  90                  95

Phe Gly Gln Gly Thr Lys Leu Glu Ile Lys Arg Thr Val Ala Ala Pro
            100                 105                 110

Ser Val Phe Ile Phe Pro Pro Ser Asp Glu Gln Leu Lys Ser Gly Thr
        115                 120                 125

Ala Ser Val Val Cys Leu Leu Asn Asn Phe Tyr Pro Arg Glu Ala Lys
130                 135                 140

Val Gln Trp Lys Val Asp Asn Ala Leu Gln Ser Gly Asn Ser Gln Glu
145                 150                 155                 160

Ser Val Thr Glu Gln Asp Ser Lys Asp Ser Thr Tyr Ser Leu Ser Ser
                165                 170                 175

Thr Leu Thr Leu Ser Lys Ala Asp Tyr Glu Lys His Lys Val Tyr Ala
            180                 185                 190

Cys Glu Val Thr His Gln Gly Leu Ser Ser Pro Val Thr Lys Ser Phe
        195                 200                 205

Asn Arg Gly Glu Cys
    210

<210> SEQ ID NO 40
<211> LENGTH: 120
<212> TYPE: PRT
<213> ORGANISM: Artificial Sequence
<220> FEATURE:
<223> OTHER INFORMATION: Synthetic

<400> SEQUENCE: 40

Glu Ile Gln Leu Gln Gln Ser Gly Pro Glu Leu Val Lys Pro Gly Ala
1               5                   10                  15

Ser Val Lys Val Ser Cys Lys Ala Ser Gly Tyr Ala Phe Thr Ser Tyr
            20                  25                  30

Asn Met Tyr Trp Val Lys Gln Ser His Gly Lys Arg Leu Glu Trp Ile
        35                  40                  45

Gly Tyr Ile Asp Pro Tyr Asn Gly Gly Ser Ser Tyr Asn Gln Lys Phe
50                  55                  60

Lys Gly Lys Ala Thr Leu Thr Val Asp Lys Ser Ser Ser Thr Ala Tyr

```
                65                   70                  75                  80
Met His Leu Asn Asn Leu Thr Ser Glu Asp Ser Ala Val Tyr Tyr Cys
                        85                  90                  95

Ala Arg Gly Tyr Asn Asn Tyr Lys Ala Trp Phe Ala Tyr Trp Gly Gln
                100                 105                 110

Gly Thr Leu Val Thr Val Ser Ala
            115                 120

<210> SEQ ID NO 41
<211> LENGTH: 106
<212> TYPE: PRT
<213> ORGANISM: Artificial Sequence
<220> FEATURE:
<223> OTHER INFORMATION: Synthetic

<400> SEQUENCE: 41

Asp Val Val Met Thr Gln Thr Pro Lys Phe Leu Leu Val Ser Ala Gly
1               5                   10                  15

Asp Arg Val Thr Ile Thr Cys Lys Ala Ser Gln Ser Val Thr Asn Asp
                20                  25                  30

Val Ala Trp Tyr Gln Gln Lys Pro Gly Gln Ser Pro Lys Leu Leu Ile
            35                  40                  45

Tyr Tyr Ala Ser Asn Arg Tyr Thr Gly Val Pro Asp Arg Phe Thr Gly
    50                  55                  60

Ser Gly Tyr Gly Thr Asp Phe Thr Phe Thr Ile Ser Thr Met Gln Ala
65                  70                  75                  80

Glu Asp Leu Ala Val Tyr Phe Cys Gln Gln Asp Tyr Ser Ser Leu Thr
                85                  90                  95

Phe Gly Ala Gly Thr Lys Leu Glu Leu Lys
                100                 105

<210> SEQ ID NO 42
<211> LENGTH: 120
<212> TYPE: PRT
<213> ORGANISM: Artificial Sequence
<220> FEATURE:
<223> OTHER INFORMATION: synthetic

<400> SEQUENCE: 42

Gln Ile Gln Leu Val Gln Ser Gly Ala Glu Val Lys Lys Pro Gly Ala
1               5                   10                  15

Ser Val Lys Val Ser Cys Lys Ala Ser Gly Tyr Thr Phe Ala Ser Tyr
                20                  25                  30

Asn Met Tyr Trp Val Arg Gln Ala Pro Gly Gln Arg Leu Glu Trp Ile
            35                  40                  45

Gly Tyr Ile Asp Pro Tyr Asn Gly Gly Ser Ser Tyr Asn Gln Lys Phe
    50                  55                  60

Lys Gly Arg Val Thr Leu Thr Arg Asp Lys Ser Ala Ser Thr Ala Tyr
65                  70                  75                  80

Met Glu Leu Ser Ser Leu Arg Ser Glu Asp Thr Ala Val Tyr Tyr Cys
                85                  90                  95

Ala Arg Gly Tyr Asn Asn Tyr Lys Ala Trp Phe Ala Tyr Trp Gly Gln
                100                 105                 110

Gly Thr Leu Val Thr Val Ser Ser
            115                 120

<210> SEQ ID NO 43
<211> LENGTH: 106
```

```
<212> TYPE: PRT
<213> ORGANISM: Artificial Sequence
<220> FEATURE:
<223> OTHER INFORMATION: Synthetic

<400> SEQUENCE: 43

Asp Ile Gln Met Thr Gln Ser Pro Ser Ser Leu Ser Ala Ser Val Gly
1               5                   10                  15

Asp Arg Val Thr Ile Thr Cys Lys Ala Ser Gln Ser Val Thr Asn Asp
            20                  25                  30

Val Ala Trp Tyr Gln Gln Lys Pro Gly Lys Ala Pro Lys Leu Leu Ile
        35                  40                  45

Tyr Tyr Ala Ser Asn Arg Tyr Thr Gly Val Pro Ser Arg Phe Ser Gly
    50                  55                  60

Ser Gly Tyr Gly Thr Asp Phe Thr Phe Thr Ile Ser Ser Leu Gln Pro
65                  70                  75                  80

Glu Asp Ile Ala Thr Tyr Tyr Cys Gln Gln Asp Tyr Ser Ser Leu Thr
                85                  90                  95

Phe Gly Gln Gly Thr Lys Leu Glu Ile Lys
            100                 105

<210> SEQ ID NO 44
<211> LENGTH: 106
<212> TYPE: PRT
<213> ORGANISM: Artificial Sequence
<220> FEATURE:
<223> OTHER INFORMATION: Synthetic

<400> SEQUENCE: 44

Asp Ile Gln Met Thr Gln Ser Pro Ser Ser Leu Ser Ala Ser Val Gly
1               5                   10                  15

Asp Arg Val Thr Ile Thr Cys Lys Ala Ser Gln Ser Val Thr Asn Asp
            20                  25                  30

Val Ala Trp Tyr Gln Gln Lys Pro Gly Lys Ala Pro Lys Leu Leu Ile
        35                  40                  45

Tyr Tyr Ala Ser Asn Arg Tyr Thr Gly Val Pro Asp Arg Phe Ser Gly
    50                  55                  60

Ser Gly Tyr Gly Thr Asp Phe Thr Phe Thr Ile Ser Ser Leu Gln Pro
65                  70                  75                  80

Glu Asp Ile Ala Thr Tyr Tyr Cys Gln Gln Asp Tyr Ser Ser Leu Thr
                85                  90                  95

Phe Gly Gln Gly Thr Lys Leu Glu Ile Lys
            100                 105

<210> SEQ ID NO 45
<211> LENGTH: 106
<212> TYPE: PRT
<213> ORGANISM: Artificial Sequence
<220> FEATURE:
<223> OTHER INFORMATION: Synthetic

<400> SEQUENCE: 45

Asp Val Gln Met Thr Gln Ser Pro Ser Ser Leu Ser Ala Ser Val Gly
1               5                   10                  15

Asp Arg Val Thr Ile Thr Cys Lys Ala Ser Gln Ser Val Thr Asn Asp
            20                  25                  30

Val Ala Trp Tyr Gln Gln Lys Pro Gly Lys Ala Pro Lys Leu Leu Ile
        35                  40                  45

Tyr Tyr Ala Ser Asn Arg Tyr Thr Gly Val Pro Asp Arg Phe Ser Gly
```

```
            50                  55                  60
Ser Gly Tyr Gly Thr Asp Phe Thr Phe Thr Ile Ser Ser Leu Gln Pro
 65                  70                  75                  80

Glu Asp Ile Ala Thr Tyr Tyr Cys Gln Gln Asp Tyr Ser Ser Leu Thr
                 85                  90                  95

Phe Gly Gln Gly Thr Lys Leu Glu Ile Lys
                100                 105

<210> SEQ ID NO 46
<211> LENGTH: 106
<212> TYPE: PRT
<213> ORGANISM: Artificial Sequence
<220> FEATURE:
<223> OTHER INFORMATION: Synthetic

<400> SEQUENCE: 46

Asp Val Gln Met Thr Gln Ser Pro Ser Ser Leu Ser Ala Ser Val Gly
  1               5                  10                  15

Asp Arg Val Thr Ile Thr Cys Lys Ala Ser Gln Ser Val Thr Asn Asp
                 20                  25                  30

Val Ala Trp Tyr Gln Gln Lys Pro Gly Lys Ala Pro Lys Leu Leu Ile
             35                  40                  45

Tyr Tyr Ala Ser Asn Arg Tyr Thr Gly Val Pro Asp Arg Phe Ser Gly
         50                  55                  60

Ser Gly Tyr Gly Thr Asp Phe Thr Phe Thr Ile Ser Ser Leu Gln Pro
 65                  70                  75                  80

Glu Asp Ile Ala Thr Tyr Phe Cys Gln Gln Asp Tyr Ser Ser Leu Thr
                 85                  90                  95

Phe Gly Gln Gly Thr Lys Leu Glu Ile Lys
                100                 105

<210> SEQ ID NO 47
<211> LENGTH: 450
<212> TYPE: PRT
<213> ORGANISM: Artificial Sequence
<220> FEATURE:
<223> OTHER INFORMATION: Synthetic

<400> SEQUENCE: 47

Gln Ile Gln Leu Val Gln Ser Gly Ala Glu Val Lys Lys Pro Gly Ala
  1               5                  10                  15

Ser Val Lys Val Ser Cys Lys Ala Ser Gly Tyr Thr Phe Ala Ser Tyr
                 20                  25                  30

Asn Met Tyr Trp Val Arg Gln Ala Pro Gly Gln Arg Leu Glu Trp Ile
             35                  40                  45

Gly Tyr Ile Asp Pro Tyr Asn Gly Gly Ser Ser Tyr Asn Gln Lys Phe
         50                  55                  60

Lys Gly Arg Val Thr Leu Thr Arg Asp Lys Ser Ala Ser Thr Ala Tyr
 65                  70                  75                  80

Met Glu Leu Ser Ser Leu Arg Ser Glu Asp Thr Ala Val Tyr Tyr Cys
                 85                  90                  95

Ala Arg Gly Tyr Asn Asn Tyr Lys Ala Trp Phe Ala Tyr Trp Gly Gln
                100                 105                 110

Gly Thr Leu Val Thr Val Ser Ser Ala Ser Thr Lys Gly Pro Ser Val
            115                 120                 125

Phe Pro Leu Ala Pro Ser Ser Lys Ser Thr Ser Gly Gly Thr Ala Ala
        130                 135                 140
```

```
Leu Gly Cys Leu Val Lys Asp Tyr Phe Pro Glu Pro Val Thr Val Ser
145                 150                 155                 160

Trp Asn Ser Gly Ala Leu Thr Ser Gly Val His Thr Phe Pro Ala Val
            165                 170                 175

Leu Gln Ser Ser Gly Leu Tyr Ser Leu Ser Ser Val Val Thr Val Pro
        180                 185                 190

Ser Ser Ser Leu Gly Thr Gln Thr Tyr Ile Cys Asn Val Asn His Lys
    195                 200                 205

Pro Ser Asn Thr Lys Val Asp Lys Arg Val Glu Pro Lys Ser Cys Asp
210                 215                 220

Lys Thr His Thr Cys Pro Pro Cys Pro Ala Pro Glu Ala Glu Gly Ala
225                 230                 235                 240

Pro Ser Val Phe Leu Phe Pro Pro Lys Pro Lys Asp Thr Leu Met Ile
                245                 250                 255

Ser Arg Thr Pro Glu Val Thr Cys Val Val Val Asp Val Ser His Glu
            260                 265                 270

Asp Pro Glu Val Lys Phe Asn Trp Tyr Val Asp Gly Val Glu Val His
        275                 280                 285

Asn Ala Lys Thr Lys Pro Arg Glu Glu Gln Tyr Asn Ser Thr Tyr Arg
    290                 295                 300

Val Val Ser Val Leu Thr Val Leu His Gln Asp Trp Leu Asn Gly Lys
305                 310                 315                 320

Glu Tyr Lys Cys Lys Val Ser Asn Lys Ala Leu Pro Ser Ser Ile Glu
                325                 330                 335

Lys Thr Ile Ser Lys Ala Lys Gly Gln Pro Arg Glu Pro Gln Val Tyr
            340                 345                 350

Thr Leu Pro Pro Ser Arg Glu Glu Met Thr Lys Asn Gln Val Ser Leu
        355                 360                 365

Thr Cys Leu Val Lys Gly Phe Tyr Pro Ser Asp Ile Ala Val Glu Trp
    370                 375                 380

Glu Ser Asn Gly Gln Pro Glu Asn Asn Tyr Lys Thr Thr Pro Pro Val
385                 390                 395                 400

Leu Asp Ser Asp Gly Ser Phe Phe Leu Tyr Ser Lys Leu Thr Val Asp
                405                 410                 415

Lys Ser Arg Trp Gln Gln Gly Asn Val Phe Ser Cys Ser Val Met His
            420                 425                 430

Glu Ala Leu His Asn His Tyr Thr Gln Lys Ser Leu Ser Leu Ser Pro
        435                 440                 445

Gly Lys
    450

<210> SEQ ID NO 48
<211> LENGTH: 213
<212> TYPE: PRT
<213> ORGANISM: Artificial Sequence
<220> FEATURE:
<223> OTHER INFORMATION: Synthetic

<400> SEQUENCE: 48

Asp Ile Gln Met Thr Gln Ser Pro Ser Ser Leu Ser Ala Ser Val Gly
1               5                   10                  15

Asp Arg Val Thr Ile Thr Cys Lys Ala Ser Gln Ser Val Thr Asn Asp
            20                  25                  30

Val Ala Trp Tyr Gln Gln Lys Pro Gly Lys Ala Pro Lys Leu Leu Ile
        35                  40                  45
```

```
Tyr Tyr Ala Ser Asn Arg Tyr Thr Gly Val Pro Ser Arg Phe Ser Gly
    50                  55                  60

Ser Gly Tyr Gly Thr Asp Phe Thr Phe Thr Ile Ser Ser Leu Gln Pro
65              70                  75                  80

Glu Asp Ile Ala Thr Tyr Tyr Cys Gln Gln Asp Tyr Ser Ser Leu Thr
                85                  90                  95

Phe Gly Gln Gly Thr Lys Leu Glu Ile Lys Arg Thr Val Ala Ala Pro
                100                 105                 110

Ser Val Phe Ile Phe Pro Pro Ser Asp Glu Gln Leu Lys Ser Gly Thr
            115                 120                 125

Ala Ser Val Val Cys Leu Leu Asn Asn Phe Tyr Pro Arg Glu Ala Lys
    130                 135                 140

Val Gln Trp Lys Val Asp Asn Ala Leu Gln Ser Gly Asn Ser Gln Glu
145             150                 155                 160

Ser Val Thr Glu Gln Asp Ser Lys Asp Ser Thr Tyr Ser Leu Ser Ser
                165                 170                 175

Thr Leu Thr Leu Ser Lys Ala Asp Tyr Glu Lys His Lys Val Tyr Ala
            180                 185                 190

Cys Glu Val Thr His Gln Gly Leu Ser Ser Pro Val Thr Lys Ser Phe
        195                 200                 205

Asn Arg Gly Glu Cys
    210
```

CD73 BLOCKING ANTIBODIES

CROSS-REFERENCE TO RELATED APPLICATIONS

This application is a continuation of International Patent Application No. PCT/EP2020/060955, filed on Apr. 20, 2020, which claims the benefit of U.S. Provisional Application No. U.S. 62/837,214, filed Apr. 12, 2019, which are incorporated herein by reference in their entirety, including any drawings.

REFERENCE TO SEQUENCE LISTING

The present application is being filed along with a Sequence Listing in electronic format. The Sequence Listing is provided as a file entitled "Seq-List.txt", created Oct. 20, 2021, which is 62 KB in size. The information in the electronic format of the Sequence Listing is incorporated herein by reference in its entirety.

FIELD OF THE INVENTION

The present invention relates to antibodies, and fragments thereof, that bind and inhibit CD73. The invention also relates to cells producing such compounds; methods of making such compounds, and antibodies, fragments, variants, and derivatives thereof; pharmaceutical compositions comprising the same; methods of using the compounds to diagnose, treat or prevent diseases, e.g., cancer.

BACKGROUND

CD73 (ecto-5'-nucleotidase) is a 70-kDa glycosylphosphatidylinositol (GPI)-anchored protein normally expressed on endothelial cells and subsets of hematopoietic cells. CD73, together with CD39, regulates adenosine triphosphate (ATP) metabolism. CD39 (NTPDase-1) converts ATP into AMP, with only trace amounts of ADP being released, while CD73 catalyzes the conversion of AMP to adenosine.

Adenosine triphosphate (ATP) and its metabolites AMP and adenosine, have important roles in cellular metabolism, signaling and immune homeostasis. The release of extracellular adenosine triphosphates (ATP) in response to cell death or cellular stress acts to activate immune responses. However, its metabolite adenosine has immunosuppressive activity. Extracellular adenosine accumulates in cancerous tissues and constitutes an important mechanism of tumor immune escape. Among other effects, tumor-derived adenosine profoundly inhibits infiltrating effector T cells through adenylyl cyclase-activating A2A receptors.

CD73 expression has been reported in a range of tumor cells, including leukemia, bladder cancer, glioma, glioblastoma, ovarian cancer, melanoma, prostate cancer, thyroid cancer, esophageal cancer and breast cancer. CD73 expression has also been associated with a prometastatic phenotype in melanoma and breast cancer. It has been reported that therapy with an antibody that binds murine CD73 can inhibit breast tumor growth and metastasis in mice (Stagg, et al. (2010) Proc. Natl. Acad. Sci. USA 104:1547-1552). It has been shown that genetic deletion of A2A receptors can induce T cell-dependent tumor rejection (Ohta, et al. (2006) Proc Natl Acad Sci USA 103:13132-13137). Knock-down using siRNA or overexpression of CD73 on tumor cells can modulate tumor growth and metastasis (Beavis et al. (2013 Proc. Natl. Acad. Sci. USA 110:14711-716; Stagg et al. (2010), supra; Jin et al. (2010) Cancer Res. 70: 2245-55). CD73–/– mice are protected from transplanted and spontaneous tumors (Stagg et al. (2010) Cancer Res. 71: 2892-2900). In humans, high CD73 expression had been shown to be a negative prognostic for triple negative breast cancer (Loi et al. (2013 Proc. Natl. Acad. Sci. USA 110: 11091-11096). However, while CD73 is expressed on tumor cells, it is also expressed on different cells of the immune system, notably CD4 and CD8 T cells, as well as B cells. Additionally, one further complicating factor is that many of the antibodies described in the literature have generally been of murine isotypes that are capable of being bound by FCγ receptors, making it difficult to separate any potential blocking effect from Fc-mediated effects.

Despite the long-standing interest in CD73 as a therapeutic target, there remains a need for antibodies with higher potency in inhibition of the enzymatic activity of CD73 and that are suitable for use in human therapy.

SUMMARY OF THE INVENTION

The inventors provide antibodies that bind an epitope present on CD73 expressed at the surface of cells, including tumor cells, and that inhibit the enzymatic (ecto-5' nucleotidase) activity of the CD73 enzyme. The antibodies have human-derived framework regions with minimal non-human (e.g. mouse) sequence content. The antibodies can bind CD73 in an intra-dimer mode and can inhibit the enzymatic activity of both soluble CD73 and membrane-bound CD73 protein expressed at the surface of cells. Advantageously, these antibodies can be used as pure CD73 blocking antibodies, e.g., they inhibit the enzymatic activity of membrane-bound CD73 protein expressed at the surface of cells without substantially binding Fcγ receptors and/or without substantially directing ADCC toward a CD73-expressing cell. Optionally, the antibodies retain an Fc domain and retain binding to human FcRn. The antibodies can advantageously have low risk of immunogenicity, e.g. low or decreased (compared to a murine parental antibody) likelihood to induce a human anti-mouse antibody (HAMA) response when administered to a human.

The antibodies bind an epitope present on human CD73 polypeptide expressed at the surface of cells, including but not limited to tumor cells, and inhibit the enzymatic (ecto-5' nucleotidase) activity of the CD73 enzyme. They have a particularly advantageous ability to inhibit the suppression of T cell proliferation mediated by CD73, and consequently can cause an increase in the biological activity, including but not limited to proliferation, of cytotoxic CD4 and/or CD8 T cells, for example as observed in a T cell proliferation assay. In one embodiment, inhibition or neutralization of the enzymatic activity of CD73 is determined by assessing the ability of an antibody of antibody fragment to increase the proliferation of T cells when said T cells are induced to proliferate in vitro (e.g. via TCR co-stimulation) in the presence of AMP (e.g. exogenously added AMP).

In one embodiment, provided is an antibody or antibody fragment, or an antigen binding domain thereof, comprising a heavy chain variable region comprising the amino acid sequence of SEQ ID NO: 37 and a light chain variable region comprising an amino acid sequence selected from the group consisting of the amino acid sequences of SEQ ID NOS: 33, 34, 35 or 36. In one embodiment, provided is an antibody or antibody fragment, or an antigen binding domain thereof, comprising a heavy chain variable region comprising the amino acid sequence of SEQ ID NO: 37 and a light chain variable region comprising the amino acid sequence of SEQ ID NO: 33.

In one embodiment, provided is an antibody or antibody fragment, or an antigen binding domain thereof, comprising a heavy chain variable region comprising the amino acid sequence of SEQ ID NO: 42 and a light chain variable region comprising an amino acid sequence selected from the group consisting of the amino acid sequences of SEQ ID NOS: 43, 44, 45, or 46. In one embodiment, provided is an antibody or antibody fragment, or an antigen binding domain thereof, comprising a heavy chain variable region comprising the amino acid sequence of SEQ ID NO: 42 and a light chain variable region comprising the amino acid sequence of SEQ ID NO: 43.

In one embodiment, provided is an anti-CD73 antibody or antibody fragment comprising a heavy chain comprising the amino acid sequence of SEQ ID NO: 38 and a light chain comprising the amino acid sequence of SEQ ID NO: 39.

In one embodiment, provided is an anti-CD73 antibody or antibody fragment comprising a heavy chain comprising the amino acid sequence of SEQ ID NO: 47 and a light chain comprising the amino acid sequence of SEQ ID NO: 48.

In one embodiment, provided is an anti-CD73 antigen binding domain, or a protein that comprises such (e.g., an antibody or antibody fragment, a multispecific binding protein, a bispecific antibody, etc.), comprising a heavy chain variable region (VH) comprising a CDR1, CDR2 and CDR3 having the respective amino acid sequences shown in SEQ ID NOS: 2, 3 and 4 and framework FR1, FR2 and FR3 amino acid sequences from the human IGHV1-3 gene (and optionally further framework 4 (FR4) amino acid sequences from the human IGHJ4 gene); and a light chain variable region (VL) CDR1, CDR2 and CDR3 having the respective amino acid sequences shown in SEQ ID NOS: 5, 6 and 7, and framework FR1, FR2 and FR3 amino acid sequences from the human IGKV1-33 gene (and optionally further framework 4 (FR4) amino acid sequences from the human IGKJ2 gene). Optionally the residue present in the heavy chain variable region at Kabat position 59 (HCDR2) is a leucine or a glutamine residue. Optionally the residue present in the heavy chain variable region at Kabat position 60 (HCDR2) is threonine or a lysine residue. Optionally the residue present in the heavy chain variable region at Kabat position 97 (HCDR3) is a glycine or an asparagine residue. Optionally the residue present in the light chain variable region at Kabat position 30 (LCDR1) is a serine or a threonine residue. Optionally the residue present in the light chain variable region at Kabat position 53 (LCDR2) is a threonine or an asparagine residue.

In one embodiment, provided is an anti-CD73 antigen binding domain, or a protein that comprises such (e.g., an antibody or antibody fragment, a multispecific binding protein, a bispecific antibody, etc.), comprising a heavy chain variable region (VH) comprising a CDR1, CDR2 and CDR3 having the respective amino acid sequences shown in SEQ ID NOS: 2, 8 and 9 and framework FR1, FR2 and FR3 amino acid sequences from the human IGHV1-3 gene (and optionally further framework 4 (FR4) amino acid sequences from the human IGHJ4 gene); and a light chain variable region (VL) CDR1, CDR2 and CDR3 having the respective amino acid sequences shown in SEQ ID NOS: 10, 11 and 7, and framework FR1, FR2 and FR3 amino acid sequences from the human IGKV1-33 gene (and optionally further framework 4 (FR4) amino acid sequences from the human IGKJ2 gene). In one embodiment, the VH further comprises one, two or three of the amino acid substitutions in the Kabat heavy chain CDRs at Kabat heavy chain positions selected from the group consisting of 59 (HCDR2), 60 (HCDR2) and 97 (HCDR3). Optionally the leucine residue at position 59 is substituted by a glutamine residue. Optionally the threonine residue at position 60 is substituted by a lysine residue. Optionally the glycine residue at position 97 is substituted by an asparagine residue. In one embodiment, the VL further comprises an amino acid substitution in the Kabat light chain CDRs at Kabat light chain positions 30 (LCDR1) and/or 53 (LCDR2), optionally further wherein the serine residue at position 30 is substituted by a threonine residue, optionally further wherein the threonine residue at position 53 is substituted by an asparagine residue.

In one embodiment, provided is an anti-CD73 antigen binding domain, or a protein that comprises such (e.g., an antibody or antibody fragment, a multispecific binding protein, a bispecific antibody, etc.), comprising a heavy chain variable region (VH) comprising a CDR1, CDR2 and CDR3 having the respective amino acid sequences shown in SEQ ID NOS: 2, 12 and 13 and framework FR1, FR2 and FR3 amino acid sequences from the human IGHV1-3 gene (and optionally further framework 4 (FR4) amino acid sequences from the human IGHJ4 gene); and a light chain variable region (VL) CDR1, CDR2 and CDR3 having the respective amino acid sequences shown in SEQ ID NOS: 14, 15 and 7, and framework FR1, FR2 and FR3 amino acid sequences from the human IGKV1-33 gene (and optionally further framework 4 (FR4) amino acid sequences from the human IGKJ2 gene).

In one aspect of any embodiment herein, a heavy chain variable region (VH) can be characterized by comprising one, two, three, four or five amino acid substitutions at Kabat heavy chain positions selected from the group consisting of 2, 30, 48, 69 and 73, optionally wherein the residue present in a human sequence at the particular position is replaced by the residue present in the murine donor sequence at that particular position; and a light chain variable region (VL) can be characterized by comprising an amino acid substitution at Kabat light chain position 67, optionally wherein the residue present in a human sequence at the particular position is replaced by the residue present in a murine donor sequence at that particular position. In one embodiment, the VL comprises a substitution at Kabat light chain position 67, and optionally further one, two or three amino acid substitutions at Kabat light chain positions selected from the group consisting of 2, 67 and 87, optionally wherein the residue present in a human sequence at the particular position is replaced by the residue present in the murine donor sequence at that particular position. In one embodiment, an antibody or antibody binding domain comprises a heavy chain variable region comprising the amino acid substitutions V2I, T30A, M48I, I69L and T73K and a light chain variable region comprising the amino acid substitution S67Y, wherein numbering is according to Kabat.

In one aspect of any embodiment herein, the amino acid at Kabat heavy chain position 2 is an isoleucine.

In one aspect of any embodiment herein, the amino acid at Kabat heavy chain position 30 is an alanine.

In one aspect of any embodiment herein, the amino acid at Kabat heavy chain position 48 is an isoleucine.

In one aspect of any embodiment herein, the amino acid at Kabat heavy chain position 69 is a leucine.

In one aspect of any embodiment herein, the amino acid at Kabat heavy chain position 73 is a lysine.

In one embodiment, a VH comprises an isoleucine residue at Kabat position 2, an alanine at position 30, an isoleucine at position 48, a leucine at position 69 and a lysine at position 73.

In one aspect of any embodiment herein, the amino acid at Kabat light chain position 67 is a tyrosine.

In one aspect of any embodiment herein, the amino acid at Kabat light chain position 60 is an aspartic acid.

In one aspect of any embodiment herein, the amino acid at Kabat light chain position 2 is an isoleucine.

In one aspect of any embodiment herein, the amino acid at Kabat light chain position 87 is a phenylalanine.

In one embodiment, a VL comprises a tyrosine residue at Kabat position 67; optionally the VL comprises no other substitutions in the Kabat framework by non-human residues and/or has a VL Kabat framework that is fully human other than a substitution at residue 67.

In one embodiment, a VL comprises a tyrosine residue at Kabat position 67 and an aspartic acid at position 60.

In one embodiment, a VL comprises a tyrosine residue at Kabat position 67, an aspartic acid at position 60 and an isoleucine at position 2.

In one embodiment, a VL comprises a tyrosine residue at Kabat position 67, an aspartic acid at position 60, an isoleucine at position 2, and a phenylalanine at position 87.

In one embodiment, provided is an anti-CD73 antigen binding domain, or a protein that comprises the antigen binding domain (e.g., an antibody or antibody fragment, a multispecific binding protein, a bispecific antibody, etc.), comprising a heavy chain variable region (VH) comprising an amino acid sequence at least 80%, 90%, 95%, 97%, 98% or 99% identical to the amino acid sequence of SEQ ID NO: 37, and a light chain variable region (VL) comprising an amino acid sequence at least 80%, 90%, 95%, 97%, 98% or 99% identical to the amino acid sequence of any of SEQ ID NOS: 33, 34, 35 or 36. In one embodiment, the VH comprises a CDR1, CDR2 and CDR3 having the respective amino acid sequences shown in SEQ ID NOS: 2, 12 and 13 and the VL comprises a CDR1, CDR2 and CDR3 having the respective amino acid sequences shown in SEQ ID NOS: 14, 15 and 7. In one embodiment, the VH comprises an isoleucine residue at Kabat position 2, an alanine at position 30, an isoleucine at position 48, a leucine at position 69 and a lysine at position 73. In one embodiment, the VL comprises a tyrosine residue at Kabat position 67.

In one embodiment, provided is an anti-CD73 antigen binding domain or a protein that comprises the antigen binding domain (e.g., an antibody or antibody fragment, a multispecific binding protein, a bispecific antibody, etc.), comprising a heavy chain variable region (VH) comprising CDR1, CDR2 and CDR3 having the respective amino acid sequences shown in SEQ ID NOS: 2, 3 and 4 and human frameworks (e.g., FR1, FR2, FR3 and FR4 of human origin); and a light chain variable region (VL) CDR1, CDR2 and CDR3 comprising the respective amino acid sequences shown in SEQ ID NOS: 5, 6 and 7 and human frameworks (e.g., FR1, FR2, FR3 and FR4 of human origin), wherein the (VH) comprises an amino acid sequence at least 80%, 90%, 95%, 97%, 98% or 99% identical to the amino acid sequence of SEQ ID NOS: 37 or 42, and a light chain variable region (VL) comprising an amino acid sequence at least 80%, 90%, 95%, 97%, 98% or 99% identical to the amino acid sequence of any of SEQ ID NOS: 33-36 or 43-46). Optionally the residue present in the heavy chain variable region at Kabat position 59 (HCDR2) is a leucine or a glutamine residue. Optionally the residue present in the heavy chain variable region at Kabat position 60 (HCDR2) is threonine or a lysine residue. Optionally the residue present in the heavy chain variable region at Kabat position 97 (HCDR3) is a glycine or an asparagine residue. Optionally the residue present in the light chain variable region at Kabat position 30 (LCDR1) is a serine or a threonine residue. Optionally the residue present in the light chain variable region at Kabat position 53 (LCDR2) is a threonine or an asparagine residue. In one embodiment, the VH comprises an isoleucine residue at Kabat position 2, an alanine at position 30, an isoleucine at position 48, a leucine at position 69 and a lysine at position 73. In one embodiment, the VL comprises a tyrosine residue at Kabat position 67.

In any embodiment, the VH can be characterized as comprising a human VH acceptor framework amino acid sequences, and the VL comprises human VL acceptor framework amino acid sequences. In one embodiment, the VH segment of the VH human acceptor framework is from a human IGHV1-3 gene segment and the J-segment is from a human IGHJ4 gene segment. In one embodiment, the VH human acceptor framework is from a human IGHV1-3*01 gene segment. In one embodiment, the VL domain human acceptor framework is from a human IGKV1-33 gene segment, optionally the VL domain human acceptor framework is from a human IGKV1-33*01 gene segment. In one embodiment, the VL domain human acceptor framework comprises the J-segment from a human IGKJ2 gene segment.

In one embodiment, an antibody or antibody fragment comprises a H4+ VH domain and a L1, L2, L3 or L4 VL domain. In one embodiment, the antibody is antibody H4+L1.

In one embodiment, provided is an anti-CD73 antigen binding domain, or a protein that comprises the antigen binding domain (e.g., an antibody or antibody fragment, a multispecific binding protein, a bispecific antibody, etc.), comprising a heavy chain variable region comprising the amino acid sequence of SEQ ID NO: 37 and a light chain variable region comprising an amino acid sequence selected from the group consisting of the amino acid sequences of SEQ ID NO: 33, 34, 35 or 36.

In one embodiment, provided is an antibody or antibody fragment that binds human CD73 and that neutralizes the ATPase activity of CD73, wherein the antibody or antibody fragment comprises a heavy chain variable region and a light chain variable region of antibody H4+L1.

In one embodiment, provided is an antibody or antibody fragment that binds a human CD73 polypeptide and that neutralizes the ATPase activity of CD73, wherein the antibody or antibody fragment comprises a heavy chain variable region comprising the amino acid sequence of SEQ ID NO: 37 and a light chain variable region comprising the amino acid sequence of SEQ ID NO: 33.

In one embodiment, provided is an antibody or antibody fragment that binds a human CD73 polypeptide and that neutralizes the ATPase activity of CD73, wherein the antibody or antibody fragment comprises a heavy chain comprising the amino acid sequence of SEQ ID NO: 38 and a light chain comprising the amino acid sequence of SEQ ID NO: 39.

In one embodiment, an antibody or antibody fragment comprises a 2H4+VH domain and a 2L1, 2L2, 2L3 or 2L4 VL domain. In one embodiment, the antibody is antibody 2H4+2L1.

In one embodiment, provided is an anti-CD73 antigen binding domain, or a protein that comprises the antigen binding domain (e.g., an antibody or antibody fragment, a multispecific binding protein, a bispecific antibody, etc.), comprising a heavy chain variable region comprising the amino acid sequence of SEQ ID NO: 42 and a light chain variable region comprising an amino acid sequence selected from the group consisting of the amino acid sequences of SEQ ID NO: 43, 44, 45 or 46.

In one embodiment, provided is an antibody or antibody fragment that binds human CD73 and that neutralizes the ATPase activity of CD73, wherein the antibody or antibody fragment comprises a heavy chain variable region and a light chain variable region of antibody 2H4+2L1.

In one embodiment, provided is an antibody or antibody fragment that binds a human CD73 polypeptide and that neutralizes the ATPase activity of CD73, wherein the antibody or antibody fragment comprises a heavy chain variable region comprising the amino acid sequence of SEQ ID NO: 42 and a light chain variable region comprising the amino acid sequence of SEQ ID NO: 43.

In one embodiment, provided is an antibody or antibody fragment that binds a human CD73 polypeptide and that neutralizes the ATPase activity of CD73, wherein the antibody or antibody fragment comprises a heavy chain comprising an amino acid sequence of SEQ ID NO: 47 and a light chain comprising an amino acid sequence of SEQ ID NO: 48.

In one embodiment, the antibodies are non-depleting and neutralize the enzymatic activity of CD73 in the tumor environment.

In one embodiment, the antibody is a human IgG1, IgG2, IgG3, or IgG4 isotype antibody. For example, the antibody may be an antibody comprising an Fc domain of human IgG4 isotype, or an antibody comprising an Fc domain of any human IgG isotype (e.g., IgG1, IgG2, IgG3, or IgG4) modified to reduce or lack binding between the Fc domain and a human Fcγ receptor (e.g., CD16), optionally modified to reduce binding between the Fc domain and a plurality of human Fcγ receptors, e.g., CD16A, CD16B, CD32A, CD32B and CD64). In one embodiment, the antibodies comprise an Fc domain of human IgG subtype (e.g., IgG1) comprising an amino acid modification that results in a decrease (compared to the antibody comprising a wild-type human IgG1 Fc domain) or substantially complete loss of binding to each of CD16A, CD16B, CD32A, CD32B and CD64.

In any embodiment, an antibody heavy chain comprises a human CH1 constant domain and a modified human Fc domain, optionally of human IgG1 isotype, optionally further comprising an amino acid sequence of any one of SEQ ID NOS: 16, 17, 18 or 19. In any embodiment, an antibody light chain comprises a human light chain constant domain, optionally wherein the constant domain is a human kappa domain.

In one aspect, the antibodies of the disclosure do not induce or increase intracellular internalization of, or more generally down-modulation of, cell surface-expressed CD73 polypeptide and/or do not depend thereupon for their CD73 inhibitory activity. The antibodies of the disclosure can provide greater inhibitory potency (the ability to substantially neutralize CD73 enzymatic activity) than antibodies that inhibit CD73 by causing CD73 internalization. As opposed to antibodies that inhibit soluble CD73 by other mechanisms (e.g., causing CD73-antibody oligomer formation), the antibodies of the disclosure are capable of inhibiting the enzymatic activity of CD73 at high (e.g., 10 fold) excess of antibody:enzyme. Furthermore, unlike antibodies that bind an epitope on recombinant CD73 that may be modified or absent on cell surface CD73 (e.g., antibody 7G2) or with affinity that is too low to translate into efficacy in CD73-expressing cells, the present antibodies bind with high affinity to an epitope that is present and/or remains intact on cell surface CD73, providing the antibodies with the ability to potently neutralize of the enzymatic activity of cellular CD73. The present antibodies inhibit CD73 enzymatic activity in cells but can optionally also inhibit the ecto-5'nucleotidase activity of soluble recombinant CD73 (as observed in a cell-free assay using soluble dimeric CD73 polypeptide).

In one aspect, the antibodies of the disclosure are capable of inhibiting the activity of the human CD73 polypeptide without binding to the enzymatic active site of the CD73 polypeptide, and/or are non-competitive inhibitors of CD73, e.g., they inhibit the activity of the human CD73 polypeptide without detectably reducing binding between the CD73 polypeptide and a natural substrate thereof.

In one aspect, the antibodies of the disclosure lose binding to CD73 mutants having a substitution at residue K136. In one aspect, the antibodies of the disclosure have a decrease in binding to CD73 mutants having a substitution at residues K136 (with reference to the sequence of SEQ ID NO: 1; and compared to a wild-type CD73 comprising an amino acid sequence of SEQ ID NO: 1); optionally the antibodies also have a decrease in binding to CD73 mutants having substitutions at residues A99, E129, K133, E134 and A135 (with reference to the sequence of SEQ ID NO: 1; and compared to a wild-type CD73 comprising an amino acid sequence of SEQ ID NO: 1; optionally further the antibodies have decreased binding to CD73 mutants having a substitution at residues K97, E125, Q153 and K330 (with reference to the sequence of SEQ ID NO: 1; and compared to a wild-type CD73 comprising an amino acid sequence of SEQ ID NO: 1.

In one embodiment, the antibodies bind to an epitope on each CD73 polypeptide chain within a CD73 dimer (i.e. binds to CD73 in an intra-dimer manner), optionally further wherein the epitope is present on the same face of a CD73 dimer. Antibodies can thus bind bivalently to one CD73 dimer, notably in a position that is more "closed" in which the antibody binding sites are spatially further apart than in "open" position. In view of binding to ligand-bound CD73, the antibodies described herein may be useful for binding to CD73 when bound to AMP, e.g., for treating an individual or cancer characterized by (e.g. known or suspected to be characterized by) a tumor environment where upstream ADP and/or AMP are present at significant levels prior to treatment). The antibodies may be useful for treating an individual or cancer having (e.g. known or suspected to have) a tumor environment characterized by high levels of ADP (e.g., generated by dying cells, taken up by CD73 on stromal and cellular infiltrate (e.g., TReg cells) to yield high levels of AMP), as well as more generally by AMP, by adenosine, by presence or levels of CD73 expression or CD73-expressing cells, by high (e.g. compared to healthy tissue) numbers or frequencies of CD73-expressing cells and/or high levels of CD73 expression on cells (e.g. as assessed by an immunohistochemistry assay), by high (e.g. compared to healthy tissue) soluble CD73 polypeptides (e.g. as assessed by an ELISA or generally any antibody based detection assay), or by presence or levels of adenosine receptor expression or adenosine-receptor expressing cells. CD73 molecules in the tumor environment may be in the substrate-bound conformation, and the ability to bind and inhibit substrate-bound cellular CD73 (e.g., cells expressing CD73 pre-incubated with substrate such as AMP) in addition to non-substrate bound CD73 may provide greater ability to inhibit CD73 in vivo. Optionally, soluble CD73 protein, numbers or frequencies of CD73-expressing cells and/or levels of CD73 expression on cells can be assessed in the tumor environment prior to treatment. The antibodies may have a particular advantage for treatment of an individual having significant levels (e.g., high levels, compared to a reference) of soluble CD73 protein, numbers or frequencies of CD73-expressing cells and/or levels of CD73 expression on cells in the tumor sample.

Accordingly, in one aspect the disclosure provides a humanized antibody or antibody fragment that binds human CD73 polypeptide expressed at the surface of cells and that inhibits the enzymatic (ecto-5' nucleotidase) activity of the CD73 polypeptide, wherein the antibody is capable of binding bivalently to a single CD73 polypeptide dimer (a soluble CD73 polypeptide dimer or a CD73 polypeptide dimer expressed by a cell). Optionally, the antibody binds with a first antigen binding domain to a first CD73 polypeptide within the dimer and with a second antigen binding domain to a second CD73 polypeptide. In one aspect the antibody is an allosteric inhibitor of the CD73 polypeptide.

The epitope on CD73 bound by the antibodies is present on CD73 polypeptides as expressed by a range of cells, e.g., cancer cells, CD4 T cells, CD8 T cells, B cells, transfected cells, and binds with high affinity as determined by flow cytometry. For example, an antibody can be characterized by an $EC_{50}$, as determined by flow cytometry, of no more than 5 µg/ml, optionally no more than 2 µg/ml, no more than 1 µg/ml, no more than 0.5 µg/ml, no more than 0.1 µg/ml or no more than 0.05 µg/ml, for binding to cells that express at their surface a CD73 polypeptide. In one embodiment the cells are cells that are made to express CD73 at their surface. In one embodiment the cells are cells that endogenously express CD73 at their surface, e.g., cancer cells, leukemia cells, bladder cancer cells, glioma cells, glioblastoma cells, ovarian cancer cells, melanoma cells, prostate cancer cells, thyroid cancer cells, esophageal cancer cells or breast cancer cells.

In one embodiment, the CD73 neutralizing antibodies can be characterized by being capable of causing a decrease in cells' 5'-ectonucleotidase activity of CD73 by at least 60%, 75% or 80%. In one embodiment, the CD73-neutralizing antibodies can be characterized by an $EC_{50}$ for inhibition of 5'-ectonucleotidase activity of CD73 expressed by a cell of no more than 1 µg/ml, optionally no more than 0.5 µg/ml, optionally no more than 0.2 µg/ml.

Optionally, inhibition of 5'-ectonucleotidase activity of CD73 expressed by a cell is determined by assessing neutralization of 5' ectonucleotidase activity in CD73-expressing cells (e.g. MDA-MB-231 cells) by quantifying hydrolysis of AMP to adenosine.

Optionally, inhibition of 5'-ectonucleotidase activity of CD73 expressed by a cell is determined by assessing the ability of an antibody of antibody fragment to increase the proliferation of T cells when said T cells (e.g. from a healthy human donor) are induced to proliferate in vitro (e.g. via TCR co-stimulation, stimulation of CD3 and CD28 signaling, e.g., by contacting T cells with beads functionalized with CD3 agonists and CD28 agonists) in the presence of AMP (e.g. exogenously added AMP). Optionally T cell proliferation is assessed using the assay described in the Examples herein (see Example 5 and Methods).

In one aspect, an anti-CD73 antibody binds a common antigenic determinant present on both soluble CD73 and CD73 expressed at the cell surface.

In one aspect, an anti-CD73 antibody binds an antigenic determinant within each CD73 polypeptide chain within a CD73 dimer (in intra-dimer mode), e.g., wherein the antigenic determinants are present on a common face of the CD73 dimer.

In one aspect, an anti-CD73 antibody binds an epitope on CD73 comprising residue K136 (with reference to SEQ ID NO: 1).

In one aspect, an anti-CD73 antibody binds an epitope on CD73 comprising one, two, three or four of the residues selected from the group consisting of K97, E125, Q153 and K330 (with reference to SEQ ID NO: 1).

In one aspect, an anti-CD73 antibody binds an epitope on CD73 comprising one, two, three, four or five of the residues selected from the group consisting of A99, E129, K133, E134, and A135 (with reference to SEQ ID NO: 1).

In one aspect, an anti-CD73 antibody binds at least partly within a domain or segment of amino acid residues on a human CD73 protein (e.g., a CD73 homodimer protein) comprising the amino acid residues K97, A99, E125, E129, K133, E134, A135, K136, Q153 and K330 (with reference to SEQ ID NO: 1). In one aspect, an anti-CD73 antibody binds an epitope on CD73 comprising at least one, two, three, four or five, or more, of the residues selected from the group consisting of K97, A99, E125, E129, K133, E134, A135, K136, Q153 and K330 (with reference to SEQ ID NO: 1).

In one aspect, an anti-CD73 antibody has reduced binding to a CD73 polypeptide having a mutation at a residue K136 (with reference to SEQ ID NO: 1) compared to a wild-type CD73 polypeptide comprising an amino acid sequence of SEQ ID NO: 1; optionally, the mutant CD73 polypeptide has the mutation: K136A.

In one aspect, an anti-CD73 antibody has reduced binding to a CD73 polypeptide having a mutation at a residue selected from the group consisting of: K97, E125, Q153 and K330 (with reference to SEQ ID NO: 1) compared to a wild-type CD73 polypeptide comprising an amino acid sequence of SEQ ID NO: 1; optionally, the mutant CD73 polypeptide has the mutations: K97A, E125A, Q153A and/or K330A (e.g., K97A, E125A and K330A; K97A, E125A and/or Q153A).

In one aspect, an anti-CD73 antibody has reduced binding to a CD73 polypeptide having a mutation at a residue selected from the group consisting of: A99, E129, K133, E134, and A135 (with reference to SEQ ID NO: 1) compared to a wild-type CD73 polypeptide comprising an amino acid sequence of SEQ ID NO: 1; optionally, the mutant CD73 polypeptide has the mutations: A99S, E129A, K133A, E134N, and A135S.

In one embodiment, provided are methods of using the antibodies in the treatment or prevention of disease, e.g., infectious disease or cancer. In one aspect, the antibodies are administered to an individual having a cancer in an amount and frequency sufficient to neutralize the activity of CD73 in the tumor microenvironment. In one embodiment, the antibodies are administered in an amount and frequency sufficient to decrease the generation and/or concentration of adenosine in the tumor microenvironment. In one embodiment, the antibodies are administered in an amount and frequency sufficient to increase the generation and/or concentration of ATP in the tumor microenvironment. In one embodiment, the antibodies are administered in an amount and frequency sufficient to neutralize the activity of CD73 expressed by tumor cells. In one embodiment, the antibodies are administered in an amount and frequency sufficient to neutralize the activity of CD73 expressed by CD4 T cells, CD8 T cells and/or B cells.

The antibodies will be useful in inhibiting CD73-mediated catabolism of AMP to adenosine, e.g., decreasing the concentration of adenosine in the tumor microenvironment. These antibodies will therefore be useful in reversing the immunosuppressive effect of CD73 and/or adenosine on T cells, B cells and other cells that express adenosine receptors, for example in the treatment of cancer. In one embodiment, the anti-CD73 antibody neutralizes adenosine-mediated inhibition of proliferation, cytokine production, cytotoxicity and/or NFκB activity in T cells.

Because the CD73-mediated catabolism of AMP to adenosine is irreversible, whereas the catabolism of ATP to ADP and ADP to AMP by CD73 is reversible (by NDK kinase and adenylate kinase, respectively), the antibodies that block the irreversible CD73-mediated catabolism will increase the pool of AMP, thereby being of use in increasing the concentrations of ADP and ATP, e.g., in the tumor microenvironment. The antibodies can be useful to increase the formation of ADP from AMP and the formation of ATP from ADP. Since ATP has immune activating roles, the anti-CD73 antibodies can be useful in activating T cells, for example in the treatment of cancer.

The antibodies will be useful in inhibiting the production, amounts and/or concentrations of adenosine into the tumor microenvironment.

The antibodies that neutralize the activity of a soluble human CD73 polypeptide dimer can further neutralize CD73 in any other suitable context, e.g., in a reporter cell made to express CD73, in a T cell, etc.

Provided is a method for treating an individual, the method comprising administering to an individual (e.g., an individual having a disease, a tumor, etc.) a therapeutically active amount of any of the anti-CD73 antigen binding compounds described herein. In one aspect provided is a method for treating an individual, the method comprising, consisting essentially of or consisting of: administering to an individual (e.g., an individual having a disease, a tumor, etc.) a therapeutically active amount of an antigen binding compound of the disclosure.

In one aspect provided is a method for decreasing adenosine produced by a CD73-expressing cell (e.g., an immune cell and/or a tumor cell in an individual), or a method for neutralizing of the enzymatic activity of cellular CD73, the method comprising, consisting essentially of or consisting of: bringing the CD73-expressing cell into contact with an antigen binding compound of the disclosure (e.g. an anti-CD73 antibody or antibody fragment, or a composition comprising such). In one embodiment, the step of bringing the CD73-expressing cell into contact with an antigen binding compound of the disclosure comprises administering to an individual a therapeutically active amount of the antigen binding compound. In one embodiment the individual has a cancer.

In one aspect provided is a method for decreasing adenosine present in the tumor environment (e.g., in an individual), the method comprising, consisting essentially of or consisting of: administering to an individual a therapeutically active amount of a compound of the disclosure (e.g. an anti-CD73 antibody or antibody fragment, or a composition comprising such). In one embodiment the individual has a cancer. Optionally the individual is a human having or who is susceptible to having a cancer.

The antibodies are optionally characterized by binding affinity ($K_D$) for a human CD73 polypeptide (e.g. as CD73 dimer), as determined by SPR (e.g. according to the methods of the Examples) of less than (better than) $10^{-9}$ M, preferably less than $10^{-10}$ M, or preferably less than $10^{-11}$M, and/or by binding human CD73 polypeptide with an $EC_{50}$ lower than (better binding than) 1 µg/ml. Optionally, binding affinity can be specified as being bivalent.

In one embodiment, the antibody has an $EC_{50}$ of no more than 0.5 µg/ml, optionally no more than 0.2 µg/ml, optionally no more than 0.1 µg/ml, for binding to cells (e.g., tumor cells, MDA-MB-231 cells) expressing human CD73 at the cell surface.

The antibodies are optionally characterized by an $EC_{50}$ for neutralization of the enzymatic activity of CD73 in CD73-expressing cells (e.g., tumor cells, MDA-MB-231 cells) of less than (better than) 1 µg/ml, optionally less than 0.5 µg/ml.

In one embodiment, the antibody is a monoclonal antibody or a fragment thereof that retains binding specificity and ability to neutralize the enzymatic activity of CD73 (e.g. as determined by assessing the ability of an antibody or antibody fragment to increase the proliferation of T cells when said T cells are induced to proliferate in vitro in the presence of AMP (e.g. exogenously added AMP). In one embodiment, the antibody is substantially as potent or is at least as potent as parental antibody having the respective VH and VL amino acid sequences of SEQ ID NOS: 40 and 41 in neutralizing the enzymatic activity of CD73, optionally wherein the antibody has an $EC_{50}$ for neutralizing the enzymatic activity of CD73 that is within 1-log, 0.5-log of the $EC_{50}$ of parental antibody. In one embodiment, the antibody is more potent that parental antibody having the respective VH and VL amino acid sequences of SEQ ID NOS: 40 and 41 in neutralizing the enzymatic activity of CD73, optionally wherein the antibody has an $EC_{50}$ for neutralizing the enzymatic activity of CD73 that is lower than that of parental antibody having the respective VH and VL amino acid sequences of SEQ ID NOS: 40 and 41.

In one embodiment, the antibody is substantially as potent or is at least as potent as parental antibody having the respective VH and VL amino acid sequences of SEQ ID NOS: 27 and 28 in neutralizing the enzymatic activity of CD73, optionally wherein the antibody has an $EC_{50}$ for neutralizing the enzymatic activity of CD73 that is within 1-log or 0.5-log of the $EC_{50}$ of parental antibody. In one embodiment, the antibody is more potent that parental antibody having the respective VH and VL amino acid sequences of SEQ ID NOS: 27 and 28 in neutralizing the enzymatic activity of CD73, optionally wherein the antibody has an $EC_{50}$ for neutralizing the enzymatic activity of CD73 that is less than that of parental antibody having the respective VH and VL amino acid sequences of SEQ ID NOS: 27 and 28.

Also provided are isolated and/or recombinant nucleic acids (e.g., sets of nucleic acids) encoding an antibody (or a heavy or light chain thereof) or a VH and/or VL domain of the disclosure, a vector or set of vectors comprising such a nucleic acid(s), a cell comprising such a vector, and a method of producing a human anti-CD73 antibody or antibody fragment, comprising culturing such a cell under conditions suitable for expression of the anti-CD73 antibody or antibody fragment. The disclosure also relates to compositions, such as pharmaceutically acceptable compositions and kits, comprising such proteins, nucleic acids, vectors, and/or cells and typically one or more additional ingredients that can be active ingredients or inactive ingredients that promote formulation, delivery, stability, or other characteristics of the composition (e.g., various carriers). The disclosure further relates various new and useful methods making and using such antibodies, nucleic acids, vectors, cells, organisms, and/or compositions, such as in the modulation of CD73-mediated biological activities, for example in the treatment of diseases related thereto, notably cancers.

The disclosure also provides methods of producing or testing an antibody or antibody fragment which binds and neutralizes the enzymatic activity of CD73.

The disclosure also provides a method of potentiating the activity of lymphocytes (e.g., T cells) in a subject in need thereof, or for restoring the activity of lymphocytes (e.g., T cells), or a method of relieving the adenosine-mediated inhibition of lymphocyte activity (e.g., T cells), which method comprises administering to the subject an effective amount of any of the foregoing compositions. In one embodiment, the subject is a patient suffering from cancer. For example, the patient may be suffering from a solid tumor, e.g., colorectal cancer, renal cancer, ovarian cancer, lung cancer, breast cancer or malignant melanoma. Alternatively, the patient may be suffering from a hematopoietic cancer, e.g., acute myeloid leukaemia, chronic myeloid leukaemia, multiple myeloma, or non-Hodgkin's lymphoma.

These aspects are more fully described in, and additional aspects, features, and advantages will be apparent from, the description provided herein.

BRIEF DESCRIPTION OF THE DRAWINGS

FIGS. 1A-1B show titration curves obtained with humanized variants having H0, H1, H2, H3 and H4 heavy chain variable regions, each combined with each of the L0, L1, L2, L3 and L4 light chain variable regions, and parental murine antibody HPLP, as tested on transfected cell lines expressing human (FIG. 1A) or cynomolgus (FIG. 1B) CD73 protein.

FIGS. 3A-3C and 4A-4C show two series of experiments to compare the humanized antibodies in their potency in reversing AMP-mediated inhibition of T cell proliferation. FIGS. 3A and 4A shows control of T cell proliferation and its inhibition by AMP for each series of experiments. FIGS. 3B and 4B show efficacy of anti-CD73 antibodies to restore CD4+ and FIGS. 3C and 4C show efficacy of anti-CD73 antibodies to restore CD8+ T cell proliferation. Cell proliferation is determined by dilution of Cell Trace Violet marker. Data are expressed as means of duplicates+/−standard deviation.

FIG. 5A shows control of T cell subpopulation proliferation and its inhibition by AMP. FIG. 5B shows efficacy of H4+Lx antibodies and parental antibody HPLP to restore CD4+ and CD8+ T cell proliferation. FIG. 5C shows efficacy of 2H4+2Lx antibodies (the 2H4+ chain combined with 2L1, 2L2, 2L3 or 2L4 chains) and parental antibody 2HP2LP to restore CD4+ and CD8+ T cell proliferation. Data are expressed as mean of duplicates+/− standard deviation.

FIGS. 6A and 6B show T cell proliferation restored by humanized variants is reproducible, respectively in two representative human donors. Shown is efficacy of 2H4+2Lx anti-CD73 antibody variants to restore CD4 and CD8 T cell proliferation. Data are expressed as mean of duplicates+/−standard deviation.

FIG. 7 shows CD4+ T cell proliferation is inhibited by ATP and restored with 2H4+2Lx antibody variants. Control of CD4+ T cell proliferation and inhibition by 100 μM of ATP, shown as tested for two representative donors, D795 (FIG. 7A) and D664 (FIG. 7B). Data are expressed as mean of duplicates+/− standard deviation.

DETAILED DESCRIPTION OF THE INVENTION

Definitions

Figure 2:
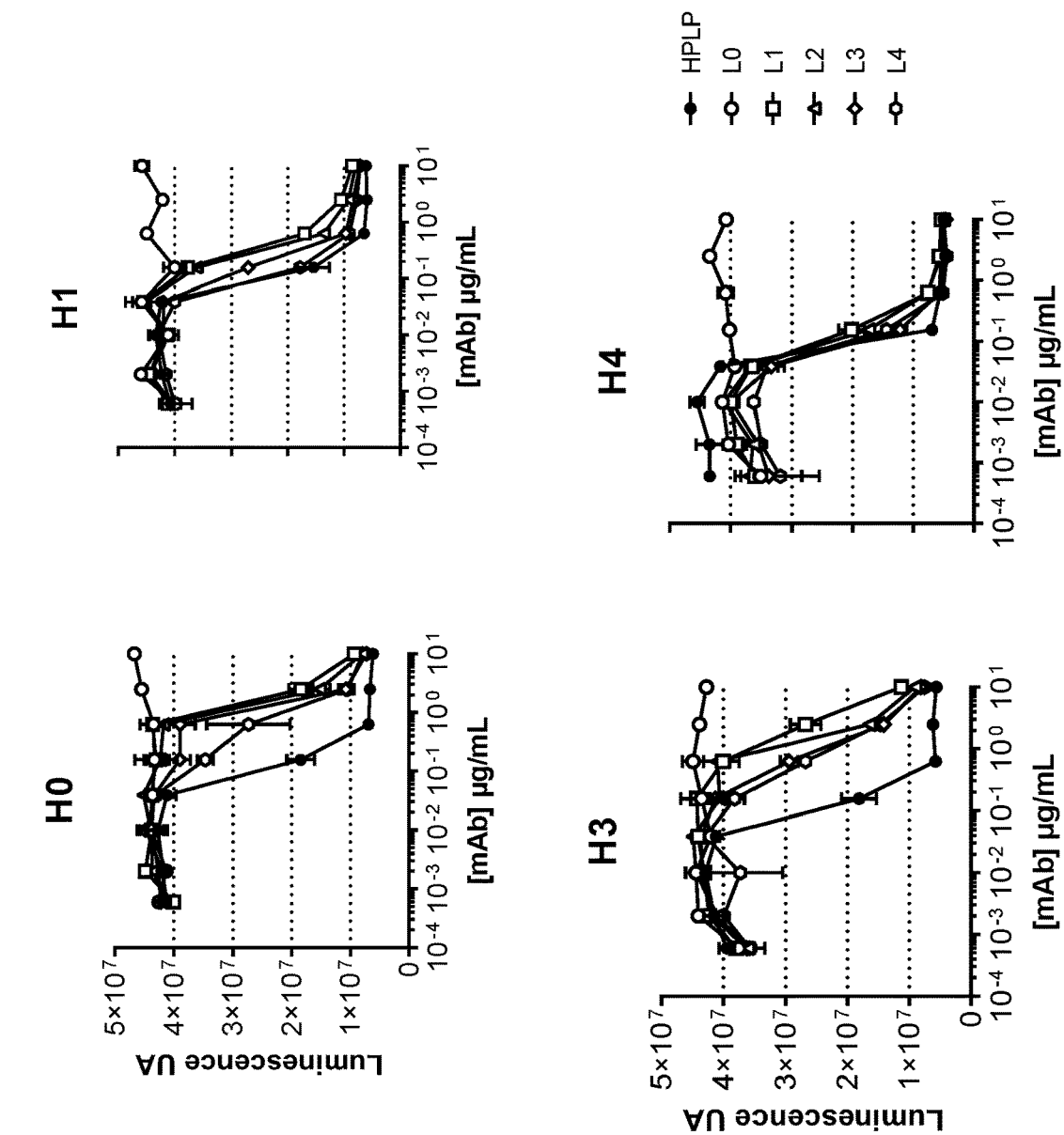
FIG. 2 shows blockade of enzymatic activity of soluble recombinant CD73. The upper left-hand panel (A) shows a high level of luminescence was measured when ATP and CTG substrates were mixed. When AMP was added to the reaction mix, the CTG reaction was inhibited resulting in a decrease of luminescence. In the presence of rhCD73 protein that hydrolyzes AMP, the level of luminescence was restored. Blockade of CD73 enzymatic activity by the different humanized variants is shown.

As used in the specification, "a" or "an" may mean one or more. As used in the claim(s), when used in conjunction with the word "comprising", the words "a" or "an" may mean one or more than one. As used herein "another" may mean at least a second or more.

Where "comprising" is used, this can optionally be replaced by "consisting essentially of" or by "consisting of".

Human CD73, also known as ecto-5'-nucleotidase and as 5-prime-ribonucleotide phosphohydrolase, EC 3.1.3.5, encoded by the NT5E gene, exhibits 5'-nucleotidase, notably AMP-, NAD-, and NMN-nucleosidase, activities. CD73 catalyzes the conversion at neutral pH of purine 5-prime mononucleotides to nucleosides, the preferred substrate being AMP. The enzyme consists of a dimer of 2 identical 70-kD subunits bound by a glycosyl phosphatidyl inositol linkage to the external face of the plasma membrane The amino acid sequence of Human CD73 preprotein (monomer), including a signal sequence at amino acids 1-26, is shown in Genbank under accession number NP_002517, the entire disclosure of which is incorporated herein by reference, and as follows:

```
                                          (SEQ ID NO: 1)
MCPRAARAPA TLLLALGAVL WPAAGAWELT

ILHTNDVHSR LEQTSEDSSK CVNASRCMGG

VARLFTKVQQ IRRAEPNVLL LDAGDQYQGT

IWFTVYKGAE VAHFMNALRY DAMALGNHEF

DNGVEGLIEP LLKEAKFPIL SANIKAKGPL

ASQISGLYLP YKVLPVGDEV VGIVGYTSKE

TPFLSNPGTN LVFEDEITAL QPEVDKLKTL

NVNKIIALGH SGFEMDKLIA QKVRGVDVVV

GGHSNTFLYT GNPPSKEVPA GKYPFIVTSD

DGRKVPVVQA YAFGKYLGYL KIEFDERGNV

ISSHGNPILL NSSIPEDPSI KADINKWRIK

LDNYSTQELG KTIVYLDGSS QSCRFRECNM

GNLICDAMIN NNLRHTDEMF WNHVSMCILN

GGGIRSPIDE RNNGTITWEN LAAVLPFGGT

FDLVQLKGST LKKAFEHSVH RYGQSTGEFL

QVGGIHVVYD LSRKPGDRVV KLDVLCTKCR

VPSYDPLKMD EVYKVILPNF LANGGDGFQM

IKDELLRHDS GDQDINVVST YISKMKVIYP

AVEGRIKFST GSHCHGSFSL IFLSLWAVIF

VLYQ .
```

In the context herein, "neutralize the enzymatic activity of CD73", refers to a process in which the 5'-nucleotidase (5'-ectonucleotidase) activity of CD73 is inhibited. This comprises, notably the inhibition of CD73-mediated generation of adenosine, i.e. the inhibition of CD73-mediated catabolism of AMP to adenosine. This can be measured for example in a cell-free assay that measures the capacity of a test compound to inhibit the conversion of AMP to adenosine, either directly or indirectly. In one embodiment, an antibody preparation causes at least a 50% decrease in the conversion of AMP to adenosine, at least a 70% decrease in the conversion of AMP to adenosine, or at least a 80% decrease in the conversion of AMP to adenosine, referring, for example, to the assays described herein.

Whenever within this whole specification "treatment of cancer" or the like is mentioned with reference to anti-CD73 binding agent (e.g., antibody), there is meant: (a) method of treatment of cancer, said method comprising the step of administering (for at least one treatment) an anti-CD73 binding agent, (preferably in a pharmaceutically acceptable carrier material) to an individual, a mammal, especially a human, in need of such treatment, in a dose that allows for the treatment of cancer, (a therapeutically effective amount), preferably in a dose (amount) as specified herein; (b) the use of an anti-CD73 binding agent for the treatment of cancer, or an anti-CD73 binding agent, for use in said treatment (especially in a human); (c) the use of an anti-CD73 binding agent for the manufacture of a pharmaceutical preparation for the treatment of cancer, a method of using an anti-CD73 binding agent for the manufacture of a pharmaceutical preparation for the treatment of cancer, comprising admixing an anti-CD73 binding agent with a pharmaceutically acceptable carrier, or a pharmaceutical preparation comprising an effective dose of an anti-CD73 binding agent that is appropriate for the treatment of cancer; or (d) any combination of a), b), and c), in accordance with the subject matter allowable for patenting in a country where this application is filed.

The term "antibody," as used herein, refers to polyclonal and monoclonal antibodies. Depending on the type of constant domain in the heavy chains, antibodies are assigned to one of five major classes: IgA, IgD, IgE, IgG, and IgM. Several of these are further divided into subclasses or isotypes, such as IgG1, IgG2, IgG3, IgG4, and the like. An exemplary immunoglobulin (antibody) structural unit comprises a tetramer. Each tetramer is composed of two identical pairs of polypeptide chains, each pair having one "light" (about 25 kDa) and one "heavy" chain (about 50-70 kDa). The N-terminus of each chain defines a variable region of about 100 to 110 or more amino acids that is primarily responsible for antigen recognition. The terms variable light chain ($V_L$) and variable heavy chain ($V_H$) refer to these light and heavy chains respectively. The heavy-chain constant domains that correspond to the different classes of immunoglobulins are termed "alpha," "delta," "epsilon," "gamma" and "mu," respectively. The subunit structures and three-dimensional configurations of different classes of immunoglobulins are well known. IgG are the exemplary classes of antibodies employed herein because they are the most common antibodies in the physiological situation and because they are most easily made in a laboratory setting. Optionally the antibody is a monoclonal antibody. Particular examples of antibodies are humanized, chimeric, human, or otherwise-human-suitable antibodies. "Antibodies" also includes any fragment or derivative of any of the herein described antibodies.

The term "specifically binds to" means that an antibody can bind preferably in a competitive binding assay to the binding partner, e.g., CD73, as assessed using either recombinant forms of the proteins, epitopes therein, or native proteins present on the surface of isolated target cells. Competitive binding assays and other methods for determining specific binding are further described below and are well known in the art.

When an antibody is said to "compete with" a particular monoclonal antibody, it means that the antibody competes with the monoclonal antibody in a binding assay using either recombinant CD73 molecules or surface expressed CD73 molecules. For example, if a test antibody reduces the binding of a reference antibody to a CD73 polypeptide or CD73-expressing cell in a binding assay, the antibody is said to "compete" respectively with the reference antibody.

The term "affinity", as used herein, means the strength of the binding of an antibody to an epitope. The affinity of an antibody is given by the dissociation constant Kd, defined as [Ab]×[Ag]/[Ab−Ag], where [Ab−Ag] is the molar concentration of the antibody-antigen complex, [Ab] is the molar concentration of the unbound antibody and [Ag] is the molar concentration of the unbound antigen. The affinity constant $K_a$ is defined by 1/Kd. Methods for determining the affinity of mAbs can be found in Harlow, et al., Antibodies: A Laboratory Manual, Cold Spring Harbor Laboratory Press, Cold Spring Harbor, N.Y., 1988), Coligan et al., eds., Current Protocols in Immunology, Greene Publishing Assoc. and Wiley Interscience, N.Y. (1992, 1993), and Muller, Meth. Enzymol. 92:589-601 (1983), which references are entirely incorporated herein by reference. One standard method well known in the art for determining the affinity of mAbs is the use of surface plasmon resonance (SPR) screening (such as by analysis with a BIAcore™ SPR analytical device).

Within the context herein a "determinant" designates a site of interaction or binding on a polypeptide.

The term "epitope" refers to an antigenic determinant, and is the area or region on an antigen to which an antibody binds. A protein epitope may comprise amino acid residues directly involved in the binding as well as amino acid residues which are effectively blocked by the specific antigen binding antibody or peptide, i.e., amino acid residues within the "footprint" of the antibody. It is the simplest form or smallest structural area on a complex antigen molecule that can combine with e.g., an antibody or a receptor. Epitopes can be linear or conformational/structural. The term "linear epitope" is defined as an epitope composed of amino acid residues that are contiguous on the linear sequence of amino acids (primary structure). The term "conformational or structural epitope" is defined as an epitope composed of amino acid residues that are not all contiguous and thus represent separated parts of the linear sequence of amino acids that are brought into proximity to one another by folding of the molecule (secondary, tertiary and/or quaternary structures). A conformational epitope is dependent on the 3-dimensional structure. The term 'conformational' is therefore often used interchangeably with 'structural'.

The term "deplete" or "depleting", with respect to CD73-expressing cells, means a process, method, or compound that results in killing, elimination, lysis or induction of such killing, elimination or lysis, so as to negatively affect the number of such CD73-expressing cells present in a sample or in a subject.

The term "internalization", used interchangeably with "intracellular internalization", refers to the molecular, biochemical and cellular events associated with the process of translocating a molecule from the extracellular surface of a cell to the intracellular surface of a cell. The processes responsible for intracellular internalization of molecules are well-known and can involve, inter alia, the internalization of extracellular molecules (such as hormones, antibodies, and small organic molecules); membrane-associated molecules (such as cell-surface receptors); and complexes of membrane-associated molecules bound to extracellular molecules (for example, a ligand bound to a transmembrane receptor or an antibody bound to a membrane-associated molecule). Thus, "inducing and/or increasing internalization" comprises events wherein intracellular internalization is initiated and/or the rate and/or extent of intracellular internalization is increased.

The term "agent" is used herein to denote a chemical compound, a mixture of chemical compounds, a biological macromolecule, or an extract made from biological materials. The term "therapeutic agent" refers to an agent that has biological activity.

For the purposes herein, a "humanized" or "human" antibody refers to an antibody in which the constant and variable framework region of one or more human immunoglobulins is fused with the binding region, e.g., the CDR, of an animal immunoglobulin. Such antibodies are designed to maintain the binding specificity of the non-human antibody from which the binding regions are derived, but to avoid an immune reaction against the non-human antibody. Such antibodies can be obtained from transgenic mice or other animals that have been "engineered" to produce specific human antibodies in response to antigenic challenge (see, e.g., Green et al. (1994) Nature Genet 7:13; Lonberg et al. (1994) Nature 368:856; Taylor et al. (1994) Int Immun 6:579, the entire teachings of which are herein incorporated by reference). A fully human antibody also can be constructed by genetic or chromosomal transfection methods, as well as phage display technology, all of which are known in the art (see, e.g., McCafferty et al. (1990) Nature 348:552-553). Human antibodies may also be generated by in vitro activated B cells (see, e.g., U.S. Pat. Nos. 5,567,610 and 5,229,275, which are incorporated in their entirety by reference).

The term "hypervariable region" when used herein refers to the amino acid residues of an antibody that are responsible for antigen binding. The hypervariable region generally comprises amino acid residues from a "complementarity-determining region" or "CDR" (e.g., residues 24-34 (L1), 50-56 (L2) and 89-97 (L3) in the light-chain variable domain and 31-35 (H1), 50-65 (H2) and 95-102 (H3) in the heavy-chain variable domain; Kabat et al. 1991) and/or those residues from a "hypervariable loop" (e.g., residues 26-32 (L1), 50-52 (L2) and 91-96 (L3) in the light-chain variable domain and 26-32 (H1), 53-55 (H2) and 96-101 (H3) in the heavy-chain variable domain; Chothia and Lesk, J. Mol. Biol 1987; 196:901-917), or a similar system for determining essential amino acids responsible for antigen binding. Typically, the numbering of amino acid residues in this region is performed by the method described in Kabat et al., supra. Phrases such as "Kabat position", "variable domain residue numbering as in Kabat" and "according to Kabat" herein refer to this numbering system for heavy chain variable domains or light chain variable domains. Using the Kabat numbering system, the actual linear amino acid sequence of a peptide may contain fewer or additional amino acids corresponding to a shortening of, or insertion into, a FR or CDR of the variable domain. For example, a heavy chain variable domain may include a single amino acid insert (residue 52a according to Kabat) after residue 52 of CDR H2 and inserted residues (e.g., residues 82a, 82b, and 82c, etc. according to Kabat) after heavy chain FR residue 82. The Kabat numbering of residues may be determined for a given antibody by alignment at regions of homology of the sequence of the antibody with a "standard" Kabat numbered sequence.

By "framework" or "FR" residues as used herein is meant the region of an antibody variable domain exclusive of those regions defined as CDRs. Each antibody variable domain framework can be further subdivided into the contiguous regions separated by the CDRs (FR1, FR2, FR3 and FR4).

The terms "Fc domain," "Fc portion," and "Fc region" refer to a C-terminal fragment of an antibody heavy chain, e.g., from about amino acid (aa) 230 to about aa 450 of human γ (gamma) heavy chain or its counterpart sequence in other types of antibody heavy chains (e.g., α, δ, ε and μ for human antibodies), or a naturally occurring allotype thereof. Unless otherwise specified, the commonly accepted Kabat amino acid numbering for immunoglobulins is used throughout this disclosure (see Kabat et al. (1991) Sequences of Protein of Immunological Interest, 5th ed., United States Public Health Service, National Institute of Health, Bethesda, MD).

The terms "isolated", "purified" or "biologically pure" refer to material that is substantially or essentially free from components which normally accompany it as found in its native state. Purity and homogeneity are typically determined using analytical chemistry techniques such as polyacrylamide gel electrophoresis or high performance liquid chromatography. A protein that is the predominant species present in a preparation is substantially purified.

The terms "polypeptide," "peptide" and "protein" are used interchangeably herein to refer to a polymer of amino acid residues. The terms apply to amino acid polymers in which one or more amino acid residue is an artificial chemical mimetic of a corresponding naturally occurring amino acid, as well as to naturally occurring amino acid polymers and non-naturally occurring amino acid polymer.

The term "recombinant" when used with reference, e.g., to a cell, or nucleic acid, protein, or vector, indicates that the cell, nucleic acid, protein or vector, has been modified by the introduction of a heterologous nucleic acid or protein or the alteration of a native nucleic acid or protein, or that the cell is derived from a cell so modified. Thus, for example, recombinant cells express genes that are not found within the native (non-recombinant) form of the cell or express native genes that are otherwise abnormally expressed, under expressed or not expressed at all.

Within the context herein, the term antibody that "binds" a polypeptide or epitope designates an antibody that binds said determinant with specificity and/or affinity.

The term "identity" or "identical", when used in a relationship between the sequences of two or more polypeptides, refers to the degree of sequence relatedness between polypeptides, as determined by the number of matches between strings of two or more amino acid residues. "Identity" measures the percent of identical matches between the smaller of two or more sequences with gap alignments (if any) addressed by a particular mathematical model or computer program (i.e., "algorithms"). Identity of related polypeptides can be readily calculated by known methods. Such methods include, but are not limited to, those described in Computational Molecular Biology, Lesk, A. M., ed., Oxford University Press, New York, 1988; Biocomputing: Informatics and Genome Projects, Smith, D. W., ed., Academic Press, New York, 1993; Computer Analysis of Sequence Data, Part 1, Griffin, A. M., and Griffin, H. G., eds., Humana Press, New Jersey, 1994; Sequence Analysis in Molecular Biology, von Heinje, G., Academic Press, 1987; Sequence Analysis Primer, Gribskov, M. and Devereux, J., eds., M. Stockton Press, New York, 1991; and Carillo et al., SIAM J. Applied Math. 48, 1073 (1988).

Methods for determining identity are designed to give the largest match between the sequences tested. Methods of determining identity are described in publicly available computer programs. Computer program methods for determining identity between two sequences include the GCG program package, including GAP (Devereux et al., Nucl. Acid. Res. 12, 387 (1984); Genetics Computer Group, University of Wisconsin, Madison, Wis.), BLASTP, BLASTN, and FASTA (Altschul et al., J. Mol. Biol. 215, 403-410 (1990)). The BLASTX program is publicly available from the National Center for Biotechnology Information (NCBI) and other sources (BLAST Manual, Altschul et al. NCB/NLM/NIH Bethesda, Md. 20894; Altschul et al., supra). The well-known Smith Waterman algorithm may also be used to determine identity.

Production of Antibodies

The present invention is based, in part, on the discovery of modified human acceptor framework sequences into which antibody CDRs can be incorporated such that the resulting anti-CD73 variable region has high potency in neutralization of the enzymatic activity of human CD73. The antibodies have the advantage of having low or decreased immunogenicity in humans, e.g. having lower ability or likelihood to cause an unwanted anti-CD73 antibody directed immune response upon administration to a human. Examples of such antibodies of the disclosure include antibodies comprising the H4+ or 2H4+ VH domain combined with a L1, L2, L3, L4, 2L1, 2L2, 2L3 or 2L4 VL domain. Examples of antibodies of the disclosure include antibodies comprising the VH and VL domain pairs of any one of the antibodies H4+L1, H4+L2, H4+L3, H4+L4, 2H4+L1, 2H4+L2, 2H4+L3 or 2H4+L4.

In one aspect, an antibody or antibody fragment that binds a human CD73 polypeptide comprises VH and VL frameworks (e.g., FR1, FR2, FR3 and FR4) of human origin. In one aspect, the antibody or antibody fragment comprises: a HCDR1 (heavy chain CDR1) comprising an amino acid sequence SYNMY as set forth in SEQ ID NO: 2; a HCDR2 (heavy chain CDR2) comprising an amino acid sequence YIDPYNGGSSYNQKFKG as set forth in SEQ ID NO: 12, optionally further wherein the glutamine residue (Q) at position 13 of SEQ ID NO: 12 may be substituted by a leucine residue (L), wherein the lysine residue (K) at position 14 of SEQ ID NO: 12 may optionally be substituted by a threonine residue (T); a HCDR3 (heavy chain CDR3) comprising an amino acid sequence GYNNYKAWFAY as set forth in SEQ ID NO: 13, optionally further wherein the asparagine residue (N) at position 3 of SEQ ID NO: 13 may be substituted by a glycine residue (G); a LCDR1 (light chain CDR1) comprising an amino acid sequence KASQSVTNDVA as set forth in SEQ ID NO: 14, optionally further wherein the threonine residue (T) at position 7 of SEQ ID NO: 14 may be substituted by a serine residue (S); a LCDR2 (light chain CDR2) comprising an amino acid sequence YASNRYT as set forth in SEQ ID NO: 15, optionally wherein the asparagine residue (N) at position 4 of SEQ ID NO: 15 may be substituted by an threonine residue (T); and a LCDR3 (light chain CDR3) comprising an amino acid sequence QQDYSSLT as set forth in SEQ ID NO: 7.

In one embodiment, a HCDR2 comprises an amino acid sequence of Formula I:
Y-I-D-P-Y-N-G-G-S-S-Y-N-Xaa$_1$-Xaa$_2$-F-K-G (SEQ ID NO: 3), or a subsequence thereof, wherein Xaa$_1$ is Q (Gln) or L (Leu) and wherein Xaa$_2$ is K (Lys) or T (Thr).

In one embodiment, a HCDR3 comprises an amino acid sequence of Formula II:
G-Y-Xaa$_1$-N-Y-K-A-W-F-A-Y (SEQ ID NO: 4), or a subsequence thereof, wherein Xaa$_1$ is N (Asp) or G (Gly).

In one embodiment, a LCDR1 comprises an amino acid sequence of Formula III:

(SEQ ID NO: 5)
K-A-S-Q-S-V-Xaa$_1$-N-D-V-A, or a subsequence thereof, wherein Xaa$_1$ is T (Thr) or S (Ser).

In one embodiment, a LCDR2 comprises an amino acid sequence of Formula IV:

(SEQ ID NO: 6)
Y-A-S-Xaa$_1$-R-Y-T, or a subsequence thereof, wherein Xaa$_1$ is T (Thr) or N (Asn).

In one aspect, an isolated antibody that binds a human CD73 polypeptide comprises: a HCDR1 comprising an amino acid sequence SYNMY as set forth in SEQ ID NO: 2; a HCDR2 comprising an amino acid sequence YIDPYNGGSSYNLTFKG as set forth in SEQ ID NO: 8; a HCDR3 comprising an amino acid sequence GYGNYKAWFAY as set forth in SEQ ID NO: 9; a LCDR1 comprising an amino acid sequence KASQSVSNDVA as set forth in SEQ ID NO: 10; a LCDR2 comprising an amino acid sequence YASTRYT as set forth in SEQ ID NO: 11; and a LCDR3 comprising an amino acid sequence QQDYSSLT as set forth in SEQ ID NO: 7.

In one aspect, an isolated antibody that binds a human CD73 polypeptide comprises: a HCDR1 comprising an amino acid sequence SYNMY as set forth in SEQ ID NO: 2; a HCDR2 comprising an amino acid sequence YIDPYNGGSSYNQKFKG as set forth in SEQ ID NO: 12; a HCDR3 comprising an amino acid sequence GYNNYKAWFAY as set forth in SEQ ID NO: 13; a LCDR1 comprising an amino acid sequence KASQSVTNDVA as set forth in SEQ ID NO: 14; a LCDR2 comprising an amino acid sequence YASNRYT as set forth in SEQ ID NO: 15; and a LCDR3 comprising an amino acid sequence QQDYSSLT as set forth in SEQ ID NO: 7.

In one embodiment, the antibody comprises a heavy chain framework from the human subgroup IGHV1-3 (optionally together with IGHJ4), optionally the IGHV1-3 is IGHV1-3*01. In one embodiment, the humanized antibody comprises a light chain framework from the human subgroup IGKV1-33 (optionally together with IGKJ2), optionally from IGKV1-33*01.

The antibody may further comprise one, two, three, four, five or more amino acid substitutions across the human heavy and/or light chain frameworks, to, e.g., enhance affinity, stability, or other properties of the antibody.

Examples of VH and VL amino acid sequences of anti-CD73 antibodies are shown in Example 6 (showing the H4+ chain, and Table 5 for 2H4+2Lx antibodies), and Table 1 for L1-L4 chains.

In one aspect, the invention provides an antigen binding domain or antibody or antibody fragment that binds a human CD73 polypeptide, comprising:

(a) a CDR-H1 comprising the amino acid sequence of SEQ ID NO:2;

(b) a CDR-H2 comprising the amino acid sequence of SEQ ID NOS: 3, 8 or 12, (c) a CDR-H3 comprising the amino acid sequence of SEQ ID NOS: 4, 9 or 13;

(d) a CDR-L1 comprising the amino acid sequence of SEQ ID NOS: 5, 10 or 14;

(e) a CDR-L2 comprising the amino acid sequence of SEQ ID NOS; 6, 11 or 15;

(f) a CDR-L3 comprising the amino acid sequence of SEQ ID NO:7; and (g) human heavy and light chain framework sequences.

In one embodiment, the antibody comprises a heavy chain framework from the human subgroup IGHV1-3 together with IGHJ4, optionally the antibodies comprises IGHV1-3*01, together with IGHJ4. In one embodiment, the humanized antibody comprises a light chain framework from the human subgroup IGKV1-33, optionally IGKV1-33*01, together with IGKJ2.

Optionally, in any embodiment, the antibody can be specified as being an antibody other than a murine parental antibody, e.g. a murine parental antibody having the respective VH and VL of SEQ ID NOS: 27 and 28), or having the respective VH and VL of SEQ ID NOS: 40 and 41).

Optionally a human framework comprises one or more mutations, e.g., back mutations to introduce a residue present at the particular position in a non-human mammal (e.g., a mouse).

In one aspect of any embodiment herein, the amino acid at Kabat heavy chain position 2 is an isoleucine.

In one aspect of any embodiment herein, the amino acid at Kabat heavy chain position 30 is an alanine.

In one aspect of any embodiment herein, the amino acid at Kabat heavy chain position 48 is an isoleucine.

In one aspect of any embodiment herein, the amino acid at Kabat heavy chain position 69 is a leucine.

In one aspect of any embodiment herein, the amino acid at Kabat heavy chain position 73 is a lysine.

In one embodiment, a VH comprises an isoleucine residue at Kabat position 2, an alanine at position 30, an isoleucine at position 48, a leucine at position 69 and a lysine at position 73.

In one aspect of any embodiment herein, the amino acid at Kabat light chain position 67 is a tyrosine.

In one aspect of any embodiment herein, the amino acid at Kabat light chain position 60 is serine or aspartic acid.

In one aspect of any embodiment herein, the amino acid at Kabat light chain position 2 is valine or isoleucine.

In one aspect of any embodiment herein, the amino acid at Kabat light chain position 87 is tyrosine or phenylalanine.

In one embodiment, a VL comprises a tyrosine residue at Kabat position 67, a serine at position 60, an isoleucine at position 2, and a tyrosine at position 87.

In one aspect of any embodiment herein, the amino acid at Kabat heavy chain position 28 is threonine (T).

In one aspect of any embodiment herein, the amino acid at Kabat heavy chain position 66 is arginine (R).

In one aspect of any embodiment herein, the amino acid at Kabat heavy chain position 67 is valine (V).

In one aspect of any embodiment herein, the amino acid at Kabat heavy chain position 71 is arginine (R).

Positions in the VH and VL domains herein are described using the Kabat numbering system (Kabat et al. (1991) Sequences of Protein of Immunological Interest, 5th ed., United States Public Health Service, National Institute of Health, Bethesda, MD).

In one aspect, the anti-CD73 antibody comprises a VH domain having at least about 80% sequence identity (e.g., at least about 85%, 90%, 95%, 97%, 98% or 99% identity, or 100% identity) to the VH domain of SEQ ID NOS: 37 or 42.

In one aspect, the anti-CD73 antibody or antibody fragment comprises a VL domain having at least about 80% sequence identity (e.g., at least about 85%, 90%, 95%, 97%, 98% or 99% identity, or 100% identity) to the VL domain of any of SEQ ID NOS: 33-36 or 43-46.

In one aspect, the anti-CD73 antibody or antibody fragment comprises a VH domain having at least about 80% sequence identity (e.g., at least about 85%, 90%, 95%, 97%, 98% or 99% identity, or 100% identity) to the VH domain of SEQ ID NO: 42, and a VL domain having at least about 80% sequence identity (e.g., at least about 85%, 90%, 95%, 97%, 98% or 99% identity, or 100% identity) to the VL domain of any of SEQ ID NOS: 43-46.

In one aspect, the anti-CD73 antibody or antibody fragment comprises a heavy chain having at least about 80% sequence identity (e.g., at least about 85%, 90%, 95%, 97%, 98% or 99% identity, or 100% identity) to the heavy chain of SEQ ID NO: 38 of the H4+L1 antibody. In one embodiment, the antibody or antibody fragment comprises a light chain having at least about 80% sequence identity (e.g., at least about 85%, 90%, 95%, 97%, 98% or 99% identity, or 100% identity) to the light chain of SEQ ID NO: 39 of the H4+L1 antibody.

In one aspect, the anti-CD73 antibody or antibody fragment comprises a heavy chain having at least about 80% sequence identity (e.g., at least about 85%, 90%, 95%, 97%, 98% or 99% identity, or 100% identity) to the heavy chain of SEQ ID NO: 47 of the 2H4+2L1 antibody. In one embodiment, the antibody or antibody fragment comprises a light chain having at least about 80% sequence identity (e.g., at least about 85%, 90%, 95%, 97%, 98% or 99% identity, or 100% identity) to the light chain of SEQ ID NO: 48 of the 2H4+2L1 antibody.

DNA encoding an antibody can be prepared and placed in an appropriate expression vector for transfection into an appropriate host. The host is then used for the recombinant production of the antibody, or variants thereof, such as a humanized version of that monoclonal antibody, active fragments of the antibody, chimeric antibodies comprising the antigen recognition portion of the antibody, or versions comprising a detectable moiety.

DNA encoding the monoclonal antibodies of the disclosure can be readily isolated and sequenced using conventional procedures (e.g., by using oligonucleotide probes that are capable of binding specifically to genes encoding the heavy and light chains of murine antibodies). In one aspect, provided is a nucleic acid encoding a heavy chain or a light chain of an anti-CD73 antibody of any embodiment herein. Once isolated, the DNA can be placed into expression vectors, which are then transfected into host cells such as *E. coli* cells, simian COS cells, Chinese hamster ovary (CHO) cells, or myeloma cells that do not otherwise produce immunoglobulin protein, to obtain the synthesis of monoclonal antibodies in the recombinant host cells. Such DNA sequences can be modified for any of a large number of purposes, e.g., for humanizing antibodies, producing fragments or derivatives, or for modifying the sequence of the antibody, e.g., in the antigen binding site in order to optimize the binding specificity of the antibody. In one embodiment, provided is an isolated nucleic acid sequence encoding a light chain and/or a heavy chain of an antibody, as well as a recombinant host cell comprising (e.g., in its genome) such nucleic acid. Recombinant expression in bacteria of DNA encoding the antibody is well known in the art (see, for example, Skerra et al., Curr. Opinion in Immunol., 5, pp. 256 (1993); and Pluckthun, Immunol. 130, p. 151 (1992).

Fragments and derivatives of antibodies (which are encompassed by the term "antibody" or "antibodies" as used in this application, unless otherwise stated or clearly contradicted by context) can be produced by techniques that are known in the art.

"Fragments" comprise a portion of the intact antibody, generally the antigen binding site or variable region. Examples of antibody fragments include Fab, Fab', Fab'-SH, F (ab') 2, and Fv fragments; diabodies; any antibody fragment that is a polypeptide having a primary structure consisting of one uninterrupted sequence of contiguous amino acid residues (referred to herein as a "single-chain antibody fragment" or "single chain polypeptide"); and multispecific (e.g., bispecific) antibodies formed from antibody fragments.

Typically, an anti-CD73 antibody provided herein has an affinity for a CD73 polypeptide (e.g., a CD73 polypeptide as produced in the Examples herein) in the range of about $10^4$ to about $10^{11}$ M$^{-1}$ (e.g., about $10^8$ to about $10^{10}$ M$^{-1}$). For example, in a particular aspect the disclosure provides Anti-CD73 antibody that have an average disassociation constant ($K_D$) of less than $1 \times 10^{-9}$ M with respect to CD73, as determined by, e.g., surface plasmon resonance (SPR) screening (such as by analysis with a BIAcore™ SPR analytical device). In a more particular exemplary aspect, the disclosure provides anti-CD73 antibodies that have a $K_D$ of about $1 \times 10^{-8}$ M to about $1 \times 10^{-10}$ M, or about $1 \times 10^{-9}$ M to about $1 \times 10^{-11}$ M, for CD73.

Antibodies can be characterized for example by a mean KD of no more than about (i.e. better affinity than) 100, 60, 10, 5, or 1 nanomolar, preferably sub-nanomolar or optionally no more than about 500, 200, 100 or 10 picomolar. KD can be determined for example for example by immobilizing recombinantly produced human CD73 proteins on a chip surface, followed by application of the antibody to be tested in solution. In one embodiment, the method further comprises a step (d), selecting antibodies from (b) that are capable of competing for binding to CD73 with control antibody.

In one embodiment, the anti-CD73 antibodies can be prepared such that they do not have substantial binding to human Fcγ receptors, e.g., any one or more of CD16A, CD16B, CD32A, CD32B and/or CD64). Such antibodies may comprise constant regions of various heavy chains that are known to lack or have low binding to Fcγ receptors. Alternatively, antibody fragments that do not comprise (or comprise portions of) constant regions, such as F(ab')2 fragments, can be used to avoid Fc receptor binding. Fc receptor binding can be assessed according to methods known in the art, including for example testing binding of an antibody to Fc receptor protein in a BIACORE assay. Also, generally any antibody IgG isotype can be used in which the Fc portion is modified (e.g., by introducing 1, 2, 3, 4, 5 or more amino acid substitutions) to minimize or eliminate binding to Fc receptors (see, e.g., WO 03/101485, the disclosure of which is herein incorporated by reference). Assays such to assess Fc receptor binding are well known in the art, and are described in, e.g., WO 03/101485.

In one embodiment, the antibody can comprise one or more specific mutations in the Fc region that result in "Fc silent" antibodies that have minimal interaction with effector cells. Silenced effector functions can be obtained by mutation in the Fc region of the antibodies and have been described in the art: N297A mutation, the LALA mutations, (Strohl, W., 2009, Curr. Opin. Biotechnol. Vol. 20(6):685-691); and D265A (Baudino et al., 2008, J. Immunol. 181: 6664-69) see also Heusser et al., WO2012/065950, the disclosures of which are incorporated herein by reference. In one embodiment, an antibody comprises one, two, three or more amino acid substitutions in the hinge region. In one embodiment, the antibody is an IgG1 or IgG2 and comprises one, two or three substitutions at residues 233-236, optionally 233-238 (EU numbering). In one embodiment, the antibody is an IgG4 and comprises one, two or three substitutions at residues 327, 330 and/or 331 (EU numbering). Examples of silent Fc IgG1 antibodies are the LALA mutant comprising L234A and L235A mutation in the IgG1 Fc amino acid sequence. Another example of an Fc silent mutation is a mutation at residue D265, or at D265 and P329 for example as used in an IgG1 antibody as the DAPA (D265A, P329A) mutation (U.S. Pat. No. 6,737,056). Another silent IgG1 antibody comprises a mutation at residue N297 (e.g., N297A, N297S mutation), which results in aglycosylated/non-glycosylated antibodies. Other silent mutations include: substitutions at residues L234 and G237 (L234A/G237A); substitutions at residues S228, L235 and R409 (S228P/L235E/R409K,T,M,L); substitutions at residues H268, V309, A330 and A331 (H268Q/V309L/A330S/A331S); substitutions at residues C220, C226, C229 and P238 (C220S/C226S/C229S/P238S); substitutions at residues C226, C229, E233, L234 and L235 (C226S/C229S/E233P/L234V/L235A; substitutions at residues K322, L235 and L235 (K322A/L234A/L235A); substitutions at residues L234, L235 and P331 (L234F/L235E/P331S); substitutions at residues 234, 235 and 297; substitutions at residues E318, K320 and K322 (L235E/E318A/K320A/K322A); substitutions at residues (V234A, G237A, P238S); substitutions at residues 243 and 264; substitutions at residues 297 and 299; substitutions such that residues 233, 234, 235, 237, and 238 defined by the EU numbering system, comprise a sequence selected from PAAAP, PAAAS and SAAAS (see WO2011/066501).

In one embodiment, the antibody can comprise one or more specific mutations in the Fc region. For example, such an antibody can comprise an Fc domain of human IgG1 origin, comprises a mutation at Kabat residue(s) 234, 235, 237, 330 and/or 331. One example of such an Fc domain comprises substitutions at Kabat residues L234, L235 and P331 (e.g., L234A/L235E/P331S or (L234F/L235E/P331S). Another example of such an Fc domain comprises substitutions at Kabat residues L234, L235, G237 and P331 (e.g., L234A/L235E/G237A/P331S). Another example of such an Fc domain comprises substitutions at Kabat residues L234, L235, G237, A330 and P331 (e.g., L234A/L235E/G237A/A330S/P331S). In one embodiment, the antibody comprises an Fc domain, optionally of human IgG1 isotype, comprising: a L234$X_1$ substitution, a L235$X_2$ substitution, and a P331$X_3$ substitution, wherein $X_1$ is any amino acid residue other than leucine, $X_2$ is any amino acid residue other than leucine, and $X_3$ is any amino acid residue other than proline; optionally wherein $X_1$ is an alanine or phenylalanine or a conservative substitution thereof; optionally wherein $X_2$ is glutamic acid or a conservative substitution thereof; optionally wherein $X_3$ is a serine or a conservative substitution thereof. In another embodiment, the antibody comprises an Fc domain, optionally of human IgG1 isotype, comprising: a L234$X_1$ substitution, a L235$X_2$ substitution, a G237$X_4$ substitution and a P331$X_4$ substitution, wherein $X_1$ is any amino acid residue other than leucine, $X_2$ is any amino acid residue other than leucine, $X_3$ is any amino acid residue other than glycine, and $X_4$ is any amino acid residue other than proline; optionally wherein $X_1$ is an alanine or phenylalanine or a conservative substitution thereof; optionally wherein $X_2$ is glutamic acid or a conservative substitution thereof; optionally, $X_3$ is alanine or a conservative substitution thereof; optionally $X_4$ is a serine or a conservative substitution thereof. In another embodiment, the antibody comprises an Fc domain, optionally of human IgG1 isotype, comprising: a L234$X_1$ substitution, a L235$X_2$ substitution, a G237$X_4$ substitution, G330$X_4$ substitution, and a P331$X_5$ substitution, wherein $X_1$ is any amino acid residue other than leucine, $X_2$ is any amino acid residue other than leucine, $X_3$ is any amino acid residue other than glycine, $X_4$ is any amino acid residue other than alanine, and $X_5$ is any amino acid residue other than proline; optionally wherein $X_1$ is an alanine or phenylalanine or a conservative substitution thereof; optionally wherein $X_2$ is glutamic acid or a conservative substitution thereof; optionally, $X_3$ is alanine or a conservative substitution thereof; optionally, $X_4$ is serine or a conservative substitution thereof; optionally $X_5$ is a serine or a conservative substitution thereof.

In the shorthand notation used here, the format is: Wild type residue: Position in polypeptide: Mutant residues, wherein residue positions are indicated according to EU numbering according to Kabat.

In one embodiment, an antibody comprises a heavy chain constant region comprising the amino acid sequence below, or an amino acid sequence at least 90%, 95% or 99% identical thereto but retaining the amino acid residues at Kabat positions 234, 235 and 331 (underlined):

(SEQ ID NO: 16)
A S T K G P S V F P L A P S S K S T S G G T A A L G C L V K D Y F P

E P V T V S W N S G A L T S G V H T F P A V L Q S S G L Y S L S S V

V T V P S S S L G T Q T Y I C N V N H K P S N T K V D K R V E P K S

C D K T H T C P P C P A P E A E G G P S V F L F P P K P K D T L M I

S R T P E V T C V V V D V S H E D P E V K F N W Y V D G V E V H N A

K T K P R E E Q Y N S T Y R V V S V L T V L H Q D W L N G K E Y K C

K V S N K A L P A S I E K T I S K A K G Q P R E P Q V Y T L P P S R

E E M T K N Q V S L T C L V K G F Y P S D I A V E W E S N G Q P E N

N Y K T T P P V L D S D G S F F L Y S K L T V D K S R W Q Q G N V F

S C S V M H E A L H N H Y T Q K S L S L S P G K.

In one embodiment, an antibody comprises a heavy chain constant region comprising the amino acid sequence below, or an amino acid sequence at least 90%, 95% or 99% identical thereto but retaining the amino acid residues at Kabat positions 234, 235 and 331 (underlined):

(SEQ ID NO: 17)
A S T K G P S V F P L A P S S K S T S G G T A A L G C L V K D Y F P

E P V T V S W N S G A L T S G V H T F P A V L Q S S G L Y S L S S V

V T V P S S S L G T Q T Y I C N V N H K P S N T K V D K R V E P K S

C D K T H T C P P C P A P E F E G G P S V F L F P P K P K D T L M I

S R T P E V T C V V V D V S H E D P E V K F N W Y V D G V E V H N A

K T K P R E E Q Y N S T Y R V V S V L T V L H Q D W L N G K E Y K C

K V S N K A L P A S I E K T I S K A K G Q P R E P Q V Y T L P P S R

E E M T K N Q V S L T C L V K G F Y P S D I A V E W E S N G Q P E N

N Y K T T P P V L D S D G S F F L Y S K L T V D K S R W Q Q G N V F

S C S V M H E A L H N H Y T Q K S L S L S P G K.

In one embodiment, an antibody comprises a heavy chain constant region comprising the amino acid sequence below, or an amino acid sequence at least 90%, 95% or 99% identical thereto but retaining the amino acid residues at Kabat positions 234, 235, 237, 330 and 331 (underlined):

(SEQ ID NO: 18)
A S T K G P S V F P L A P S S K S T S G G T A A L G C L V K D Y F P
E P V T V S W N S G A L T S G V H T F P A V L Q S S G L Y S L S S V
V T V P S S S L G T Q T Y I C N V N H K P S N T K V D K R V E P K S
C D K T H T C P P C P A P E A E G A P S V F L F P P K P K D T L M I
S R T P E V T C V V V D V S H E D P E V K F N W Y V D G V E V H N A
K T K P R E E Q Y N S T Y R V V S V L T V L H Q D W L N G K E Y K C
K V S N K A L P S S I E K T I S K A K G Q P R E P Q V Y T L P P S R
E E M T K N Q V S L T C L V K G F Y P S D I A V E W E S N G Q P E N
N Y K T T P P V L D S D G S F F L Y S K L T V D K S R W Q Q G N V F
S C S V M H E A L H N H Y T Q K S L S L S P G K.

In one embodiment, an antibody comprises a heavy chain constant region comprising the amino acid sequence below, or a sequence at least 90%, 95% or 99% identical thereto but retaining the amino acid residues at Kabat positions 234, 235, 237 and 331 (underlined):

(SEQ ID NO: 19)
A S T K G P S V F P L A P S S K S T S G G T A A L G C L V K D Y F P
E P V T V S W N S G A L T S G V H T F P A V L Q S S G L Y S L S S V
V T V P S S S L G T Q T Y I C N V N H K P S N T K V D K R V E P K S
C D K T H T C P P C P A P E A E G A P S V F L F P P K P K D T L M I
S R T P E V T C V V V D V S H E D P E V K F N W Y V D G V E V H N A
K T K P R E E Q Y N S T Y R V V S V L T V L H Q D W L N G K E Y K C
K V S N K A L P A S I E K T I S K A K G Q P R E P Q V Y T L P P S R
E E M T K N Q V S L T C L V K G F Y P S D I A V E W E S N G Q P E N
N Y K T T P P V L D S D G S F F L Y S K L T V D K S R W Q Q G N V F
S C S V M H E A L H N H Y T Q K S L S L S P G K.

Fc silent antibodies result in no or low ADCC activity, meaning that an Fc silent antibody exhibits an ADCC activity that is below 50% specific cell lysis. Preferably an antibody substantially lacks ADCC activity, e.g., the Fc silent antibody exhibits an ADCC activity (specific cell lysis) that is below 5% or below 1%. Fc silent antibodies can also result in lack of FcγR-mediated cross-linking of CD73 at the surface of a CD73-expressing cell.

In one embodiment, the antibody has a substitution in a heavy chain constant region at any one, two, three, four, five or more of residues selected from the group consisting of: 220, 226, 229, 233, 234, 235, 236, 237, 238, 243, 264, 268, 297, 298, 299, 309, 310, 318, 320, 322, 327, 330, 331 and 409 (numbering of residues in the heavy chain constant region is according to EU numbering according to Kabat). In one embodiment, the antibody comprises a substitution at residues 234, 235 and 322. In one embodiment, the antibody comprises a substitution at residues 234, 235 and 331. In one embodiment, the antibody comprises a substitution at residues 234, 235, 237 and 331. In one embodiment, the antibody comprises a substitution at residues 234, 235, 237, 330 and 331. In one embodiment, the Fc domain is of human IgG1 subtype. Amino acid residues are indicated according to EU numbering according to Kabat.

In one embodiment, the antibody comprises an Fc domain comprising an amino acid substitution that increases binding to human FcRn polypeptides in order to increase the in vivo half-life of the antibody. Exemplary mutations are described in Strohl, W., 2009, Curr. Opin. Biotechnol. Vol. 20(6):685-691, the disclosure of which is incorporated herein by reference. Examples of substitutions used in antibodies of human IgG1 isotype are substitutions at Kabat residues M252, S254 and T256; substitutions at residues T250 and M428; substitutions at residue N434; substitutions at residues H433 and N434; substitutions at residues T307, E380 and N434; substitutions at residues T307, E380, and N434; substitutions at residues M252, S254, T256, H433, N434 and 436; substitutions at residue I253; substitutions at residues P257, N434, D376 and N434. An antigen-binding compound can at any desired stage be assessed for its ability to inhibit the enzymatic activity of CD73, notably to block the 5'-nucleotidase activity of CD73 and to reduce the production of adenosine by a CD73-expressing cell, and in turn restore the activity of and/or relieve the adenosine-mediated inhibition of lymphocytes.

The ability of an antibody to inhibit the enzymatic activity of CD73 can be tested in a cell-free assay using recombinant soluble human CD73 (as dimers) and AMP, where conversion of AMP to adenosine (and/or inhibition thereof) is detected directly (e.g., by measurement of substrates and products, i.e. AMP, adenosine and/or phosphate), or indirectly. In one example, AMP and/or adenosine are detected via HPLC before and after incubation of the test compound with recombinant CD73.

The CD73-inhibitory activity of an antibody can also be assessed in any of a number of other ways. For example, in an indirect assay, a luciferase-based reagent is used (e.g., CellTiter-Glo® system available from Promega), to detect the disappearance of AMP. The luciferase reaction in the assay is inhibited by AMP. Adding the CD73 enzyme to the reaction degrades the AMP, and relieves the inhibition, producing a detectable signal.

The assays using soluble CD73 will be include testing at conditions where the antibodies are provided at a substantial molar excess (e.g., 10-fold, 20-fold, 50-fold, 100-fold, etc.) to the CD73 polypeptide dimers. When provided in molar excess to the enzyme, the anti-CD73 antibodies will no longer be capable of forming multimeric complexes of antibodies and CD73 dimers; antibodies that retain inhibition of the enzymatic activity of CD73 can then be selected.

The ability of an antibody to inhibit the 5'-ectonucleotidase enzymatic activity of CD73 can alternatively or in addition also be tested in a cellular assay (using cells that express CD73). Advantageously, antibodies can be tested or screened first in the cell-free assay to identify antibodies that block the activity of the enzyme to reduce likelihood of selecting antibodies that inhibit CD73 by causing internalization of CD73, and then tested as purified antibody in cellular assays. Cellular assays can be carried out as shown in the Examples herein or as disclosed in PCT publication no. WO2016/055609, the disclosure of which is incorporated herein by reference. For example, CD73-expressing cells (e.g., MDA-MB-231 cell line) are plated in flat-bottom 96 well plates in presence of anti-CD73 antibodies and incubated, as detailed in WO2016/055609. AMP is added to the cells and incubated at 4° C. (to avoid CD73 down-modulation). Plates are then centrifuged and supernatant is transferred to flat bottom 96 well culture plate. Free phosphate produced by the hydrolysis of AMP into adenosine is then quantified. A decrease in hydrolysis of AMP into adenosine in the presence of antibody indicate the antibody inhibits cellular CD73.

In one embodiment, an antibody preparation causes at least a 50% decrease in the enzymatic activity of a CD73 polypeptide, preferably at least a 60%, 70% or 80% decrease in the enzymatic activity of a CD73 polypeptide (e.g., a soluble homodimeric CD73 polypeptide; CD73 expressed by cells).

The activity of an antibody can also be measured in an indirect assay for its ability to modulate the activity of lymphocytes, for example to relieve the adenosine-mediated inhibition of lymphocyte activity, or to cause the activation of lymphocyte activity. This can be addressed, for example, using a cytokine-release assay. In another example, an antibody can be evaluated in an indirect assay for its ability to modulate the proliferation of lymphocytes.

In one embodiment, an antibody neutralizes the 5'-ectonucleotidase activity of a homodimeric human CD73 polypeptide in solution. In one embodiment, the antibody binds and inhibits the enzymatic activity of a soluble human CD73 polypeptide, notably an antibody that neutralizes the CD73-mediated catabolism of AMP to adenosine. In one embodiment, the antibody binds CD73 in bivalent manner. In one embodiment, the antibody is a non-depleting antibody e.g., an Fc silent antibody that substantially lacks binding to human Fcγ receptors. In one embodiment, the antibody neutralizes CD73 in solution without reliance on induction of CD73 polypeptide: anti-CD73 antibody oligomers.

In one embodiment, an antibody specifically binds human CD73 at the surface of a cell and that is capable of neutralizing the 5'-ectonucleotidase activity of a soluble human CD73 polypeptide. In one embodiment, the antibody does not induce the oligomerization of the soluble CD73.

In one embodiment, an antibody specifically binds human CD73 at the surface of a cell and is capable of neutralizing the 5'-ectonucleotidase activity of cellular CD73 (CD73 expressed by cells). In one embodiment, an antibody specifically binds and neutralizes the 5'-ectonucleotidase activity of a human CD73 at the surface of a cell and is not internalized into CD73-expressing cells upon binding to CD73. The antibody does not cause multimerization and subsequent internalization of CD73. In one embodiment, an antibody binds and is capable of inhibiting the enzymatic activity of a recombinant human CD73 polypeptide in solution, wherein said antibody is not internalized into CD73-expressing cells. In one embodiment, the non-internalizing antibody binds CD73 in bivalent manner. In one embodiment, the antibody is a non-depleting antibody, e.g., an Fc silent antibody. The antibody is capable of neutralizing the 5'-ectonucleotidase activity of a dimeric human CD73 polypeptide in solution, moreover without reliance on induction of CD73 polypeptides: anti-CD73 antibodies oligomers.

In one embodiment, an antibody specifically binds bivalently to human CD73 polypeptides and inhibits the enzymatic activity of cellular human CD73 (and optionally further recombinant soluble human CD73), wherein said antibody does not induce or increase intracellular internalization of CD73 in CD73-expressing cells. Preferably, the antibody substantially lacks Fcγ receptor binding (e.g., via its Fc domain).

In one aspect, an antibody specifically binds human CD73 at the surface of a cell pre-incubated with AMP, and is capable of neutralizing the 5'-ectonucleotidase activity thereof. Optionally, neutralizing the 5'-ectonucleotidase activity is determined by assessing neutralization of 5' ectonucleotidase activity in CD73-expressing cells (e.g. MDA-MB-231 cells) by quantifying hydrolysis of AMP to adenosine.

In one aspect, neutralization of the 5'-ectonucleotidase activity of CD73 expressed by a cell is determined by assessing the ability of an antibody to increase the proliferation of T cells when said T cells are induced to proliferate in vitro (e.g. via TCR co-stimulation, stimulation of CD3 and CD28 signaling, e.g., by contacting T cells with beads functionalized with CD3 agonists and CD28 agonists) in the presence of AMP (e.g. exogenously added AMP). In one aspect, neutralization of the 5'-ectonucleotidase activity assay is assessed using the T cell proliferation assay described in the section titled "Methods" in the Examples.

Antibodies can be characterized by their ability to bind to cells transfected with CD73 mutants, compared to the ability of anti-CD73 antibody to bind wild-type CD73 polypeptide (e.g., SEQ ID NO: 1). A reduction in binding between an anti-CD73 antibody and a mutant CD73 polypeptide means that there is a reduction in binding affinity (e.g., as measured by known methods such FACS testing of cells expressing a particular mutant, or by Biacore testing of binding to mutant polypeptides) and/or a reduction in the total binding capacity of the anti-CD73 antibody (e.g., as evidenced by a decrease in $B_{max}$ in a plot of anti-CD73 antibody concentration versus polypeptide concentration). A significant reduction in binding indicates that the mutated residue is directly involved in binding to the anti-CD73 antibody or is in close proximity to the binding protein when the anti-CD73 antibody is bound to CD73.

In some embodiments, a significant reduction in binding means that the binding affinity and/or capacity between an anti-CD73 antibody and a mutant CD73 polypeptide is reduced by greater than 40%, greater than 50%, greater than 55%, greater than 60%, greater than 65%, greater than 70%, greater than 75%, greater than 80%, greater than 85%, greater than 90% or greater than 95% relative to binding between the antibody and a wild type CD73 polypeptide. In certain embodiments, binding is reduced below detectable limits. In some embodiments, a significant reduction in binding is evidenced when binding of an anti-CD73 antibody to a mutant CD73 polypeptide is less than 50% (e.g., less than 45%, 40%, 35%, 30%, 25%, 20%, 15% or 10%) of the binding observed between the anti-CD73 antibody and a wild-type CD73 polypeptide.

In one aspect, the anti-CD73 antibodies have reduced binding to a CD73 polypeptide having a mutation at residue K136 (with reference to SEQ ID NO: 1); optionally, the mutant CD73 polypeptide has the mutation: K136A.

In one aspect, the anti-CD73 antibodies have reduced binding to a CD73 polypeptide having a mutation at a residue selected from the group consisting of: K97, E125, Q153 and K330 (with reference to SEQ ID NO: 1); optionally, the mutant CD73 polypeptide has the mutations: K97A, E125A, Q153A and/or K330A (e.g., K97A, E125A and K330A; K97A, E125A and/or Q153A).

In one aspect, the anti-CD73 antibodies have reduced binding to a CD73 polypeptide having a mutation at a residue selected from the group consisting of: A99, E129, K133, E134, and A135 (with reference to SEQ ID NO: 1); optionally, the mutant CD73 polypeptide has the mutations: A99S, E129A, K133A, E134N, and/or A135S.

Optionally, in one aspect, the anti-CD73 antibodies do not have reduced binding to a CD73 polypeptide having a mutation at a residue selected from the group consisting of: Q70, R73, A74, A107 and R109 (with reference to SEQ ID NO: 1); optionally, the mutant CD73 polypeptide has the mutations: A99S, Q70S, R73A, A74E, A107I and/or R109G.

In one aspect, the anti-CD73 antibodies bind an epitope on CD73 comprising residue K136 (with reference to SEQ ID NO: 1).

In one aspect, the anti-CD73 antibodies bind an epitope on CD73 comprising one, two, three or four of the residues selected from the group consisting of K97, E125, Q153 and K330 (with reference to SEQ ID NO: 1).

In one aspect, the anti-CD73 antibodies bind an epitope on CD73 comprising one, two, three, four or five of the residues selected from the group consisting of A99, E129, K133, E134, and A135 (with reference to SEQ ID NO: 1).

In one aspect, the anti-CD73 antibodies bind an epitope on CD73 comprising one, two, three, four, five or more of the residues selected from the group consisting of K97, A99, E125, E129, K133, E134, A135 and K136 (with reference to SEQ ID NO: 1). In one aspect, the anti-CD73 antibodies bind an epitope on CD73 comprising one, two, three, four, five or more of the residues selected from the group consisting of K97, A99, E125, E129, K133, E134, A135, K136, Q153 and K330 (with reference to SEQ ID NO: 1.

Optionally, in one aspect, the anti-CD73 antibodies do not bind an epitope on CD73 comprising one, two, three, four or five of the residues selected from the group consisting of Q70, R73, A74, A107 and R109 (with reference to SEQ ID NO: 1).

An anti-CD73 antibody can be incorporated in a pharmaceutical formulation comprising in a concentration from 1 mg/ml to 500 mg/ml, wherein said formulation has a pH from 2.0 to 10.0. The formulation may further comprise a buffer system, preservative(s), tonicity agent(s), chelating agent(s), stabilizers and surfactants. In one embodiment, the pharmaceutical formulation is an aqueous formulation, i.e., formulation comprising water. Such formulation is typically a solution or a suspension. In a further embodiment, the pharmaceutical formulation is an aqueous solution. The term "aqueous formulation" is defined as a formulation comprising at least 50% w/w water. Likewise, the term "aqueous solution" is defined as a solution comprising at least 50% w/w water, and the term "aqueous suspension" is defined as a suspension comprising at least 50% w/w water.

In another embodiment, the pharmaceutical formulation is a freeze-dried formulation, whereto the physician or the patient adds solvents and/or diluents prior to use.

In another embodiment, the pharmaceutical formulation is a dried formulation (e.g., freeze-dried or spray-dried) ready for use without any prior dissolution.

In a further aspect, the pharmaceutical formulation comprises an aqueous solution of such an antibody, and a buffer, wherein the antibody is present in a concentration from 1 mg/ml or above, and wherein said formulation has a pH from about 2.0 to about 10.0.

In another embodiment, the pH of the formulation is in the range selected from the list consisting of from about 2.0 to about 10.0, about 3.0 to about 9.0, about 4.0 to about 8.5, about 5.0 to about 8.0, and about 5.5 to about 7.5.

In a further embodiment, the buffer is selected from the group consisting of sodium acetate, sodium carbonate, citrate, glycylglycine, histidine, glycine, lysine, arginine, sodium dihydrogen phosphate, disodium hydrogen phosphate, sodium phosphate, and tris(hydroxymethyl)-aminomethan, bicine, tricine, malic acid, succinate, maleic acid, fumaric acid, tartaric acid, aspartic acid or mixtures thereof. Each one of these specific buffers constitutes an alternative embodiment.

In a further embodiment, the formulation further comprises a pharmaceutically acceptable preservative. In a further embodiment, the formulation further comprises an isotonic agent. In a further embodiment, the formulation also comprises a chelating agent. In a further embodiment the formulation further comprises a stabilizer. In a further embodiment, the formulation further comprises a surfactant. For convenience reference is made to Remington: The Science and Practice of Pharmacy, 19th edition, 1995.

It is possible that other ingredients may be present in the peptide pharmaceutical formulation. Such additional ingredients may include wetting agents, emulsifiers, antioxidants, bulking agents, tonicity modifiers, chelating agents, metal ions, oleaginous vehicles, proteins (e.g., human serum albumin, gelatine or proteins) and a zwitterion (e.g., an amino acid such as betaine, taurine, arginine, glycine, lysine and histidine). Such additional ingredients, of course, should not adversely affect the overall stability of the pharmaceutical formulation.

Pharmaceutical compositions containing an antibody may be administered to a patient in need of such treatment at several sites, for example, at topical sites, for example, skin and mucosal sites, at sites which bypass absorption, for example, administration in an artery, in a vein, in the heart, and at sites which involve absorption, for example, administration in the skin, under the skin, in a muscle or in the abdomen. Administration of pharmaceutical compositions may be through several routes of administration, for example, subcutaneous, intramuscular, intraperitoneal, intravenous, lingual, sublingual, buccal, in the mouth, oral, in the stomach and intestine, nasal, pulmonary, for example, through the bronchioles and alveoli or a combination thereof, epidermal, dermal, transdermal, vaginal, rectal, ocular, for examples through the conjunctiva, uretal, and parenteral to patients in need of such a treatment.

Diagnosis and Treatment of Malignancies

Methods of treating an individual, notably a human patient, using an anti-CD73 antibody or antibody fragment as described herein are also provided for. In one embodiment, the disclosure provides for the use of an antibody or antibody fragment as described herein in the preparation of a pharmaceutical composition for administration to a human patient. Typically, the patient suffers from, or is at risk for, cancer or an infectious disease (e.g., viral or bacterial infection).

For example, in one aspect, provided is a method of restoring or potentiating the activity of immune cells (e.g., lymphocytes) in a patient in need thereof, comprising the step of administering a neutralizing anti-CD73 antibody of the disclosure to said patient. In one embodiment, the method is directed at increasing the activity of immune cells (e.g., T cells) in patients having a disease such as a cancer or an infectious disease in which increased immune cell activity and/or infiltration of to a site of disease (e.g., tumor environment or site of infection) is beneficial or which is caused or characterized by immunosuppression, immunosuppressive cells, or, e.g., adenosine generated by CD4 T cells, CD8 T cells, B cells).

The methods will be particularly useful for treating individuals having a tumor in which it is suspected the tumor microenvironment (and CD73-mediated adenosine production therein) may contribute to lack of recognition by the immune system (immune escape). The tumor environment may, for example, be characterized by CD73-expressing immune cells, e.g., CD4 T cells, CD8 T cells, B cells, and/or CD73-expressing tumor cells.

The methods and anti-CD73 antibodies can be utilized for the treatment and/or prevention of a variety of cancers and other proliferative diseases. Because these methods operate by reducing adenosine that inhibits the anti-tumor activity of lymphocytes and possibly additionally by increasing ATP that can increase the anti-tumor activity of lymphocytes, they are applicable to a broad range of cancers, including in particular solid tumors in which adenosine in the tumor microenvironment may play a strong role in suppressing the anti-tumor immune response. In one embodiment, a human patient treated with an anti-CD73 antibody has liver cancer, bone cancer, pancreatic cancer, skin cancer, cancer of the head or neck, breast cancer, lung cancer, non-small cell lung cancer (NSCLC), castrate resistant prostate cancer (CRPC), melanoma, uterine cancer, colon cancer, rectal cancer, cancer of the anal region, stomach cancer, testicular cancer, uterine cancer, carcinoma of the fallopian tubes, carcinoma of the endometrium, carcinoma of the cervix, carcinoma of the vagina, carcinoma of the vulva, non-Hodgkin's lymphoma, cancer of the esophagus, cancer of the small intestine, cancer of the endocrine system, cancer of the thyroid gland, cancer of the parathyroid gland, cancer of the adrenal gland, sarcoma of soft tissue, cancer of the urethra, cancer of the penis, solid tumors of childhood, lymphocytic lymphoma, cancer of the bladder, cancer of the kidney or ureter, carcinoma of the renal pelvis, neoplasm of the central nervous system (CNS), primary CNS lymphoma, tumor angiogenesis, spinal axis tumor, brain stem glioma, pituitary adenoma, Kaposi's sarcoma, epidermoid cancer, squamous cell cancer, environmentally induced cancers including those induced by asbestos, hematologic malignancies including, for example, multiple myeloma, B-cell lymphoma, Hodgkin lymphoma/primary mediastinal B-cell lymphoma, non-Hodgkin's lymphomas, acute myeloid lymphoma, chronic myelogenous leukemia, chronic lymphoid leukemia, follicular lymphoma, diffuse large B-cell lymphoma, Burkitt's lymphoma, immunoblastic large cell lymphoma, precursor B-lymphoblastic lymphoma, mantle cell lymphoma, acute lymphoblastic leukemia, mycosis fungoides, anaplastic large cell lymphoma, T-cell lymphoma, and precursor T-lymphoblastic lymphoma, and any combinations of said cancers. The present disclosure is also applicable to treatment of metastatic cancers. Patients can be tested or selected for one or more of the above described clinical attributes prior to, during or after treatment.

Because the methods and anti-CD73 antibodies operate by reducing adenosine that inhibits the activity and/or infiltration of immune cells (e.g., lymphocytes) and possibly additionally by increasing ATP that can increase the activity of lymphocytes, they are applicable to a broad range of infectious diseases, including preferably any infections caused by infection by viruses, bacteria, protozoa, molds or fungi.

In one embodiment, the anti-CD73 antibody is administered an amount effective to achieve and/or maintain in an individual (e.g., for 1, 2, 3, 4 weeks, and/or until the subsequent administration of antigen binding compound) a blood concentration of at least the $EC_{50}$, optionally the $EC_{70}$, optionally substantially the $EC_{100}$, for neutralization of the enzymatic activity of CD73. In one embodiment, the active amount of anti-CD73 antibody is an amount effective to achieve the $EC_{50}$, optionally the $EC_{70}$, optionally substantially the $EC_{100}$, for neutralization of the enzymatic activity of CD73 in an extravascular tissue of an individual. In one embodiment, the active amount of anti-CD73 antibody is an amount effective to achieve (or maintain) in an individual the $EC_{50}$, optionally the $EC_{70}$, optionally substantially the $EC_{100}$, for inhibition of neutralize the enzymatic activity of CD73.

In one embodiment, the anti-CD73 antibody is administered in an amount effective to achieve and/or maintain (e.g., for 1, 2, 3, 4 weeks, and/or until the subsequent administration of anti-CD73 antibody) in an individual a blood concentration of at least the $EC_{50}$, optionally the $EC_{70}$, optionally substantially the $EC_{100}$, for inhibition of CD73-mediated catabolism of AMP to adenosine (e.g., by assessing neutralization of 5' ectonucleotidase activity in MDA-MB-231 cells by quantifying hydrolysis of AMP to adenosine). In one embodiment, the amount of anti-CD73 antibody is an amount effective to achieve (or maintain) the $EC_{50}$, optionally the $EC_{70}$, optionally substantially the $EC_{100}$, for inhibition of CD73-mediated catabolism of AMP to adenosine in an extravascular tissue of an individual.

In one embodiment, provided is a method for treating or preventing cancer in an individual, the method comprising administering to an individual having disease an anti-CD73 antibody in an amount that achieves or maintains for a specified period of time a concentration in circulation, optionally in an extravascular tissue of interest (e.g., the tumor or tumor environment), that is higher than the concentration required for 50%, 70%, or full (e.g., 90%) receptor saturation CD73-expressing cells in circulation (for example as assessed in PBMC). Optionally the concentration achieved is at least 20%, 50% or 100% higher than the concentration required for the specified receptor saturation.

In one embodiment, provided is a method for treating or preventing cancer in an individual, the method comprising administering to the individual an anti-CD73 antibody in an amount that achieves or maintains for a specified period of time a concentration in circulation, optionally in an extravascular tissue of interest (e.g., the tumor or tumor environment), that is higher than the $EC_{50}$, optionally $EC_{70}$ or optionally $EC_{100}$, for binding to CD73-expressing cells (e.g., as assessed by titrating anti-CD73 antibody on CD73-expressing cells, for example MDA-MB-231 cells). Optionally the concentration achieved is at least 20%, 50% or 100% higher than the $EC_{50}$, optionally $EC_{70}$ or optionally $EC_{100}$, for binding to CD73-expressing cells.

In any embodiment, the antibody can for example have an $EC_{50}$, optionally $EC_{70}$ or optionally $EC_{100}$, for binding to CD73-expressing cells in human PBMC of between 0.5-100 ng/ml, optionally 1-100 ng/ml, optionally 30-100 ng/ml, e.g., about 30-90 ng/ml, (e.g., as assessed by titrating anti-CD73 antibody on CD73-expressing cells, for example MDA-MB-231 cells).

The $EC_{50}$ for neutralization of the enzymatic activity of CD73 with the anti-CD73 antibody can be for example between about 0.01 μg/ml and 1 μg/ml, optionally between 0.1 μg/ml and 10 μg/ml, optionally between 0.1 μg/ml and 1 μg/ml. For example the $EC_{50}$ may be about 0.1 μg/ml, about 0.2 μg/ml or about 0.3 μg/ml. Thus an amount of this anti-CD73 antibody is for example administered so at to achieve and/or maintain a blood concentration of at least 0.1 μg/ml, optionally at least 0.2 μg/ml, optionally at least 1 μg/ml, or optionally at least 2 μg/ml.

When tissues outside of the vasculature are targeted (the tumor environment, e.g., in the treatment of solid tumors), an approximately 10-fold higher dose is typically believed to be needed, compared to the dose that provides the corresponding concentration in circulation. An amount of anti-CD73 antibody administered so at to achieve (and/or maintain) a concentration in circulation (blood) of about 1 μg/ml, 2 μg/ml, 10 μg/ml, or 20 μg/ml is expected to achieve (and/or maintain) an extravascular tissue (e.g., tumor tissue) concentration of about 0.1 μg/ml, 0.2 μg/ml, 1 μg/ml, 2 μg/ml, respectively.

In one embodiment, an anti-CD73 antibody is for example administered in an amount so at to achieve and/or maintain a tissue (e.g., tumor environment) concentration of at least 0.1 μg/ml, optionally at least 0.2 μg/ml, optionally at least 1 μg/ml, or optionally at least 2 μg/ml. The antibody can for example be administered in an amount to achieve and/or maintained a blood concentration of at least about 1 μg/ml, 2 μg/ml, 10 μg/ml, or 20 μg/ml, e.g., between 1-100 μg/ml, 10-100 μg/ml, 1-50 μg/ml, 1-20 μg/ml, or 1-10 μg/ml. The amount administered can be adjusted to as to provide for maintenance of the desired concentration for the duration of a specified period of time following administration (e.g., 1, 2, 3, 4 weeks, etc.).

In some embodiments, an amount of anti-CD73 antibody is administered so as to obtain a concentration in blood (serum) or an extravascular tissue (e.g., tumor environment) that corresponds to at least the $EC_{70}$ or the $EC_{100}$ for neutralization of the enzymatic activity of CD73. The antibody can for example be administered in an amount to achieve and/or maintained a blood concentration or an extravascular tissue (e.g., tumor environment) of at least about 1 μg/ml, 2 μg/ml, 10 μg/ml, or 20 μg/ml.

The $EC_{50}$, $EC_{70}$ or the $EC_{100}$ can be assessed for example in a cellular assay for neutralization of the enzymatic activity of CD73 (e.g., neutralization of 5' ectonucleotidase activity in MDA-MB-231 cells by quantifying hydrolysis of AMP to adenosine). "$EC_{50}$" with respect to neutralization of the enzymatic activity of CD73, refers to the efficient concentration of anti-CD73 antibody which produces 50% of its maximum response or effect with respect to neutralization of the enzymatic activity). "$EC_{70}$" with respect to neutralization of the enzymatic activity of CD73, refers to the efficient concentration of anti-CD73 antibody which produces 70% of its maximum response or effect. "$EC_{100}$" with respect to neutralization of the enzymatic activity of CD73, refers to the efficient concentration of anti-CD73 antibody which produces its substantially maximum response or effect with respect to such neutralization of the enzymatic activity.

In some embodiments, particularly for the treatment of solid tumors, the concentration achieved is designed to lead to a concentration in tissues (outside of the vasculature, e.g., in the tumor or tumor environment) that corresponds to at least the $EC_{50}$ for neutralization of the enzymatic activity, optionally at about, or at least about, the $EC_{100}$.

In one embodiment, the amount of anti-CD73 antibody is between 1 and 20 mg/kg body weight. In one embodiment, the amount is administered to an individual weekly, every two weeks, monthly or every two months.

In one embodiment provided is a method of treating a human individual, comprising administering to the individual an effective amount of an anti-CD73 antibody of the disclosure for at least one administration cycle (optionally at least 2, 3, 4 or more administration cycles), wherein the cycle is a period of eight weeks or less, wherein for each of the at least one cycles, one, two, three or four doses of the anti-CD73 antibody are administered at a dose of 1-20 mg/kg body weight. In one embodiment, the anti-CD73 antibody is administered by intravenous infusion.

Suitable treatment protocols for treating a human include, for example, administering to the patient an amount as disclosed herein of an anti-CD73 antibody, wherein the method comprises at least one administration cycle in which at least one dose of the anti-CD73 antibody is administered. Optionally, at least 2, 3, 4, 5, 6, 7 or 8 doses of the anti-CD73 antibody are administered. In one embodiment, the administration cycle is between 2 weeks and 8 weeks.

A patient having a cancer can be treated with the anti-CD73 antibody with our without a prior detection step to assess expression of CD73 on cells in the tumor microenvironment (e.g., on tumor cells, CD4 T cells, CD8 T cells, B cells). Optionally, the treatment methods can comprises a step of detecting a CD73 nucleic acid or polypeptide in a biological sample from a tumor from an individual (e.g., cancer tissue or tissue proximal to or at the periphery of a cancer, cancer adjacent tissue, adjacent non-tumorous tissue or normal adjacent tissue). A determination that a biological sample comprises cells expressing CD73 (e.g., expressing CD73 at a high level, high intensity of staining with an anti-CD73 antibody, compared to a reference, for example healthy tissue) indicates that the patient has a cancer that may have a strong benefit from treatment with the anti-CD73 antibody. In one embodiment, the method comprises determining the level of expression of a CD73 nucleic acid or polypeptide in a biological sample and comparing the level to a reference level corresponding to a healthy individual. A determination that a biological sample comprises cells expressing CD73 nucleic acid or polypeptide at a level that is increased compared to the reference level (e.g. healthy tissue) indicates that the patient has a cancer that can be advantageously treated with an anti-CD73 antibody of the disclosure. Optionally, detecting a CD73 polypeptide in a biological sample comprises detecting CD73 polypeptide expressed on the surface of a malignant cell, or a CD4 T cell, a CD8 T cell or a B cell.

Determining whether an individual has a cancer characterized by cells that express a CD73 polypeptide can for example comprise obtaining a biological sample (e.g., by performing a biopsy) from the individual that comprises cells from the cancer environment (e.g., tumor or tumor adjacent tissue), bringing said cells into contact with an antibody that binds an CD73 polypeptide, and detecting whether the cells express CD73 on their surface. Optionally, determining whether an individual has cells that express CD73 comprises conducting an immunohistochemistry assay.

The antibody compositions may be advantageously-be used in combination with one or more other therapeutic agents, including agents normally utilized for the particular therapeutic purpose for which the antibody is being administered. The additional therapeutic agent will normally be administered in amounts and treatment regimens typically used for that agent in a monotherapy for the particular disease or condition being treated. Such therapeutic agents include, but are not limited to anti-cancer agents and chemotherapeutic agents.

In one embodiment, the anti-CD73 antibodies augment the efficacy of agents that neutralizes the inhibitory activity of human PD-1, e.g., that inhibits the interaction between PD-1 and PD-L1. Accordingly, in one embodiment, the second or additional second therapeutic agent is an antibody or other agent that neutralizes the inhibitory activity of human PD-1.

Programmed Death 1 (PD-1) (also referred to as "Programmed Cell Death 1") is an inhibitory member of the CD28 family of receptors. The complete human PD-1 sequence can be found under GenBank Accession No. U64863. Inhibition or neutralization the inhibitory activity of PD-1 can involve use of a polypeptide agent (e.g., an antibody, a polypeptide fused to an Fc domain, an immunoadhesin, etc.) that prevents PD-L1-induced PD-1 signalling. There are currently at least six agents blocking the PD-1/PD-L1 pathway that are marketed or in clinical evaluation. One agent is BMS-936558 (Nivolumab/ONO-4538, Bristol-Myers Squibb; formerly MDX-1106). Nivolumab, (Trade name Opdivo®) is an FDA-approved fully human IgG4 anti-PD-L1 mAb that inhibits the binding of the PD-L1 ligand to both PD-1 and CD80 and is described as antibody 5C4 in WO 2006/121168, the disclosure of which is incorporated herein by reference. For melanoma patients, the most significant OR was observed at a dose of 3 mg/kg, while for other cancer types it was at 10 mg/kg. Nivolumab is generally dosed at 10 mg/kg every 3 weeks until cancer progression. The terms "reduces the inhibitory activity of human PD-1", "neutralizes PD-1" or "neutralizes the inhibitory activity of human PD-1" refers to a process in which PD-1 is inhibited in its signal transduction capacity resulting from the interaction of PD-1 with one or more of its binding partners, such as PD-L1 or PD-L2. An agent that neutralizes the inhibitory activity of PD-1 decreases, blocks, inhibits, abrogates or interferes with signal transduction resulting from the interaction of PD-1 with one or more of its binding partners, such as PD-L1, PD-L2. Such an agent can thereby reduce the negative co-stimulatory signal mediated by or through cell surface proteins expressed on T lymphocytes, so as to enhance T-cell effector functions such as proliferation, cytokine production and/or cytotoxicity.

MK-3475 (human IgG4 anti-PD1 mAb from Merck), also referred to as lambrolizumab or pembrolizumab (Trade name Keytruda®) has been approved by the FDA for the treatment of melanoma and is being tested in other cancers. Pembrolizumab was tested at 2 mg/kg or 10 mg/kg every 2 or 3 weeks until disease progression. MK-3475, also known as Merck 3745 or SCH-900475, is also described in WO2009/114335.

MPDL3280A/RG7446 (atezolizumab, trade name Tecentriq™, anti-PD-L1 from Roche/Genentech) is a human anti-PD-L1 mAb that contains an engineered Fc domain designed to optimize efficacy and safety by minimizing FcγR binding and consequential antibody-dependent cellular cytotoxicity (ADCC). Doses of ≤0, 15, and 25 mg/kg MPDL3280A were administered every 3 weeks for up to 1 year. In phase 3 trial, MPDL3280A is administered at 1200 mg by intravenous infusion every three weeks in NSCLC.

AMP-224 (Amplimmune and GSK) is an immunoadhesin comprising a PD-L2 extracellular domain fused to an Fc domain. Other examples of agents that neutralize PD-1 may include an antibody that binds PD-L2 (an anti-PD-L2 antibody) and blocks the interaction between PD-1 and PD-L2.

Pidlizumab (CT-011; CureTech) (humanized IgG1 anti-PD1 mAb from CureTech/Teva), Pidlizumab (CT-011; CureTech) (see e.g., WO2009/101611) is another example; the agent was tested in thirty patients with rituximab-sensitive relapsed FL were treated with 3 mg/kg intravenous CT-011 every 4 weeks for 4 infusions in combination with rituximab dosed at 375 mg/m2 weekly for 4 weeks, starting 2 weeks after the first infusion of CT-011.

Further known PD-1 antibodies and other PD-1 inhibitors include AMP-224 (a B7-DC/IgG1 fusion protein licensed to GSK), AMP-514 described in WO 2012/145493, antibody MEDI-4736 (durvalumab, trade name Imfinzi™, an anti-PD-L1 developed by AstraZeneca/Medimmune) described in WO2011/066389 and US2013/034559, antibody YW243.55.S70 (an anti-PD-L1) described in WO2010/077634, MDX-1105, also known as BMS-936559, is an anti-PD-L1 antibody developed by Bristol-Myers Squibb described in WO2007/005874, and antibodies and inhibitors described in WO2006/121168, WO2009/014708, WO2009/114335 and WO2013/019906, the disclosures of which are hereby incorporated by reference. Further examples of anti-PD1 antibodies are disclosed in WO2015/085847 (Shanghai Hengrui Pharmaceutical Co. Ltd.), for example antibodies having light chain variable domain CDR1, 2 and 3 of SEQ ID NO: 6, SEQ ID NO: 7 and/or SEQ ID NO: 8, respectively, and antibody heavy chain variable domain CDR1, 2 and 3 of SEQ ID NO: 3, SEQ ID NO: 4 or SEQ ID NO: 5, respectively, wherein the SEQ ID NO references are the numbering according to WO2015/085847, the disclosure of which is incorporated herein by reference. Antibodies that compete with any of these antibodies for binding to PD-1 or PD-L1 also can be used. In some embodiments, the PD-1 neutralizing agent is an anti-PD-L1 antibody that inhibits the binding of PD-L1 to PD-1. In some embodiments, the PD-1 neutralizing agent is an anti-PD1 antibody that inhibits the binding of PD-1 to PD-L1. An exemplary anti-PD-1 antibody is pembrolizumab (commercialized by Merck & Co. as Keytruda™, see, also WO 2009/114335 the disclosure of which is incorporated herein by reference). An exemplary anti-PD-L1 is antibody MEDI-4736 (durvalumab, trade name Imfinzi™, an anti-PD-L1 developed by AstraZeneca/Medimmune.

In the treatment methods, the CD73-binding compound and the second therapeutic agent can be administered separately, together or sequentially, or in a cocktail. In some embodiments, the antigen-binding compound is administered prior to the administration of the second therapeutic agent. For example, the CD73-binding compound can be administered approximately 0 to 30 days prior to the administration of the second therapeutic agent. In some embodiments, an CD73-binding compound is administered from about 30 minutes to about 2 weeks, from about 30 minutes to about 1 week, from about 1 hour to about 2 hours, from about 2 hours to about 4 hours, from about 4 hours to about 6 hours, from about 6 hours to about 8 hours, from about 8 hours to 1 day, or from about 1 to 5 days prior to the administration of the second therapeutic agent. In some embodiments, a CD73-binding compound is administered concurrently with the administration of the therapeutic agents. In some embodiments, a CD73-binding compound is administered after the administration of the second therapeutic agent. For example, a CD73-binding compound can be administered approximately 0 to 30 days after the administration of the second therapeutic agent. In some embodiments, a CD73-binding compound is administered from about 30 minutes to about 2 weeks, from about 30 minutes to about 1 week, from about 1 hour to about 2 hours, from about 2 hours to about 4 hours, from about 4 hours to about 6 hours, from about 6 hours to about 8 hours, from about 8 hours to 1 day, or from about 1 to 5 days after the administration of the second therapeutic agent.

EXAMPLES

Methods
Cloning, Production and Purification of Recombinant huCD73
Molecular Biology The huCD73 protein was cloned from MIAPACA-2 cDNA using the following primers TACGACT-CACAAGCTTGCCGCCAC-CATGTGTCCCCGAGCCGCGCG (SEQ ID NO: 20) (Forward) and CCGCCCCGACTCTAGAtcaGTGATGGTGATGATGGTG cttgatccgaccttcaactg SEQ ID NO: 21) (Reverse). The purified PCR product was then cloned into an expression vector using the InFusion cloning system. A 6×His tag was added in the C-terminal part of the protein for the purification step.

```
Amino acid sequence of the cloned huCD73:
                                        (SEQ ID NO: 22)
MCPRAARAPATLLLALGAVLWPAAGAWELTILHTNDVHSRLEQTSEDSS

KCVNASRCMGGVARLFTKVQQIRRAEPNVLLLDAGDQYQGTIWFTVYKG

AEVAHFMNALRYDAMALGNHEFDNGVEGLIEPLLKEAKFPILSANIKAK

GPLASQISGLYLPYKVLPVGDEVVGIVGYTSKETPFLSNPGTNLVFEDE

ITALQPEVDKLKTLNVNKIIALGHSGFEMDKLIAQKVRGVDVVVGGHSN

TFLYTGNPPSKEVPAGKYPFIVTSDDGRKVPVVQAYAFGKYLGYLKIEF

DERGNVISSHGNPILLNSSIPEDPSIKADINKWRIKLDNYSTQELGKTI

VYLDGSSQSCRFRECNMGNLICDAMINNNLRHTDEMFWNHVSMCILNGG

GIRSPIDERNNGTITWENLAAVLPFGGTFDLVQLKGSTLKKAFEHSVHR

YGQSTGEFLQVGGIHVVYDLSRKPGDRVVKLDVLCTKCRVPSYDPLKMD

EVYKVILPNFLANGGDGFQMIKDELLRHDSGDQDINVVSTYISKMKVIY

PAVEGRIKHHHHHH.
```

Expression and Purification of the huCD73 Proteins

After validation of the sequence cloned, cells were nucleofected and the producing pool was then sub-cloned to obtain a cell clone producing the huCD73 protein. Supernatant from the huCD73 clone grown in roller was harvested and purified using Ni-NTA column and eluted using 250 mM imidazole. The purified proteins were then loaded onto a S200 size exclusion chromatography column. The purified protein corresponding to a dimer was formulated in a Tris 20 mM pH 7.5, NaCl 120 mM and CaCl2 4 mM buffer for enzyme activity assays, while formulation buffer is supplemented with 20% glycerol.

SPR Analysis to Assess Ab KD on Recombinant CD73 Protein

SPR measurements were performed on a Biacore™ T200 apparatus at 25° C. Protein-A (GE Healthcare) was immobilized on a Sensor Chip CM5 (GE Healthcare). The chip surface was activated with EDC/NHS (N-ethyl-N'-(3-dimethylaminopropyl) carbodiimide hydrochloride and N-hydroxysuccinimide (Biacore™, GE Healthcare). Protein-A was diluted to 10 µg/mL in coupling buffer (10 mM acetate, pH 5.6) and injected until the appropriate immobilization level was reached (i.e. 2000 RU). Deactivation of the remaining activated groups was performed using 100 mM ethanolamine pH 8 (Biacore™, GE Healthcare). Affinity study was carried out according to a standard Capture-Kinetic protocol recommended by the manufacturer (Biacore™, GE Healthcare kinetic wizard). Serial dilutions of human recombinant soluble CD73 protein, ranging from 1.23 to 300 nM were sequentially injected over the captured anti-CD73 antibodies and allowed to dissociate for 10 min before regeneration. The entire sensorgram sets were fitted using the 1:1 kinetic binding model. Bivalent affinities and kinetic association and dissociation rate constants are calculated.

Flow Cytometry Analysis to Assess Anti-CD73 Recognition by Antibodies $10^5$ MDA-MB-231 cells resuspended in FCSB were distributed into round-bottom 96 W-microplates (50 µL per well). A dose range of anti-CD73 mAbs was added to the plates and cells were incubated for 1 h at +5±3° C. Cells were washed three times in FCSB by spinning plates at 400 g for 3 min at 4° C. PE-conjugated Goat F(ab')2 Anti-Human IgG (H+L) secondary Ab diluted in FCSB was added to the cells and plates were incubated for 30 additional minutes at +5±3° C. Cells were washed three times as described above and analyzed on a flow cytometer.

Median of fluorescence intensity vs. mAb concentration was plotted on graphs and $EC_{50}$ was calculated using Graph-Pad Prism™ program.

In Vitro Enzymatic Assay with Recombinant Human or Cynomolgus CD73

Briefly, recombinant human or cynomolgus CD73 was incubated in white 96 W flat-bottom microplates in the presence of a dose-range of anti-CD73 or isotype control mAbs. Plates were incubated for 1 h at +37±1° C. ATP (12.5 µM) and AMP (125 µM) were added to each well and plates were incubated at +37±1° C. for 30 additional minutes. Luciferase/luciferin-containing CellTiter-Glo™ (Promega) was added into wells, plates were incubated for 5 minutes at RT in the dark and emitted light was measured using an Enspire™ apparatus (Perkin Elmer).

Conditions:
ATP+AMP: maximal luciferase inhibition (100%)
CD73+ATP+AMP: no luciferase inhibition (0%)

The residual enzyme activity vs. anti-CD73 Ab concentration is was plotted on graphs using GraphPad Prism7™ software.

T Cell Proliferation Assay

Peripheral blood from healthy donors was obtained and mononuclear cells were isolated on a Ficoll gradient. Lymphocytes were further enriched on a 52% Percoll™ gradient (cell pellets) and stained with a 2 µM CellTrace™ Violet (Thermofisher). $5 \times 10^4$ to $1 \times 10^5$ of stained cells were distributed in 96 w round-bottom plates, incubated for 1 h at 37° C. with anti-CD73 Abs and activated for 3 to 5 days by addition of anti-CD3/anti-CD28-coated beads. Inhibition of T cell proliferation was achieved by addition of 200 µM AMP. T cell proliferation and the ability of Abs to block the immune suppressive effect of AMP were assessed by flow cytometry by quantifying the dye dilution on proliferating T cells. Percentage of proliferating T cells vs. anti-CD73 Ab concentration was plotted on graphs using GraphPad Prism™ software. Some experiments were done on whole PBMC from healthy donors or cancer patients; the protocol was as described above except that T cell suppression was achieved by addition of 0.5 to 1 mM ATP.

In order to compare donors or patients, T cell proliferation was normalized using the following formula:

$$\frac{(\text{Activated cells} + AT(M)P + Ab) - (\text{Activated cells} + AT(M)P)}{(\text{Activated cells}) - (\text{Activated cells} + AT(M)P)} \times 100$$

Allogeneic Mixed Lymphocyte Reaction (MLR) Assay

Mononuclear cells from healthy donors were isolated on a Ficoll gradient and monocytes were purified by immunomagnetic selection using CD14 microbeads (Miltenyi Biotec). Monocytes were differentiated into dendritic cells (MoDC) by 5-7 days of culture in presence of GM-CSF (400 ng/ml) and IL-4 (20 ng/ml). The day of DC recovery, CD4+ T cells from allogeneic donors were purified by immunomagnetic depletion of non-CD4+ T cells (Miltenyi Biotec) and stained with Cell Trace™ Violet. DC ($10^4$ cells/well) and T cells ($5 \times 10^4$ cells/well) were mixed in 96 W round bottom microplates in presence of a dose-ranges of anti-huCD73 Abs and a fixed dose of ATP. T cell proliferation and Ab ability to reverse ATP-mediated suppression was assessed as described for T cell proliferation assay.

Example 1: Modelling and Generation of Anti-huCD73 Antibodies with Human Framework Sequences Parental antibody 3C12 described in PCT publication WO2016/055609 having VH and VL amino acid sequences of SEQ ID NOS: 27 and 28, respectively, was modified by the introduction into the VH of heavy chain frameworks (FR1, FR2, FR3) from the human subgroup IGHV1-3*01 together with IGHJ4*01 (FR4), and the introduction into the VL of light chain frameworks (FR1, FR2, FR3) from the human subgroup IGKV1-33*01, together with IGKJ2*01 (FR4).

Three-dimensional models based on different human VH and VL gene segments were superimposed and all amino acid differences were scrutinized one by one. The in silico molecular design was challenged using 3D models of both parental chimeric (HPLP) and humanized (H0L0) antibodies. Intrachain and extrachain connections between residues were also assessed in order to identify and to avoid disruption of any important low energy bond.

The VH and VL sequences of each designed domain were cloned into vectors containing the huIgG1-derived constant domains having L234A/L235E/G237A/A330S/P331S substitutions and the huCk constant domain respectively. The two obtained vectors were co-transfected into a CHO cell line. The established pool of cell was used to produce the antibody in the CHO medium. The antibody was then purified using protein A. The heavy and light chain sequences used for modelling a chimeric Fab version of 3C12 with human IgG1 constant regions, including an Fc domain comprising L234A/L235E/G237A/A330S/P331S substitutions (retaining N297-linked glycosylation) were the following:

HP Fab heavy chain (variable domain underlined)
(SEQ ID NO: 23)
QIQLQQSGPELVKPGASVKVSCKASGYAFASYNMNWVKQSHGKSLDWIG

YIDPYNGGSSYNLTFKGKATLTVDKSSTTAYMHLNSLTSEDSAVYYCAR

GYGNYKAWFAYWGQGTLVTVSAASTKGPSVFPLAPSSKSTSGGTAALGC

LVKDYFPEPVTVSWNSGALTSGVHTFPAVLQSSGLYSLSSVVTVPSSSL

GTQTYICNVNHKPSNTKVDK.

LP Fab light chain (variable domain underlined)
(SEQ ID NO: 24)
DVVMTQTPKFLLVSAGDRVTITCKASQSVSNDVAWYQQKPGQSPKLLIY

YASTRYTGVPDRFTGSGYGTDFTFTISTVQAEDLAVYFCQQDYSSLTFG

AGTKLELKRTVAAPSVFIFPPSDEQLKSGTASVVCLLNNFYPREAKVQW

KVDNALQSGNSQESVTEQDSKDSTYSLSSTLTLSKADYEKHKVYACEVT

HQGLSSPVTKSFNRGEC.

H0 Fab heavy chain (variable domain underlined)
(SEQ ID NO: 25)
QVQLVQSGAEVKKPGASVKVSCKASGYTFTSYNMYWVRQAPGQRLEWMG

YIDPYNGGSSYNLTFKGRVTITRDTSASTAYMELSSLRSEDTAVYYCAR

GYGNYKAWFAYWGQGTLVTVSSASTKGPSVFPLAPSSKSTSGGTAALGC

LVKDYFPEPVTVSWNSGALTSGVHTFPAVLQSSGLYSLSSVVTVPSSSL

GTQTYICNVNHKPSNTKVDK.

L0 Fab light chain (variable domain underlined)
(SEQ ID NO: 26)
DIQMTQSPSSLSASVGDRVTITCKASQSVSNDVAWYQQKPGKAPKLLIY

YASTRYTGVPSRFSGSGSGTDFTFTISSLQPEDIATYYCQQDYSSLTFG

QGTKLEIKRTVAAPSVFIFPPSDEQLKSGTASVVCLLNNFYPREAKVQW

KVDNALQSGNSQESVTEQDSKDSTYSLSSTLTLSKADYEKHKVYACEVT

HQGLSSPVTKSFNRGEC.

The heavy chain variable region and light chain variable region sequences of the HPLP parental antibody are shown below:

HP VH
(SEQ ID NO: 27)
QIQLQQSGPELVKPGASVKVSCKASGYAFASYNMNWVKQSHGKSLDWIG

YIDPYNGGSSYNLTFKGKATLTVDKSSTTAYMHLNSLTSEDSAVYYCAR

GYGNYKAWFAYWGQGTLVTVSA.

-continued

LP VL (SEQ ID NO: 28)
DVVMTQTPKELLVSAGDRVTITCKASQSVSNDVAWYQQKPGQSPKLLIY

YASTRYTGVPDRFTGSGYGTDFTFTISTVQAEDLAVYFCQQDYSSLTFG

AGTKLELK.

Heavy Chain Design

In order to investigate whether residue I2 (also position 2 according to Kabat numbering) forms a hydrophobic bond with CDR_H3-Y109 and plays a role in CDR_H3 positioning or flexibility, the valine residue at position 2 was substituted by an isoleucine. V2 and I2 side chains are not coincident in the two models. V2 also forms a hydrophobic bond with H0-Y109 (Kabat Y108) but the Y109 position is slightly modified and H0-Y109 forms h-bond with LC-Y55 (Kabat Y54). Y55 is a CDR_L2 residue. The V2 substitution may influence the position of both CDR_H3 and CDR_L2.

In order to investigate whether the residues at positions 28 and 30 (framework 1, also positions 28 and 30 according to Kabat) influence binding to antigen, these positions were substituted by an alanine. The parental antibody has the sequence YAFA compared to YTFT of the H0L0 antibody. Residues A28 and A30 are exposed at the molecular surface close to the paratope. It appears likely that a threonine at position 28 would likely negatively influence binding to antigen. On the other hand, A30 appeared unlikely to be critical.

In order to investigate whether the residue at position 44 (also Kabat 44) plays a role in the VH/VL interface, this residue was back-mutated thereby conserving the serine present in parental antibody. The parental antibody has the sequence GKS compared to GQR of the H0L0 antibody. R44 is located at the VH/VL interface, very close to L45 side chain.

In order to investigate whether the residue at position 48 (also Kabat 48) is important, this residue was back-mutated thereby conserving the residue present in parental antibody. The parental antibody has the sequence WIG compared to WMG of the H0L0 antibody. I48 and M48 appear to occupy critical positions just below the CDR_H2 and are involved in a complex hydrophobic network.

In order to investigate whether the importance of the residues at positions 67 (Kabat position 66) and 68 (Kabat position 67), these residues were back-mutated thereby conserving the residues present in parental antibody. The parental antibody has the sequence KAT compared to RVT in the H0L0 antibody. The loop between F64 (Kabat F63) and K67/R67 (Kabat K66/R66) shows very different conformations in the two models. A68 (Kabat 67) is a Vernier residue.

In order to investigate the role of the residue at Abnum position 70 (Kabat position 69), this residue was back-mutated thereby conserving the leucine present in parental antibody. The parental antibody has the sequence TLT compared to TIT of the H0L0 antibody. L70 and I70 (Kabat L69 and I69) are involved in a complex hydrophobic network.

In order to investigate the role of the residue at position 72 (Kabat 71), this residue was back-mutated thereby conserving the serine present in parental antibody. The parental antibody has the sequence TVD compared to TRD of the H0L0 antibody. V72 and R72 (Kabat V71 and R71) occupy critical positions just below the CDR_H2. The distal hydrophilic side chain of residue V72 is projected at the molecular surface and forms an h-bond with N55 (Kabat N54). N55 occupies the same position in both models. However, the h-bond with R72 (Kabat R71) may lower the flexibility of the corresponding loop. Consequently, the impact on antigen binding of replacing parental valine with an arginine in the H0L0 cannot be predicted.

In order to investigate whether the residue at position 74 (Kabat 73) influences binding to antigen, this residue was back-mutated thereby conserving the serine present in parental antibody. The parental antibody has the sequence DKS compared to DTS in the H0L0 antibody. K74 and T74 (Kabat K73 and T73) are exposed at the molecular surface close to the paratope and they may be involved in antigen binding.

A first heavy chain variant (H1) having the amino acid sequence shown in SEQ ID NO: 29 had a V2I and a T73K substitution. A second heavy chain (H2) variant having the amino acid sequence shown in SEQ ID NO: 30 had the substitutions V2I, T28A, R71V and T73K. A third heavy chain variant (H3) having the amino acid sequence shown in SEQ ID NO: 31 had the substitutions V2I, T28A, M48I, R66K, V67A, R71V and T73K. A fourth heavy chain variant (H4) having the amino acid sequence shown in SEQ ID NO: 32 had the substitutions V2I, T28A, T30A, M48I, R66K, V67A, I69L, R71V and T73K. Numbering of substitutions is according to Kabat.

Light Chain Design

The parental antibody has the sequence DVVM compared to DIQM of the H0L0 antibody. Residue V2 forms a hydrophobic bond with A25. Residue I2 may be exposed at the paratope surface but impact on paratope organisation cannot be predicted. I2 does not form hydrophobic bond with A25, and this may slightly modify the position of CDR-L1. The isoleucine at residue 2 was therefore substituted by a valine.

The parental antibody has the sequence PDR compared to PSR in the H0L0 antibody. Residue R61 occupies rotameric positions. The loops seem to be oriented the same way but are not superimposed (lateral translation corresponding to the global translation of the entire domain). In the parental antibody, D60 forms a salt bridge and a h-bond with CDR-L2-R54. In the H0L0 antibody, residue S60 does not contact R54. R54 occupies rotameric positions. Contact with D60 may be critical to impose a specific and suitable position to CDR-L2 residues. The aspartic acid residue at position 60 in the H0L0 antibody was therefore substituted by a serine.

The parental antibody has the sequence GYG compared to GSG in the H0L0 antibody. To investigate whether residue Y67 contributes to the paratope the serine in the H0L0 antibody was replaced by a tyrosine.

The parental antibody has the sequence YFC compared to YYC in the H0L0 antibody. While Y87 does not appear to form h-bond with adjacent residues, the role of this residue is to be investigated and the tyrosine at position 87 in the H0L0 was substituted by a phenylalanine.

A first light chain variant (L1) having the amino acid sequence shown in SEQ ID NO: 33 had the substitution S67Y. A second light chain (L2) variant having the amino acid sequence shown in SEQ ID NO: 34 had the substitutions S60D and S67Y. A third light chain variant (L3) having the amino acid sequence shown in SEQ ID NO: 35 had the substitutions I2V, S60D and S67Y. A fourth light chain variant (L4) having the amino acid sequence shown in SEQ ID NO: 36 had the substitutions I2V, S60D, S67Y and Y87F.

The amino acid sequences of respective heavy ("H" chains in Table 1) and light ("L" chains in Table 1) chain variable regions are shown in the Table 1 below.

However, all other humanized variants had similar affinity for CD73 as the chimeric parental 3C12 antibody (0.68 nM). Notably, all heavy chains, including the fully human

TABLE 1

| Chain | SEQ ID NO | Sequence (amino acid substitutions in bold, Kabat CDRs underlined) |
|---|---|---|
| H1 | 29 | QIQLVQSGAEVKKPGASVKVSCKASGYTFTSYNMYWVRQAPGQRLEWMGYIDPYNGGSSYNLTFKGRVTITRDKSASTAYMELSSLRSEDTAVYYCARGYGNYKAWFAYWGQGTLVTVSS |
| H2 | 30 | QIQLVQSGAEVKKPGASVKVSCKASGYAFTSYNMYWVRQAPGQSLEWMGYIDPYNGGSSYNLTFKGRVTITVDKSASTAYMELSSLRSEDTAVYYCARGYGNYKAWFAYWGQGTLVTVSS |
| H3 | 31 | QIQLVQSGAEVKKPGASVKVSCKASGYAFTSYNMYWVRQAPGQSLEWIGYIDPYNGGSSYNLTFKGKATITVDKSASTAYMELSSLRSEDTAVYYCARGYGNYKAWFAYWGQGTLVTVSS |
| H4 | 32 | QIQLVQSGAEVKKPGASVKVSCKASGYAFASYNMYWVRQAPGQSLEWIGYIDPYNGGSSYNLTFKGKATLTVDKSASTAYMELSSLRSEDTAVYYCARGYGNYKAWFAYWGQGTLVTVSS |
| L1 | 33 | DIQMTQSPSSLSASVGDRVTITCKASQSVSNDVAWYQQKPGKAPKLLIYYASTRYTGVPSRFSGSGYGTDFTFTISSLQPEDIATYYCQQDYSSLTFGQGTKLEIK |
| L2 | 34 | DIQMTQSPSSLSASVGDRVTITCKASQSVSNDVAWYQQKPGKAPKLLIYYASTRYTGVPDRFSGSGYGTDFTFTISSLQPEDIATYYCQQDYSSLTFGQGTKLEIK |
| L3 | 35 | DVQMTQSPSSLSASVGDRVTITCKASQSVSNDVAWYQQKPGKAPKLLIYYASTRYTGVPDRFSGSGYGTDFTFTISSLQPEDIATYYCQQDYSSLTFGQGTKLEIK |
| L4 | 36 | DVQMTQSPSSLSASVGDRVTITCKASQSVSNDVAWYQQKPGKAPKLLIYYASTRYTGVPDRFSGSGYGTDFTFTISSLQPEDIATYFCQQDYSSLTFGQGTKLEIK |

The antibodies having the heavy and light chain combinations shown in Table 2 below were produced.

TABLE 2

| Heavy chains | Light chains | | | | |
|---|---|---|---|---|---|
| | L0 | L1 | L2 | L3 | L4 |
| H0 | H0L0 | H0L1 | H0L2 | H0L3 | H0L4 |
| H1 | H1L0 | H1L1 | H1L2 | H1L3 | H1L4 |
| H2 | H2L0 | H2L1 | H2L2 | H2L3 | H2L4 |
| H3 | H3L0 | H3L1 | H3L2 | H3L3 | H3L4 |
| H4 | H4L0 | H4L1 | H4L2 | H4L3 | H4L4 |

Example 2: Binding to Soluble CD73 Protein by SPR

The binding of the antibodies in Table 2 of Example 1 were tested for binding to human soluble dimeric CD73 proteins and were cloned, produced and purified. Affinity and association and dissociation constants of humanized variants were assessed by SPR analysis. Table 3 summarizes all the calculated constants.

The H0L0 antibody with an entirely human IGHV1-3*01 and IGHJ4*01 heavy chain framework and entirely human IGKV1-33*01 and IGKJ2*01 light chain framework resulted in a KD of 65 nM. As shown in Table 3, humanized variants HxL0 (H1L0, H2L0, H3L0 and H4L0) exhibited an association constant equivalent to other variants but have a faster dissociation profile. KD of the HxL0 variants was, accordingly, higher than those observed for all other variants (Table 3). Introduction of the full human IGKV1-33*01 and IGKJ2*01 light chain amino acid sequences in the humanized variants therefore appears to be detrimental to the affinity for the humanized Ab to CD73.

unmodified IGHV1-3*01 and IGHJ4*01 heavy chain framework, provided high affinity binding to CD73.

TABLE 3

| humanized variants | KD (nM) | ka (1/Ms) | kd (1/s) |
|---|---|---|---|
| H0L0 | 65 | 1.36E+05 | 8.82E-03 |
| H0L1 | 0.9 | 1.44E+05 | 1.27E-04 |
| H0L2 | 0.7 | 1.68E+05 | 1.19E-04 |
| H0L3 | 0.6 | 1.70E+05 | 9.49E-05 |
| H0L4 | 0.6 | 1.37E+05 | 8.65E-05 |
| H1L0 | 28.7 | 1.03E+05 | 2.96E-03 |
| H1L1 | 0.8 | 1.00E+05 | 8.43E-05 |
| H1L2 | 0.6 | 1.35E+05 | 8.38E-05 |
| H1L3 | 0.8 | 9.26E+04 | 7.20E-05 |
| H1L4 | 0.7 | 9.82E+04 | 6.77E-05 |
| H2L0 | 5.6 | 2.38E+05 | 3.20E-03 |
| H2L1 | 1.4 | 8.37E+04 | 1.18E-04 |
| H2L2 | 1.3 | 1.18E+05 | 1.55E-04 |
| H2L3 | 1 | 1.20E+05 | 1.23E-04 |
| H2L4 | 0.9 | 1.20E+05 | 1.06E-04 |
| H3L0 | 29.4 | 2.71E+05 | 7.97E-03 |
| H3L1 | 1.8 | 7.89E+04 | 1.40E-04 |
| H3L2 | 1.4 | 8.66E+04 | 1.22E-04 |
| H3L3 | 1.1 | 9.57E+04 | 1.05E-04 |
| H3L4 | 1 | 9.04E+04 | 8.91E-05 |
| H4L0 | 7.8 | 1.58E+05 | 1.23E-03 |
| H4L1 | 1.7 | 1.06E+05 | 1.79E-04 |
| H4L2 | 0.9 | 7.75E+04 | 7.12E-05 |
| H4L3 | 0.7 | 1.10E+05 | 7.69E-05 |
| H4L4 | 1.2 | 6.01E+04 | 7.14E-05 |

Example 3: Binding to Cells Expressing Human CD73 by Flow Cytometry

The binding of the humanized antibodies in Table 2 were tested for binding to CD73-expressing cells by flow cytometry. As shown in FIG. 1, all tested Abs recognized human CD73 proteins. The binding efficacy on huCD73 was similar between humanized variants and the chimeric format, except for H0L0, H2L0 and H3L0 which were less efficient than the parental antibody. These observations are in accordance with SPR data that showed lower affinity for HxL0 variants (H1L0, H2L0, H3L0 and H4L0). Consequently, all heavy chains, including the unmodified fully human IGHV1-3*01 and IGHJ4*01 heavy chain framework, provided excellent binding to CD73-expressing cells, comparable to the parental antibody.

Example 4: In Vitro Enzymatic Assay with Recombinant Soluble Human CD73 Protein

The efficacy of the humanized variants were compared to the parental antibody to inhibit the enzymatic activity of the recombinant CD73 protein (FIG. 2).

As shown in FIG. 2 (panel A), high levels of luminescence was measured when ATP and CTG substrates were mixed. When AMP was added to the reaction mix, the CTG reaction was inhibited resulting in a decrease of luminescence. In the presence of rhCD73 protein that hydrolyzes AMP, the level of luminescence was restored. Blockade of CD73 enzymatic activity by the humanized variants is shown in FIG. 2.

Results showed that with the exception of the L0 variants (H0L0, H1 L0, H2L0, H3L0 and H4L0) which had decreased activity compared to the parental antibody, all humanized variants showed strong inhibition of enzymatic activity of the soluble CD73 protein. However, surprisingly, for most antibodies the potency was somewhat lower than that of the parental antibody. Only the H1L4 and all H4 variants blocked the enzymatic activity with similar potency as the parental antibody.

These experiments showed that independently of the number of back-mutations on the heavy chain, the absence of mutation on the light chain when using the IGKV1-33*01 and IGKJ2*01 sequences as acceptor framework leads to a significant decrease in the ability to inhibit the activity of the soluble CD73 protein.

The best efficacy of CD73 protein activity blockade was achieved with H1L4 and H4Lx variants other than H4L0 (i.e. H4L1, H4L2, H4L3 and H4L4).

Example 5: T Cell Proliferation Assay

The concentration of AMP able to inhibit T cell proliferation was tested in two series of experiments in order to establish a concentration of AMP that induces a high suppression effect and that permits restoration of proliferation in presence of parental 3C12 antibody. Enriched lymphocyte fraction was incubation for 3 days in presence of anti-CD3/anti-CD28 beads and a dose range of AMP (from 50 µM to 1.6 mM to 50 µM). The best percentage of restoration of CD4+ and CD8+ T cells was observed with 0.2 to 0.8 mM and 0.2 to 1 mM of AMP, respectively, in the two series of experiments.

The ability of humanized variants and parental antibody were assessed in the two series of experiments to compare their ability to restore T cell proliferation inhibited by 0.8 mM AMP.

Figure 3A:
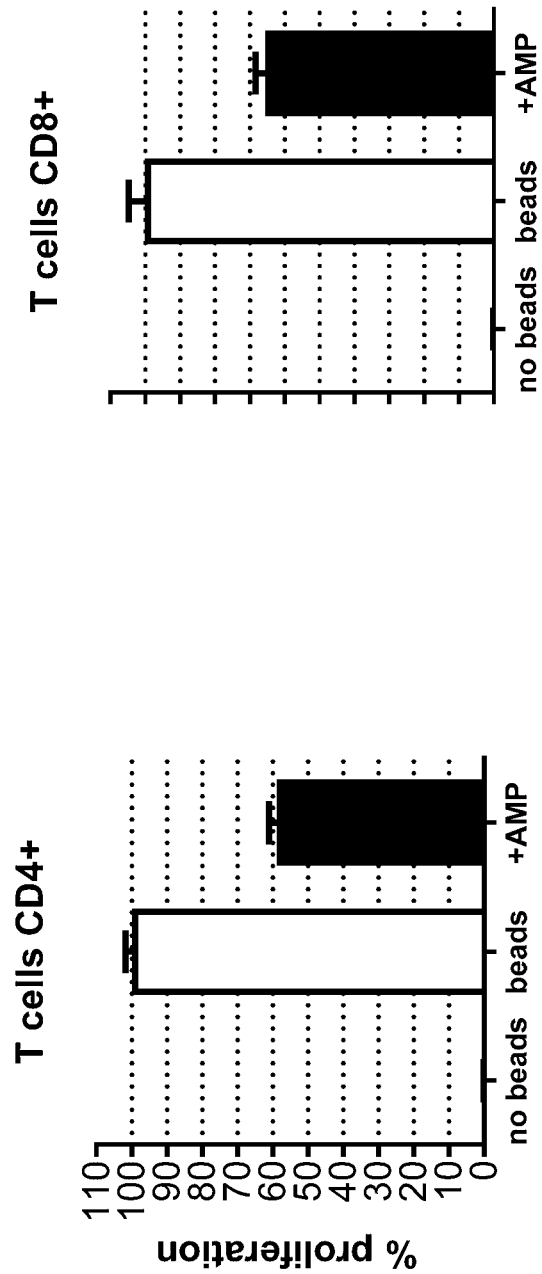

As shown in FIG. 3, with the exception of the HxL0 variants, the chimeric and the humanized Abs were able to restore T cell proliferation (for both CD4+ and CD8+ sub-populations). Despite their ability to restore the proliferation, the potency of the majority of humanized variants was lower as compared to the parental antibody. The H0L4, H1L4 and H4L4 variants demonstrated a similar level of potency of the parental antibody, although without achieving the full potency of the parental antibody.

Figure 4B:
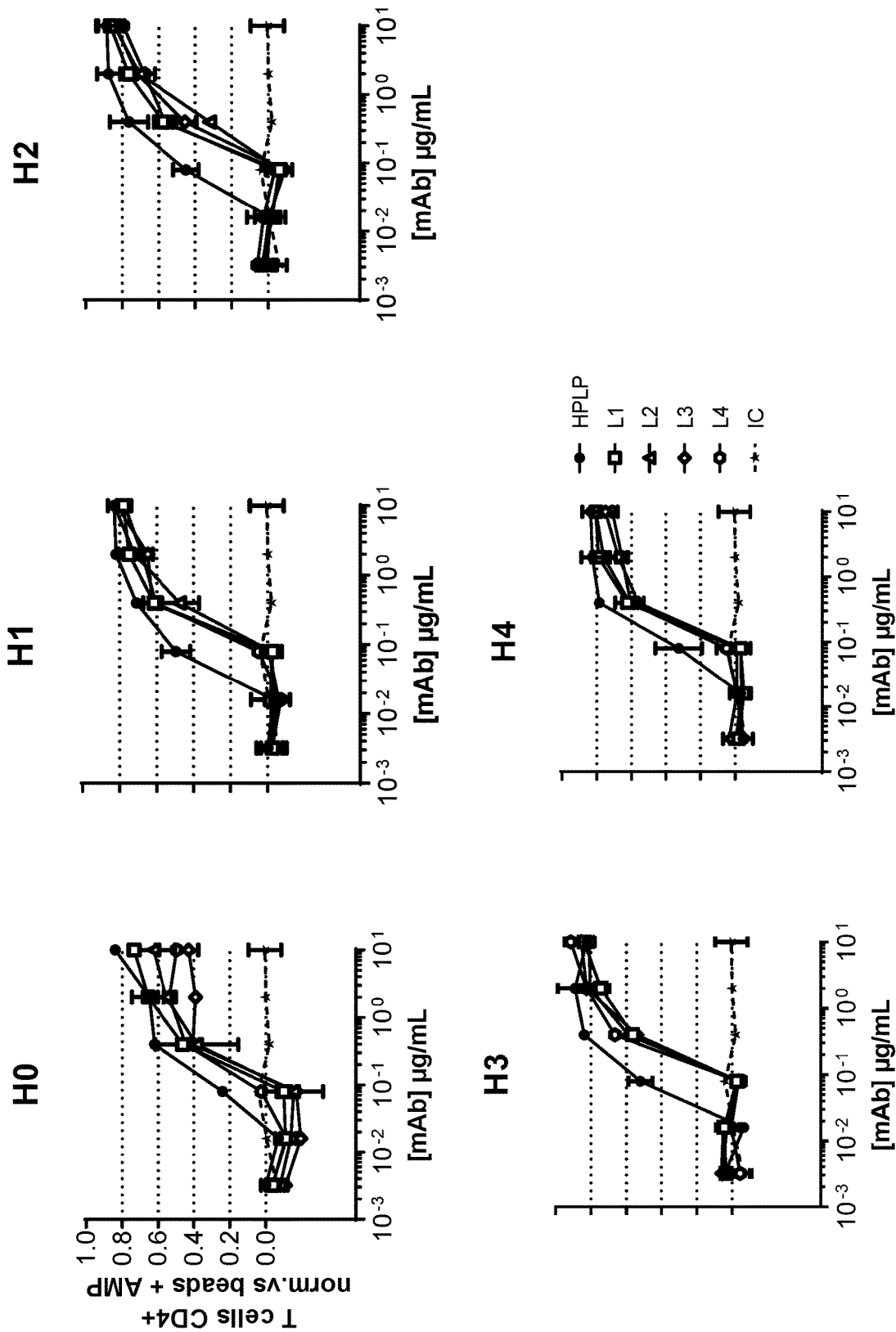
Figure 4C:
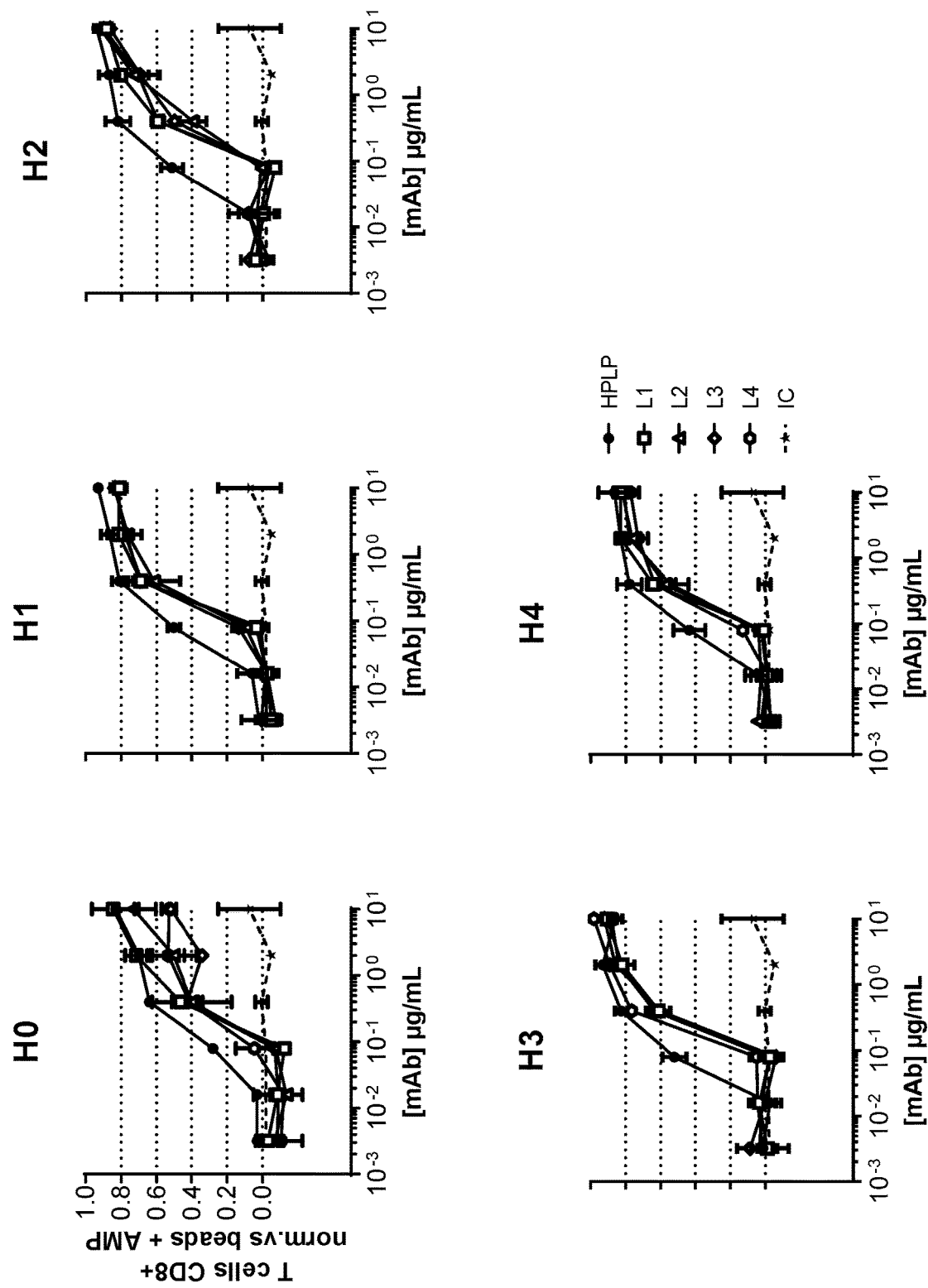

A second experiment was performed with the same experimental conditions except that L0 variants were replaced by isotype control. The results are presented in FIG. 4.

Similarly to that shown in FIG. 3, with the exception of the HxL0 variants, the chimeric and the humanized Abs were able to restore T cell proliferation (for both CD4+ and CD8+ sub-populations). However, despite their ability to restore the proliferation, the potency of the majority of humanized variants was again somewhat lower as compared to the parental antibody.

The H0L4, H1L4 and H4L4 variants most closely approached the efficiency of the parental antibody.

Example 6: Design of New Framework and CDR Variants

Surprisingly, the preceding examples showed that there was no direct correlation between flow cytometry titration and potency in inhibition of the enzymatic activity of CD73. Interestingly, while H1, H2, H3 and H4 variants were essentially indistinguishable based on binding affinity to CD73 recombinant protein in SPR assays and in flow cytometry on CD73-expressing cells, the H2 and H3 variants were less potent in the functional assays than H4 variants in the ability to restore T cell proliferation in Example 5. One possibility is that the mutations introduced into the H2 and H3 frameworks which were detrimental to potency in inhibiting CD73 (but were not detrimental to binding affinity for CD73) were compensated by mutations introduced into the H4 variant frameworks. Consequently, new variants with substitutions in heavy chain framework and/or CDR residues were designed. Based on these observations, the substitutions made in the H2, H3 and H4 chains were classified as either residues that are believed to be critical for function, residues likely not to affection function, residues that negatively impact function, and residues that restore function.

A new heavy chain variant, referred to as "H4+", having the amino acid sequence shown below (SEQ ID NO: 37; amino acid substitutions in bold, Kabat CDRs underlined), was designed and were combined with L1, L2, L3 and L4 light chains (of SEQ ID NOS: 33, 34, 35 and 36, respectively) to generate four new antibodies, H4+L1, H4+L2, H4+L3 and H4+L4.

H4+ VH:
(SEQ ID NO: 37)
QIQLVQSGAEVKKPGASVKVSCKASGYTFA<u>SYNMYW</u>VRQAPGQRLEWIG

<u>YIDPYNGGSSYNLTFKGR</u>VTLTRDKSASTAYMELSSLRSEDTAVYYCAR

<u>GYGNYKAWFAY</u>WGQGTLVTVSS

The amino acid sequence of the full H4+ heavy chain comprising a human IgG1 Fc domain with L234A/L235E/G237A/A330S/P331S substitutions is shown below:

(SEQ ID NO: 38)
QIQLVQSGAEVKKPGASVKVSCKASGYTFASYNMYWVRQAPGQRLEWIG

YIDPYNGGSSYNLTFKGRVTLTRDKSASTAYMELSSLRSEDTAVYYCAR

GYGNYKAWFAYWGQGTLVTVSSASTKGPSVFPLAPSSKSTSGGTAALGC

```
-continued
LVKDYFPEPVTVSWNSGALTSGVHTFPAVLQSSGLYSLSSVVTVPSSSL

GTQTYICNVNHKPSNTKVDKRVEPKSCDKTHTCPPCPAPEAEGAPSVFL

FPPKPKDTLMISRTPEVTCVVVDVSHEDPEVKFNWYVDGVEVHNAKTKP

REEQYNSTYRVVSVLTVLHQDWLNGKEYKCKVSNKALPSSIEKTISKAK

GQPREPQVYTLPPSREEMTKNQVSLTCLVKGFYPSDIAVEWESNGQPEN

NYKTTPPVLDSDGSFFLYSKLTVDKSRWQQGNVFSCSVMHEALHNHYTQ

KSLSLSPGK.
```

The H4+L1 antibody contained a L1 light chain comprising a human Ckappa domain, the full sequence of which is shown below:

```
                                       (SEQ ID NO: 39)
DIQMTQSPSSLSASVGDRVTITCKASQSVSNDVAWYQQKPGKAPKLLIY

YASTRYTGVPSRFSGSGYGTDFTFTISSLQPEDIATYYCQQDYSSLTFG

QGTKLEIKRTVAAPSVFIFPPSDEQLKSGTASVVCLLNNFYPREAKVQW

KVDNALQSGNSQESVTEQDSKDSTYSLSSTLTLSKADYEKHKVYACEVT

HQGLSSPVTKSFNRGEC.
```

In order to investigate how the same framework substitutions would impact an antibody having differences in its heavy and light chain CDRs, a further series of four antibodies was produced having a common heavy chain and one of four different light chains. The common heavy chain designated "2H4+" had a glutamine at Kabat position 59 (Q59) in HCDR2 (i.e. L59Q substitution, compared to the H4+ chain), a lysine at Kabat residue 60 (K60) in HCDR2 (i.e. a T60K substitution, compared to the H4+ chain), and an asparagine at Kabat position 97 (N97) in HCDR3 (i.e. a G97N substitution, compared to the H4+ chain). The four light chains designated 2L1, 2L2, 2L3 and 2L4 had the same framework residues as L1, L2, L3 and L4 chains, respectively, and differed in their CDRs from L1-L4 chains by presence of a threonine at Kabat position 30 (T30) in LCDR1 (i.e. a S30T substitution, compared to the L1-L4 chains), and an asparagine at Kabat residue 53 (N53) in LCDR2 (i.e. a T53N substitution, compared to the L1-L4 chains). The resulting four new antibodies are designated 2H4+2L1, 2H4+2L2, 2H4+2L3 and 2H4+2L4 (see Table 4), below. A parental antibody sharing the CDRs in murine frameworks was produced with heavy and light chain variable regions designated 2HP and 2LP (amino acid sequences shown in Table 5, below).

As in Example 1, all antibodies were produced as human IgG1 isotype with L234A/L235E/G237A/A330S/P331S substitutions to reduce Fc receptor binding.

TABLE 4

| mAb reference | VH | VL |
|---|---|---|
| 2H4+L1 (SEQ ID NO: 42) | 2H4+ (SEQ ID NO: 43) | 2L1 |
| 2H4+L2 (SEQ ID NO: 42) | 2H4+ (SEQ ID NO: 44) | 2L2 |
| 2H4+L3 (SEQ ID NO: 42) | 2H4+ (SEQ ID NO: 45) | 2L3 |
| 2H4+L4 (SEQ ID NO: 42) | 2H4+ (SEQ ID NO: 46) | 2L4 |
| 2HP2LP (SEQ ID NO: 40) | 2HP (SEQ ID NO: 41) | 2LP |

TABLE 5

| Chain | SEQ ID NO | Variable region amino acid sequence (amino acid substitutions in bold, Kabat CDRs underlined) |
|---|---|---|
| 2HP | 40 | EIQLQQSGPELVKPGASVKVSCKASGYAFTSYNMYWVKQSHGKRLEWIGYIDPYNGGSSYNQKFKGKATLTVDKSSSTAYMHLNNLTSEDSAVYYCARGYNNYKAWFAYWGQGTLVTVSA |
| 2LP | 41 | DVVMTQTPKFLLVSAGDRVTITCKASQSVTNDVAWYQQKPGQSPKLLIYYASNRYTGVPD RFTGSGYGTDFTFTISTMQAEDLAVYFCQQDYSSLTFGAGTKLELK |
| 2H4+ | 42 | QIQLVQSGAEVKKPGASVKVSCKASGYTFASYNMYWVRQAPGQRLEWIGYIDPYNGGSSYNQKFKGRVTLTRDKSASTAYMELSSLRSEDTAVYYCARGYNNYKAWFAYWGQGTLVTVSS |
| 2L1 | 43 | DIQMTQSPSSLSASVGDRVTITCKASQSVTNDVAWYQQKPGKAPKLLIYYASNRYTGVPSRFSGSGYGTDFTFTISSLQPEDIATYYCQQDYSSLTFGQGTKLEIK |
| 2L2 | 44 | DIQMTQSPSSLSASVGDRVTITCKASQSVTNDVAWYQQKPGKAPKLLIYYASNRYTGVPDRFSGSGYGTDFTFTISSLQPEDIATYYCQQDYSSLTFGQGTKLEIK |
| 2L3 | 45 | DVQMTQSPSSLSASVGDRVTITCKASQSVTNDVAWYQQKPGKAPKLLIYYASNRYTGVPDRFSGSGYGTDFTFTISSLQPEDIATYYCQQDYSSLTFGQGTKLEIK |
| 2L4 | 46 | DVQMTQSPSSLSASVGDRVTITCKASQSVTNDVAWYQQKPGKAPKLLIYYASNRYTGVPDRFSGSGYGTDFTFTISSLQPEDIATYFCQQDYSSLTFGQGTKLEIK |

The amino acid sequence of the full 2H4+ heavy chain comprising a human IgG1 Fc domain with L234A/L235E/G237A/A330S/P331S substitutions is shown below:

```
                                       (SEQ ID NO: 47)
QIQLVQSGAEVKKPGASVKVSCKASGYTFASYNMYWVRQAPGQRLEWIGYI

DPYNGGSSYNQKFKGRVTLTRDKSASTAYMELSSLRSEDTAVYYCARGYNN

YKAWFAYWGQGTLVTVSSASTKGPSVFPLAPSSKSTSGGTAALGCLVKDYF

PEPVTVSWNSGALTSGVHTFPAVLQSSGLYSLSSVVTVPSSSLGTQTYICN

VNHKPSNTKVDKRVEPKSCDKTHTCPPCPAPEAEGAPSVFLFPPKPKDTLM
```

-continued

ISRTPEVTCVVVDVSHEDPEVKFNWYVDGVEVHNAKTKPREEQYNSTYRVV

SVLTVLHQDWLNGKEYKCKVSNKALPSSIEKTISKAKGQPREPQVYTLPPS

REEMTKNQVSLTCLVKGFYPSDIAVEWESNGQPENNYKTTPPVLDSDGSFF

LYSKLTVDKSRWQQGNVFSCSVMHEALHNHYTQKSLSLSPGK.

The amino acid sequence of the full 2L1 light chain of the antibody comprising a human Ckappa domain is shown below:

(SEQ ID NO: 48)
DIQMTQSPSSLSASVGDRVTITCKASQSVINDVAWYQQKPGKAPKLLIYYA

SNRYTGVPSRFSGSGYGTDFTFTISSLQPEDIATYYCQQDYSSLTEGQGTK

LEIKRTVAAPSVFIFPPSDEQLKSGTASVVCLLNNEYPREAKVQWKVDNAL

QSGNSQESVTEQDSKDSTYSLSSTLTLSKADYEKHKVYACEVTHQGLSSPV

TKSFNRGEC.

Example 7: Study of New Variants In Vitro Enzymatic Assay with Recombinant CD73 Protein The efficacy of the humanized variants were compared to the parental antibody to inhibit the enzymatic activity of the recombinant CD73 protein, using the methods described in Example 4. All of the new humanized variants produced in Example 6 potently inhibited the activity of the CD73 protein.

The H4+Lx antibodies were as efficient as their parental counterpart. Furthermore, all of the 2H4+2Lx (2H4+L1, 2H4+L2, 2H4+L3 and 2H4+L4) variants showed an increase in potency in CD73 inhibition compared to the H4+Lx variants. The 2H4+2Lx variants inhibited the activity of CD73 with an efficacy similar to that of the parental 2HP2LP antibody.

An additional experiment was performed with different concentrations of the CD73 protein (50, 100, 200, 400 ng/mL). The aim of this experiment was to study the ability of the humanized antibodies to block the activity of high amounts of CD73 protein. Again, the 2H4+2Lx variants were as potent as the parental 2HP2LP antibody.

Example 8: Study of New Variants for Efficacy on Cynomolgus CD73 Protein

An experiment on recombinant rec cyCD73 protein was performed with 2H1Lx and 2H4+2Lx variants. Experimental conditions were the same as in experiments on human protein except for the concentration of cyCD73 protein that was used (400 ng/mL).

The efficacy of the humanized variants to block enzymatic activity of cyCD73 protein was the same as that of the parental (chimeric) antibody.

Example 9: Study of New Variants in T Cell Proliferation Assay

Humanized variants of the different antibodies were tested for their ability to restore T cell proliferation inhibited by AMP.

Figure 5A:
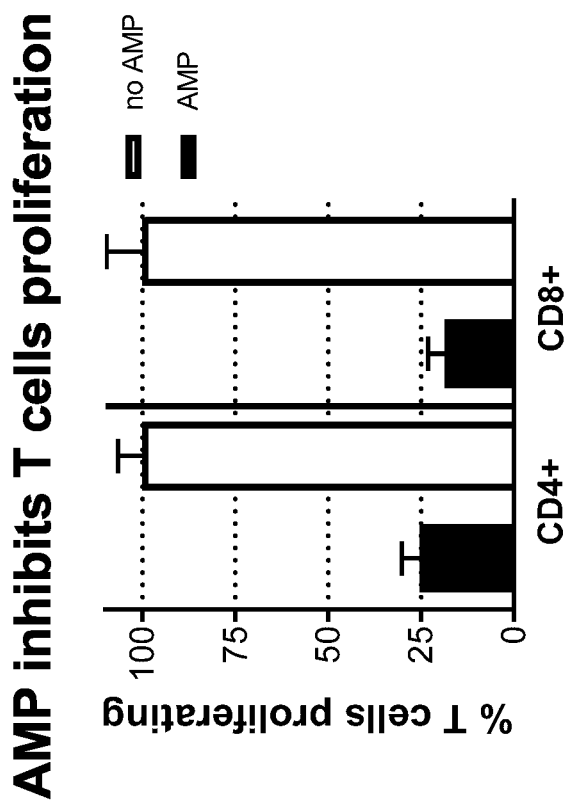
FIGS. 5A-5C show T cell proliferation is restored by all anti-CD73 Abs.
Figure 5B:
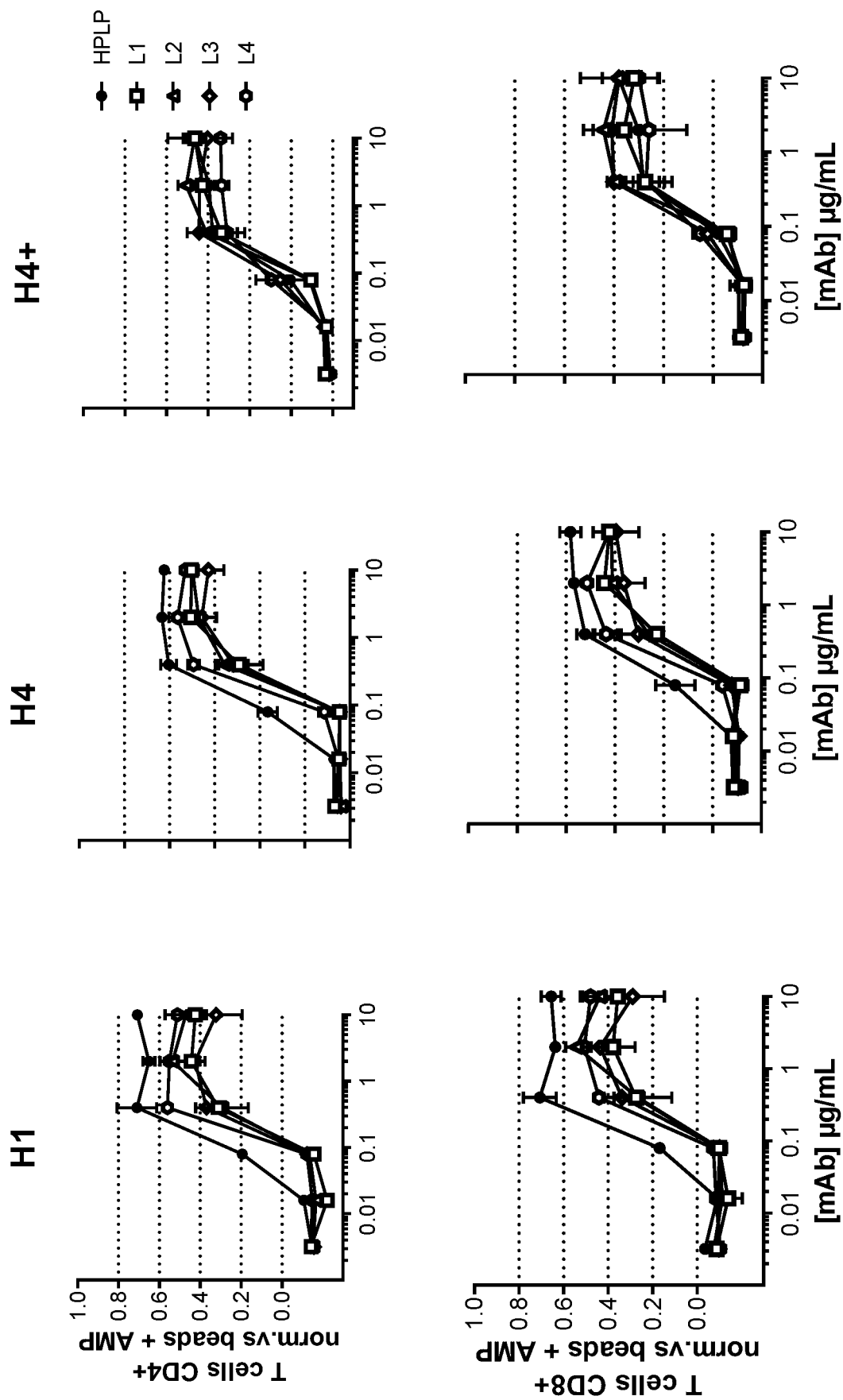
Figure 5C:
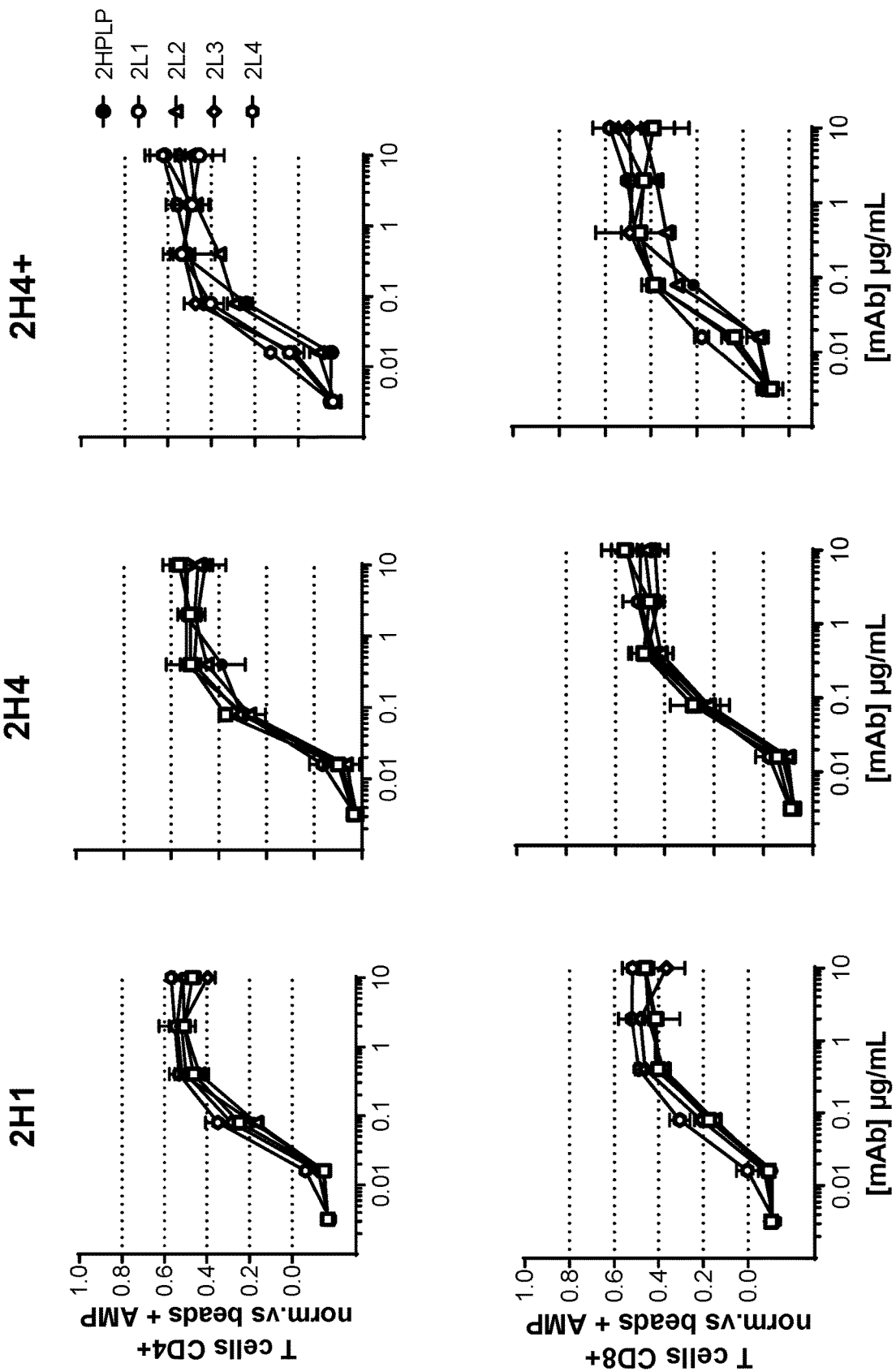

FIG. 5A shows the inhibitory effect of AMP on T cell proliferation. All humanized variants potently blocked inhibitory effect of AMP on T cell proliferation (FIGS. 5B and C). While most humanized variants generally appear to be as efficient as their chimeric parental counterpart in reversing AMP-mediated T cell suppression, the 2H4+2Lx variants were the most potent among all variants, and surprisingly they were even more potent than the parental 2HP2LP antibody to block the suppressive effects of AMP.

Example 10: Comparative Study of New Variants in T Cell Proliferation Assay in Two Human Donors According to results previously obtained, the 2H4+2Lx humanized variants were further characterized in further series of T cell proliferation experiments.

FIGS. 6A and 6B shows results obtained in a T cell proliferation assay using cells from two healthy donors, respectively. As observed previously, 2H4+2Lx variants were each more potent than the parental 2HP2LP to restore T cell proliferation (FIGS. 6A and B, right panels). No clear differences among the different 2H4+2Lx variants were observed. Thus, once again, the 2H4+2Lx variants were more potent than the parental 2HP2LP antibody to block the suppressive effects of AMP.

Taken together, the results obtained on T cell proliferation assay indicate that the humanized variants having the frameworks of the H4+ and H4+ chains are the most potent antibody variants, and that the 2H4+2Lx variants overall have the greatest potency amongst all the antibodies.

Example 11: Study of New Variants in Allogeneic Mixed Lymphocyte Reaction (MLR) Assay The 2H4+2Lx antibody variant was tested in an allogenic MLR in order to confirm the results obtained previously in T cell proliferation assays. T cell proliferation was inhibited by adding 100 µM of ATP (which is degraded into ADP and AMP by CD39), shown in FIG. 7 for two human donor samples.

As shown in FIG. 7, left panel, T cell proliferation was inhibited by addition of ATP. T cell proliferation was restored in the presence of the anti-CD73 antibodies (middle and right hand panels). All of the 2H4+2Lx humanized variants were able to restore T cell proliferation with comparable or better efficacy comparable to or better than the parental 2HP2LP antibody. All 2H4+2Lx variants were more potent than the parental 2HP2LP to restore T cell proliferation in these settings. These results were in accordance with those obtained in T cell proliferation assay using AMP as inhibitor.

In summary, the substitutions introduced in the H4+ and 2H4+ variable regions together with the substitutions introduced into the L1 and 2L1 chains (and the L2, L3, L4, 2L2, 2L3, 2L4 chains) appear to restore (and even improve on) the important functional properties of their parental murine antibodies, yet have human framework regions and therefore lower risk of immunogenicity in humans. The 2H4+2Lx antibodies are the most potent of all.

One possible explanation for the surprising finding that binding affinity for CD73 did not directly correlate with potency in functional inhibition of CD73 activity may be related to the fact that these antibodies bind to CD73 act as allosteric inhibitors. The antibodies bind to CD73 in an intra-dimer binding mode in a 1:1 stoichiometry between an intact full-length antibody and a CD73 dimer. Previous structural studies of CD73 have shown that its enzymatic activity requires extensive N-terminal domain rotation defining open (inactive) and closed (active, substrate-bound)

states of the enzyme (Knapp et al., 2012 Structure 20(12): 2161-73). Based on the crystal structure of parental anti-CD73 F(ab) in complex with the ectodomain of CD73, and taking into consideration the 1:1 stoichiometry between an intact antibody and a CD73 dimer, it is anticipated that steric hindrance would make it unlikely that the intact antibody could bind to CD73 open conformers. Instead, the intact antibody constraints CD73 in an intermediate state in which AMP cannot be hydrolysed. Since CD73 is therefore bound by the antibodies while in an energetically unstable conformation, small changes that modify the rigidity of the antibody structure here may be affecting the ability of the antibody to adapt to the changing conformation of the CD73 dimer. These changes consequently may impact the ability of the antibody to inhibit the activity of CD73 in the presence of substrate. However these small changes in antibody structure would not be observed in SPR or other binding assays, that furthermore are carried out in the absence of substrate. The heavy and light chain variable regions described herein appear to be able to capture (and even improve on) the full CD73 interaction dynamics of the parental antibodies, while incorporating human frameworks.

All references, including publications, patent applications, and patents, cited herein are hereby incorporated by reference in their entirety and to the same extent as if each reference were individually and specifically indicated to be incorporated by reference and were set forth in its entirety herein (to the maximum extent permitted by law), regardless of any separately provided incorporation of particular documents made elsewhere herein.

The use of the terms "a" and "an" and "the" and similar references are to be construed to cover both the singular and the plural, unless otherwise indicated herein or clearly contradicted by context.

Unless otherwise stated, all exact values provided herein are representative of corresponding approximate values (e.g., all exact exemplary values provided with respect to a particular factor or measurement can be considered to also provide a corresponding approximate measurement, modified by "about," where appropriate).

The description herein of any aspect or embodiment herein using terms such as "comprising", "having," "including," or "containing" with reference to an element or elements is intended to provide support for a similar aspect or embodiment herein that "consists of", "consists essentially of", or "substantially comprises" that particular element or elements, unless otherwise stated or clearly contradicted by context (e.g., a composition described herein as comprising a particular element should be understood as also describing a composition consisting of that element, unless otherwise stated or clearly contradicted by context).

The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

We claim:

1. An antibody or antibody fragment that binds to a human CD73 protein and neutralizes enzymatic 5′-ectonucleotidase activity of said human CD73 protein, wherein the antibody or antibody fragment comprises a heavy chain variable region (VH) comprising the amino acid sequence of SEQ ID NO: 42 (2H4+ chain), and a light chain variable region (VL) comprising an amino acid sequence selected from the group consisting of SEQ ID NOS: 43 (2L1 chain), 44 (2L2 chain), 45 (2L3 chain) and 46 (2L4 chain).

2. The antibody of claim 1, wherein the antibody is a full-length antibody.

3. The antibody or antibody fragment of claim 1, wherein the antibody is an antibody fragment.

4. A pharmaceutical composition comprising the antibody or antibody fragment according to claim 1.

5. A nucleic acid or set of nucleic acids encoding a heavy and light chains or a variable heavy (VH) and variable light (VL) domains of the antibody or antibody fragment according to claim 1.

6. A recombinant host cell comprising a vector encoding the antibody or antibody fragment according to claim 1.

7. An expression vector comprising one or more nucleic acid according to claim 5.

8. An antibody or antibody fragment that binds to a human CD73 protein and neutralizes its enzymatic 5′-ectonucleotidase activity, comprising a heavy chain variable region (VH) comprising the amino acid sequence of SEQ ID NO: 42 (2H4+ chain), and a light chain variable region (VL) comprising the amino acid sequence of SEQ ID NO: 43.

9. An antibody or antibody fragment that binds to a human CD73 polypeptide, comprising a heavy chain comprising SEQ ID NO: 47, and a light chain comprising SEQ ID NO: 48.

10. A pharmaceutical composition comprising the antibody or antibody fragment according to claim 8.

11. A pharmaceutical composition comprising the antibody or antibody fragment according to claim 7.

12. A method for the treatment of a disease associated with the presence of CD73 or comprising CD73-expressing cells in a patient in need thereof, the method comprising administering a therapeutically effective amount of the antibody or antibody fragment according to claim 1 or a composition comprising said antibody or antibody fragment to said patient.

13. The method of claim 12, wherein said disease is cancer or infectious disease.

14. The method of claim 13, wherein the cancer is a leukemia, bladder cancer, glioma, glioblastoma, ovarian cancer, melanoma, prostate cancer, thyroid cancer, stomach cancer, esophageal cancer, pancreatic cancer or a breast cancer.

15. A method for treating a cancer comprising CD73-expressing cells in a patient in need thereof, the method comprising administering to the patient the antibody or antibody fragment of claim 1 in an amount that achieves or maintains for a specified period of time a concentration in circulation or in an extravascular tissue of interest characterized by an EC50 for inhibition of the 5′-ectonucleotidase activity of CD73 expressed by a cell of no more than 1 µg/ml and wherein said cancer comprising CD-73 expressing cells is selected from the group consisting of leukemia, bladder cancer, glioma, glioblastoma, ovarian cancer, melanoma, prostate cancer, thyroid cancer, stomach cancer, esophageal cancer, pancreatic cancer or breast cancer.

16. A method of administering an antibody to a patient for the treatment of a cancer comprising CD73-expressing cells in a patient in need thereof, the method comprising administering the antibody or antibody fragment according to claim 1 for at least one administration cycle, in which at least 2, 3, 4, 5, 6, 7 or 8 doses of the anti-CD73 antibody is administered and wherein the cancer comprising CD73-expressing cells is selected from the group consisting of leukemia, bladder cancer, glioma, glioblastoma, ovarian cancer, melanoma, prostate cancer, thyroid cancer, stomach cancer, esophageal cancer, pancreatic cancer or breast cancer.

17. A method for the treatment of a disease associated with the presence of CD73 or CD73- expressing cells in a patient in need thereof, the method comprising administering to said patient a therapeutically effective amount of the antibody or antibody fragment according to claim 1 and one or more other therapeutic agents, wherein the other therapeutic agent is a chemotherapeutic agent, an anti-PD-1 antibody or antibody fragment, or an anti-PD-L1 antibody or antibody fragment.

18. A method for the treatment of a cancer comprising CD73-expressing cells in a patient in need thereof, comprising administering to said patient an effective amount of the antibody or antibody fragment according to claim 1 and an anti-PD-1 antibody or an anti-PD-L1 antibody.

19. A method of producing a human anti-CD73 antibody or antibody fragment thereof, comprising culturing a cell according to claim 6 under conditions suitable for expression of the anti-CD73 antibody or antibody fragment.

20. A method of manufacturing a pharmaceutical preparation, comprising admixing the antibody or antibody fragment according to claim 1 with a pharmaceutically acceptable carrier.

21. A method for decreasing adenosine production by a CD73-expressing cell, said method comprising bringing the CD73-expressing cell into contact the antibody or antibody fragment according to claim 1.

22. A method for reducing the production of adenosine by a CD73-expressing lymphocyte, the method comprising administering to the subject an effective amount of the antibody or antibody fragment according to claim 1, thereby relieving the adenosine-mediated inhibition of lymphocyte activity in the subject.

23. An antibody or antibody fragment that comprises a heavy chain comprising an amino acid sequence at least 95% identical to the amino acid sequence of SEQ ID NO: 47, and a light chain comprising an amino acid sequence at least 95% identical to the amino acid sequence of SEQ ID NO: 48, wherein the antibody comprises a heavy chain variable region (VH) comprising the amino acid sequence of SEQ ID NO: 42, and a light chain variable region (VL) comprising the amino acid sequence of SEQ ID NO: 43, said antibody or antibody fragment binds to a human CD73 protein and neutralizes its enzymatic 5'-ectonucleotidase activity.

24. A pharmaceutical composition comprising the antibody or antibody fragment according to claim 23.

25. A nucleic acid or set of nucleic acids encoding a heavy and light chains or a VH and VL domains of the antibody or antibody fragment according to claim 23.

26. An expression vector comprising one or more nucleic acid according to claim 25.

27. A recombinant host cell comprising a vector encoding the antibody or antibody fragment of claim 23.

28. A method of producing a human anti-CD73 antibody or antibody fragment thereof, comprising culturing a cell according to claim 27 under conditions suitable for expression of the anti-CD73 antibody or antibody fragment.

29. A method of manufacturing a pharmaceutical preparation, comprising admixing the antibody or antibody fragment according to claim 23 with a pharmaceutically acceptable carrier.

30. A method for decreasing adenosine production by a CD73-expressing cell, said method comprising bringing the CD73-expressing cell into contact the antibody or antibody fragment according to claim 23.

31. A method for reducing the production of adenosine by a CD73-expressing lymphocyte in a subject, the method comprising administering to the subject an effective amount of the antibody or antibody fragment according to claim 23, thereby relieving the adenosine-mediated inhibition of lymphocyte activity in the subject.

32. A method for the treatment of a disease associated with the presence of CD73 or CD73-expressing cells in a patient in need thereof, the method comprising administering a therapeutically effective amount of the antibody or antibody fragment according to claim 23 or a composition comprising said antibody or antibody fragment to said patient.

33. The method of claim 32, wherein said disease is cancer or infectious disease.

34. The method of claim 33, wherein the cancer is a leukemia, bladder cancer, glioma, glioblastoma, ovarian cancer, melanoma, prostate cancer, thyroid cancer, stomach cancer, esophageal cancer, pancreatic cancer or a breast cancer.

35. A method for treating a cancer comprising the presence of CD73-expressing cells in a patient in need thereof, the method comprising administering to the patient the antibody or antibody fragment of claim 23 in an amount that achieves or maintains for a specified period of time a concentration in circulation or in an extravascular tissue of interest characterized by an EC50 for inhibition of the 5'-ectonucleotidase activity of CD73 expressed by a cell of no more than 1 µg/ml.

36. A method of administering an antibody to a patient for the treatment of cancer comprising the presence of CD73-expressing cells in said patient, the method comprising administering the antibody or antibody fragment according to claim 23 for at least one administration cycle, in which at least 2, 3, 4, 5, 6, 7 or 8 doses of the anti-CD73 antibody is administered.

37. A method for the treatment of a disease associated with the presence of CD73 or CD73- expressing cells in a patient in need thereof, the method comprising administering to said patient a therapeutically effective amount of an antibody or antibody fragment according to claim 23 and one or more other therapeutic agents, wherein the other therapeutic agent is a chemotherapeutic agent, or an anti-PD-1 antibody or antibody fragment, or an anti-PD-L1 antibody or antibody fragment.

38. A method for the treatment of a cancer comprising CD73-expressing cells in a patient in need thereof, comprising administering to said patient an effective amount of the antibody or antibody fragment according to claim 23 and an anti-PD-1 antibody or an anti-PD-L1 antibody.

39. The antibody or antibody fragment according to claim 23, wherein said antibody or antibody fragment comprises:
a heavy chain complementarity determining region 1 (HCDR1) comprising SEQ ID NO: 2;
a HCDR2 comprising SEQ ID NO: 12;
a HCDR3 comprising SEQ ID NO: 13;
a light chain complementarity determining region 1 (LCDR1) comprising SEQ ID NO: 14;
a LCDR2 comprising SEQ ID NO: 15; and
a LCDR3 comprising SEQ ID NO: 7.

\* \* \* \* \*